US010941052B2

(12) United States Patent
Mueller et al.

(10) Patent No.: US 10,941,052 B2
(45) Date of Patent: Mar. 9, 2021

(54) SHUTTLE VALVE FOR WATER SOFTENER SYSTEM AND METHOD

(71) Applicant: Pentair Residential Filtration, LLC, Brookfield, WI (US)

(72) Inventors: Scott Thomas Mueller, Menomonee Falls, WI (US); Thomas Richard Bednar, Pewaukee, WI (US); Peter W. Shefte, Menomonee Falls, WI (US)

(73) Assignee: PENTAIR RESIDENTIAL FILTRATION, LLC, Brookfield, WI (US)

( * ) Notice: Subject to any disclaimer, the term of this patent is extended or adjusted under 35 U.S.C. 154(b) by 0 days.

(21) Appl. No.: 16/356,849

(22) Filed: Mar. 18, 2019

(65) Prior Publication Data

US 2019/0308887 A1 Oct. 10, 2019

Related U.S. Application Data

(63) Continuation of application No. 15/458,922, filed on Mar. 14, 2017, now Pat. No. 10,233,093.
(Continued)

(51) Int. Cl.
*C02F 1/00* (2006.01)
*C02F 1/42* (2006.01)
(Continued)

(52) U.S. Cl.
CPC ............... *C02F 1/008* (2013.01); *C02F 1/42* (2013.01); *F16K 11/0712* (2013.01);
(Continued)

(58) Field of Classification Search
CPC .. C02F 1/008; C02F 1/42; F16K 11/22; F16K 31/047; Y10T 137/87016; Y10T 137/8704
See application file for complete search history.

(56) References Cited

U.S. PATENT DOCUMENTS 2,506,711 A ‡ 5/1950 Evans ........................ C02F 1/42
210/13
2,670,328 A ‡ 2/1954 Webb ........................ C02F 1/42
210/14
(Continued)

FOREIGN PATENT DOCUMENTS

CA 2036609 12/1991
CN 103925392 A 7/2014
(Continued)

OTHER PUBLICATIONS

Office Action, Chinese Application No. 201780027961.3, dated Jul. 3, 2019, 6 pages.
(Continued)

*Primary Examiner* — Kevin R Barss
(74) *Attorney, Agent, or Firm* — Husch Blackwell LLP

(57) ABSTRACT

Embodiments of the invention provide a piston assembly for a control valve in a water softener system. The control valve includes a drive mechanism, one or more fluid passageways, and a seal assembly. The piston assembly includes a main piston moveably received within the seal assembly and including a first end and a second end opposite to the first end, and a shuttle piston moveably received within the seal assembly. The shuttle piston includes a first end and a second end opposite to the first end, and is configured to selectively engage the second end of the main piston to form a seal therebetween and to selectively move relative to the second end of the main piston to form an opening between the second end of the main piston and the first end of the shuttle piston, in response to movement of the main piston.

20 Claims, 45 Drawing Sheets

Related U.S. Application Data

(60) Provisional application No. 62/308,134, filed on Mar. 14, 2016.

(51) Int. Cl.
| | |
|---|---|
| *F16K 11/07* | (2006.01) |
| *F16K 11/22* | (2006.01) |
| *F16K 31/04* | (2006.01) |
| *F16K 31/52* | (2006.01) |
| *F16K 31/524* | (2006.01) |
| *F16K 31/528* | (2006.01) |
| *C02F 101/10* | (2006.01) |

(52) U.S. Cl.
CPC .......... *F16K 11/0716* (2013.01); *F16K 11/22* (2013.01); *F16K 31/047* (2013.01); *F16K 31/523* (2013.01); *F16K 31/5286* (2013.01); *F16K 31/52483* (2013.01); *C02F 2001/425* (2013.01); *C02F 2101/10* (2013.01); *C02F 2201/005* (2013.01); *C02F 2303/16* (2013.01); *Y10T 137/8704* (2015.04); *Y10T 137/87016* (2015.04)

(56) References Cited

U.S. PATENT DOCUMENTS

| | | | | | |
|---|---|---|---|---|---|
| 2,722,514 | A | ‡ | 11/1955 | Sloan | C02F 1/42 210/13 |
| 2,845,092 | A | ‡ | 7/1958 | Vomacka | C02F 1/42 137/62 |
| 2,855,042 | A | ‡ | 10/1958 | Kryzer | C02F 1/42 137/54 |
| 2,902,155 | A | ‡ | 9/1959 | Lundeen | C02F 1/42 210/10 |
| 2,973,001 | A | ‡ | 2/1961 | Mcauley | C02F 1/42 137/11 |
| 2,988,107 | A | ‡ | 6/1961 | Rudelick | C02F 1/42 137/62 |
| 3,049,239 | A | ‡ | 8/1962 | Rudelick | C02F 1/42 210/27 |
| 3,126,335 | A | ‡ | 3/1964 | Stife | B01J 47/022 210/12 |
| 3,169,804 | A | ‡ | 2/1965 | Bueler | B60T 15/046 137/627.5 |
| 3,183,933 | A | ‡ | 5/1965 | Whitlock | F16K 31/423 137/62 |
| 3,249,122 | A | ‡ | 5/1966 | Fleckenstein | C02F 1/42 137/62 |
| 3,307,581 | A | ‡ | 3/1967 | Rudelick | C02F 1/42 137/62 |
| 3,616,820 | A | ‡ | 11/1971 | Fleckenstein | C02F 1/42 137/62 |
| 3,643,692 | A | ‡ | 2/1972 | Traylor | C02F 1/42 137/59 |
| 3,700,007 | A | ‡ | 10/1972 | Sparling | F16K 3/243 137/62 |
| 3,762,277 | A | ‡ | 10/1973 | Paul | F16K 11/0704 91/376 |
| 3,779,281 | A | ‡ | 12/1973 | Brane | C02F 1/42 137/62 |
| 3,867,961 | A | ‡ | 2/1975 | Rudelick | C02F 1/42 137/62 |
| 3,977,433 | A | ‡ | 8/1976 | Hankison | F16K 11/065 137/62 |
| 4,250,920 | A | ‡ | 2/1981 | Traylor | F16K 11/044 137/26 |
| 4,290,451 | A | ‡ | 9/1981 | Fleckenstein | C02F 1/42 137/59 |
| 4,919,314 | A | ‡ | 4/1990 | Nishiyama | C02F 1/42 137/62 |
| 5,076,145 | A | ‡ | 12/1991 | Born | F01B 3/106 417/22 |
| 5,157,979 | A | ‡ | 10/1992 | Brane | C02F 1/42 74/567 |
| 5,799,688 | A | ‡ | 9/1998 | Yie | B05B 1/3046 137/50 |
| 6,206,042 | B1 | ‡ | 3/2001 | Channell | C02F 1/00 137/27 |
| 6,209,582 | B1 | ‡ | 4/2001 | Ashley | B60T 8/327 137/62 |
| 6,293,298 | B1 | ‡ | 9/2001 | Brane | F16K 11/065 137/24 |
| 6,402,944 | B1 | ‡ | 6/2002 | Vaughan | C02F 1/42 137/59 |
| 6,444,127 | B1 | ‡ | 9/2002 | Vaughan | F16K 31/046 137/55 |
| 6,596,159 | B1 | ‡ | 7/2003 | Maruyama | B01J 49/85 137/62 |
| 6,644,349 | B2 | ‡ | 11/2003 | Scanlan | F16K 11/07 137/62 |
| 8,141,848 | B2 | ‡ | 3/2012 | Elston | F16K 11/0712 137/62 |
| 8,328,162 | B2 | ‡ | 12/2012 | Prescott | C02F 1/42 137/27 |
| 8,356,628 | B2 | ‡ | 1/2013 | Quinn | F16K 31/04 137/59 |
| 8,500,999 | B2 | ‡ | 8/2013 | Tischendorf | C02F 1/001 137/46 |
| 8,529,768 | B2 | ‡ | 9/2013 | Chandler, Jr. | C02F 1/42 210/14 |
| 8,535,539 | B2 | ‡ | 9/2013 | Chandler, Jr. | C02F 1/42 210/19 |
| 8,535,540 | B2 | ‡ | 9/2013 | Chandler, Jr. | C02F 1/42 210/41 |
| 8,671,985 | B2 | ‡ | 3/2014 | Averbeck | C02F 1/008 137/48 |
| 10,233,093 | B2 | * | 3/2019 | Mueller | F16K 31/523 |
| 2001/0052367 | A1 | ‡ | 12/2001 | Wichmann | F16K 11/076 137/62 |
| 2003/0072654 | A1 | ‡ | 4/2003 | Pressel | F04B 27/0878 417/26 |
| 2012/0312750 | A1 | ‡ | 12/2012 | Chandler, Jr. | C02F 1/42 210/68 |
| 2012/0312756 | A1 | ‡ | 12/2012 | Chandler, Jr. | C02F 1/42 210/75 |
| 2013/0105322 | A1 | ‡ | 5/2013 | Averbeck | C02F 1/008 204/55 |
| 2013/0105326 | A1 | | 5/2013 | Averbeck et al. | |
| 2015/0192210 | A1 | ‡ | 7/2015 | Averbeck | C02F 1/008 137/62 |

FOREIGN PATENT DOCUMENTS

| | | | | |
|---|---|---|---|---|
| CN | 104235424 A | | 12/2014 | |
| WO | 9956046 A1 | | 11/1999 | |
| WO | WO-9956046 A1 | ‡ | 11/1999 | ....... F16K 31/52483 |
| WO | 2007036634 A1 | | 4/2007 | |
| WO | WO-2007036634 A1 | ‡ | 4/2007 | ............... C02F 1/42 |

OTHER PUBLICATIONS

Extended European Search Report; European Application No. 17767368.8, dated Jan. 2, 2020, 8 pages.

International Search Report and Written Opinion; International Application No. PCT/US2017/022371, dated Jun. 5, 2017, 7 pages.

\* cited by examiner
‡ imported from a related application

SHUTTLE VALVE FOR WATER SOFTENER SYSTEM AND METHOD

RELATED APPLICATIONS

This application is a continuation of U.S. patent application Ser. No. 15/458,922, filed on Mar. 14, 2017, which claims priority under 35 U.S.C. § 119 to U.S. Provisional Patent Application No. 62/308,134, filed on Mar. 14, 2016, the entire contents of which are incorporated herein by reference.

BACKGROUND

A variety of water treatment systems are available for softening, filtering, and/or otherwise treating potable water for residential and commercial applications. The most common water treatment systems are filtration systems that remove impurities from water, and water softeners that exchange undesirable ions, such as calcium, with more desirable ions, such as sodium. Many of these water treatment systems employ a control valve for controlling the flow of water through the water treatment systems. Some of those control valves include a movable piston that is actuated by an electric motor to connect various ports of the control valve to one another.

For example, control valves are widely used to control the regeneration cycles of water softeners. Water softeners are widely used for removing calcium and other deposit causing materials from hard water. Conventional water softeners rely on an ion exchange process taking place in an ion-exchange resin bed stored in a resin tank of the water softener. As the water to be processed passes through the resin filled tank, ions of calcium and other minerals in the water are exchanged with ions found in the resin (e.g., sodium), thereby removing objectionable ions from the water and exchanging them for less objectionable ions from the resin.

The capacity of the resin to exchange ions is finite and is reduced during the ion exchange process. If measures are not taken to regenerate the resin by replacing the undesirable ions with desirable ions, the ion exchange capacity of the resin will become exhausted. Therefore, water softeners are typically configured to periodically regenerate the ion exchange resin stored in the resin tank. Regeneration typically involves chemically replacing the objectionable ions, such as calcium ions, from the resin with less objectionable ions, such as sodium ions. This replacement is typically performed by introducing a regenerant solution of sodium chloride or potassium chloride into the resin bed from a brine tank and thereafter flushing the regenerant solution from the bed. The resin bed is typically backwashed in order to remove trapped particulate matter and rinsed to remove untreated backwash water from the lower portion of the resin bed. In order to prevent interruption of service, most water softeners are configured to allow bypass flow of untreated water directly to the treated water outlet during backwash, rinse, and regeneration cycles.

The regeneration cycle is typically controlled by a control valve mounted on top of the resin tank. The control valve is coupled to a source of untreated water, a treated water or service outlet line, the brine tank, a drain connection, and the resin tank. Conventional control valves are controlled by an electric motor under the control of a timer and/or a usage indicator to cycle the water softener from service, brine introduction, backwash, fast rinse, and back to service.

One type of control valve is a reciprocating piston-type water softener control valve which includes a seal arrangement that is positioned in a cylindrical bore and that surrounds the reciprocating piston. A piston is driven to reciprocate within the seal stack by a drive arrangement. The typical drive arrangement includes an electric motor and a motion converter that converts the rotary motion of the electric motor's pinion to linear motion of the piston. However, conventional piston-type water softener control valves are often in communication with another control valve of some sort (e.g., another piston assembly, a diaphragm valve, a solenoid valve, etc.) to provide a service and/or standby cycle. Thus, because two piston assemblies are required, the water softener system also requires two drives and two motors to perform the necessary water treatment cycles of the water softener system, which leads to increased manufacturing costs.

Therefore, a single piston assembly for a water softener control valve that is capable of performing both regeneration and service/standby cycles is desirable.

SUMMARY

Some embodiments of the invention provide a water softener system including a control valve having a single piston assembly enabling the water softener system to perform both regeneration and service/standby cycles. In some embodiments, the piston assembly can include at least one shuttle piston coupled to a main piston such that the shuttle piston is axially moveable with respect to the main piston.

In some embodiments, the present invention provides a piston assembly for a control valve in a water softener system. The control valve includes a drive mechanism, one or more fluid passageways, and a seal assembly arranged within a central bore and in fluid communication with the one or more fluid passageways. The piston assembly includes a main piston moveably received within the seal assembly and including a first end and a second end opposite to the first end. The drive mechanism is connected to the first end of the main piston to selectively control a position of the main piston. The piston assembly further includes a shuttle piston moveably received within the seal assembly and including a first end and a second end opposite to the first end. The shuttle piston is configured to selectively engage the second end of the main piston to form a seal therebetween and to selectively move relative to the second end of the main piston to form an opening between the second end of the main piston and the first end of the shuttle piston, in response to movement of the main piston.

In some embodiments, the present invention provides a piston assembly for a control valve in a water softener system. The control valve includes a drive mechanism, one or more fluid passageways, and a seal assembly arranged within a central bore and in fluid communication with the one or more fluid passageways. The piston assembly includes a main piston moveably received within the seal assembly and including a first end and a second end opposite to the first end. The drive mechanism is connected to the first end of the main piston to selectively control a position of the main piston. The piston assembly further includes a shuttle piston moveably received within the seal assembly and including a first end and a second end opposite to the first end. The shuttle piston is moveable between a latched position and an unlatched position. The piston assembly further includes a latching mechanism configured to cyclically transition the shuttle piston between the latched position and the unlatched position to control an axial position of the shuttle piston.

These and other features, aspects, and advantages of the present invention will become better understood upon consideration of the following detailed description, drawings, and appended claims.

DETAILED DESCRIPTION

Figure 1A:
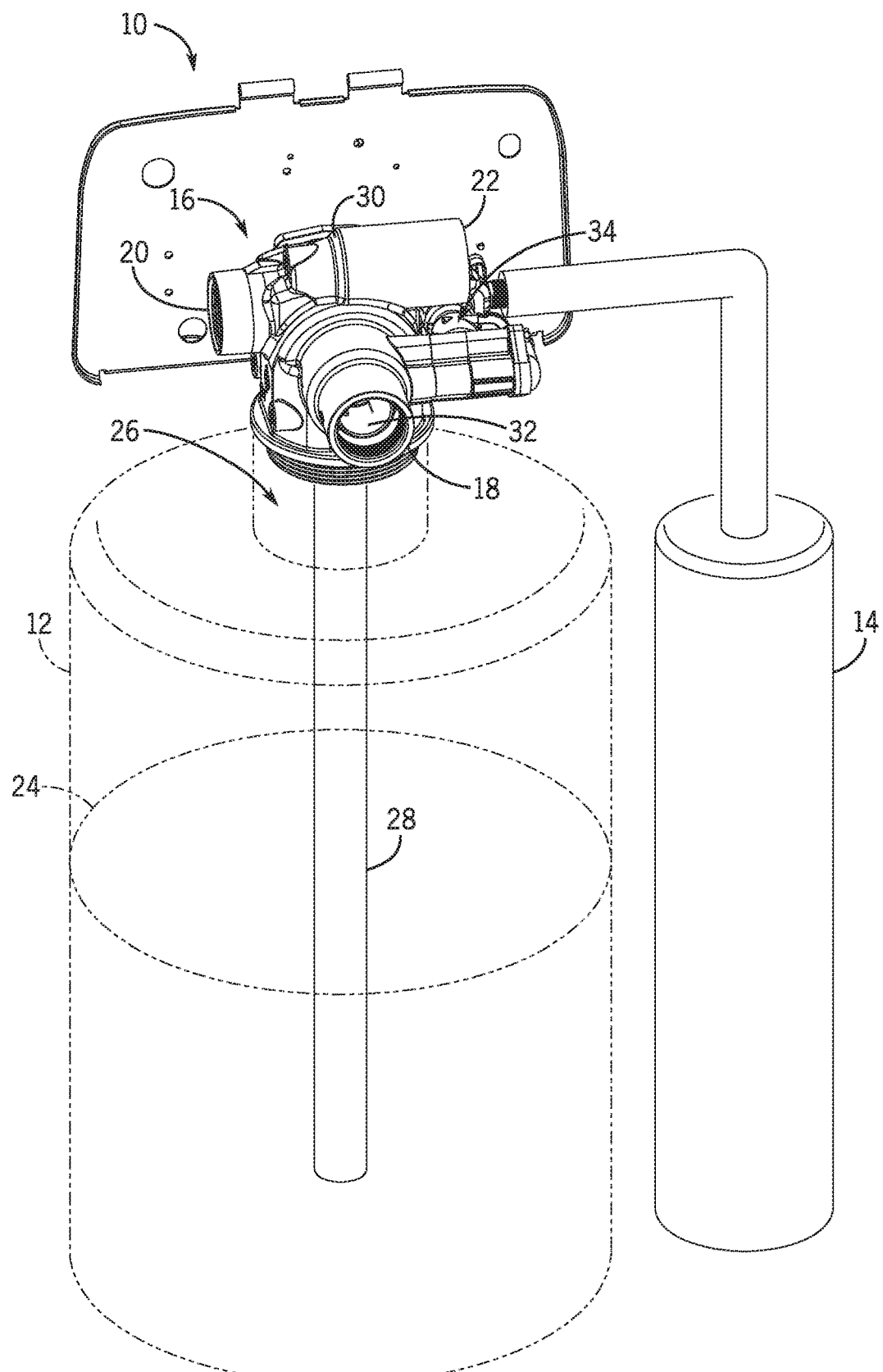
FIG. 1A is a rear perspective view of a water softener according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1B:
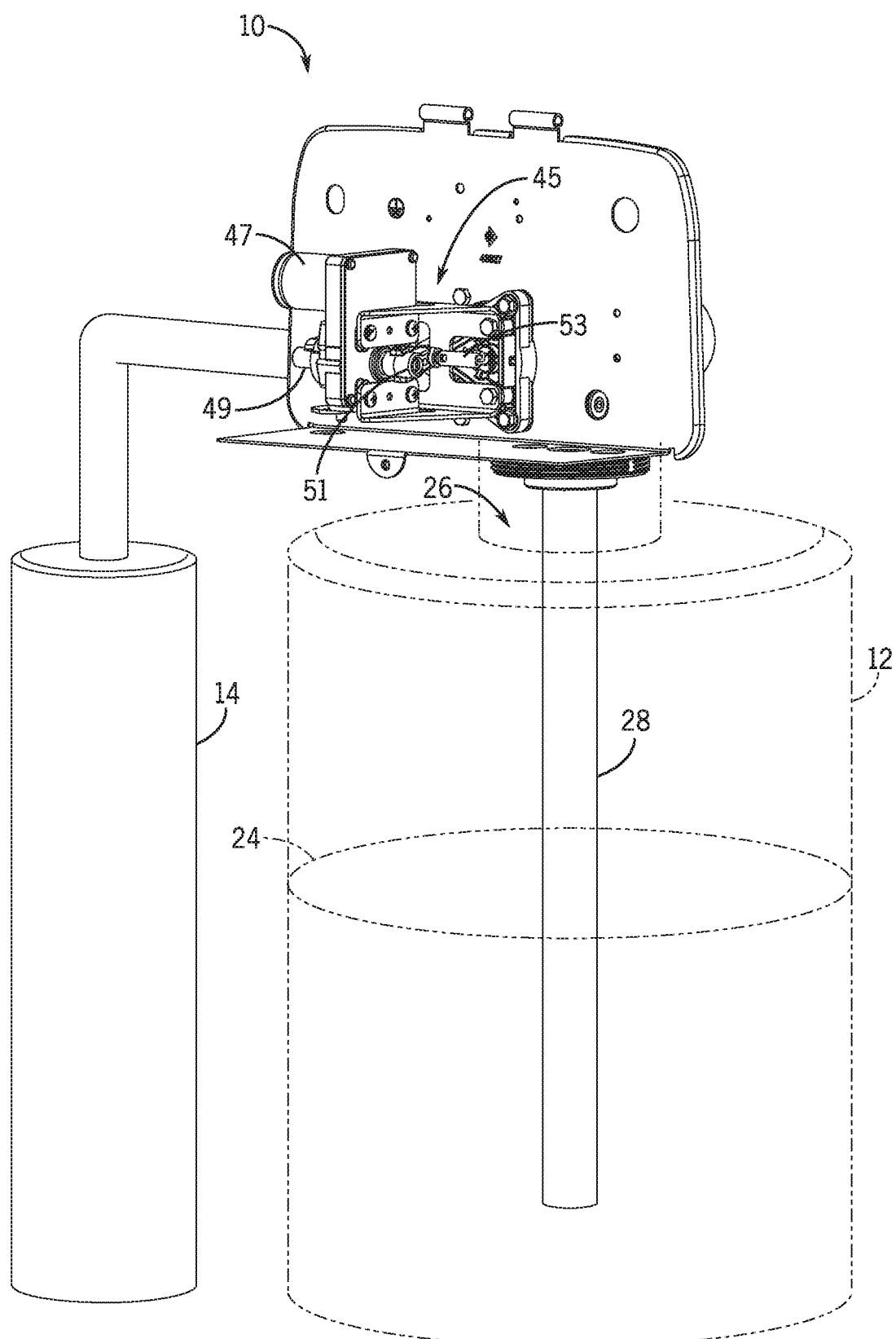
FIG. 1B is a front perspective view of the water softener system of FIG. 1A.

FIGS. 1A and 1B illustrate a water softener system 10 according to one embodiment of the invention. The water softener system 10 can include a resin tank 12, a brine tank 14, and a control valve 16 attached to the top of the resin tank 12. When placed in service, the control valve 16 is fluidly coupled to the resin tank 12, the brine tank 14, an inlet 18 leading to a source of untreated water, an outlet 20 leading to a treated water line, and a drain 22. The resin tank 12 is filled with a treatment medium, such as an ion exchange resin bed 24, and the brine tank 14 contains particles of sodium chloride, potassium permanganate, or another suitable regeneration medium which can be dissolved by water to form a brine or regenerant solution. In operation, as incoming hard water enters the resin tank 12 through an opening 26 in the top of the resin tank 12, the water in the resin tank is forced through the resin bed 24 and out a distributor tube 28 extending through the center of the resin bed 24. The capacity of the resin bed 24 to exchange ions with the minerals and impurities in the incoming hard water is finite, and depends on the treatment capacity of the resin bed 24 as typically measured in kilograms of hardness or grams of $CaCO_3$ and the hardness of the incoming water as typically measured in grains per gallon. To regenerate the resin bed 24 once its treating capacity has been depleted, the resin bed 24 is flushed with the regenerant solution from the brine tank 14 so that the minerals and other impurities can be released from the resin bed 24 and carried out of the resin tank 12. All of these operations, as well as backwash, rinse, and standby operations, are controlled by the water softener control valve 16.

The control valve 16 includes a valve body 30. The valve body 30 includes external ports in open communication with the exterior of the valve body 30. The valve body 30 also includes internal orifices that open into a central bore 32 of the valve body 30. The external ports are fluidly connected to the inlet, outlet, drain, brine tank, top opening of the resin tank, and distributor tube of the resin tank. The valve body 30 may further include an injector assembly 34 to draw brine from the brine tank 14 in to the resin tank 12.

Figure 2:
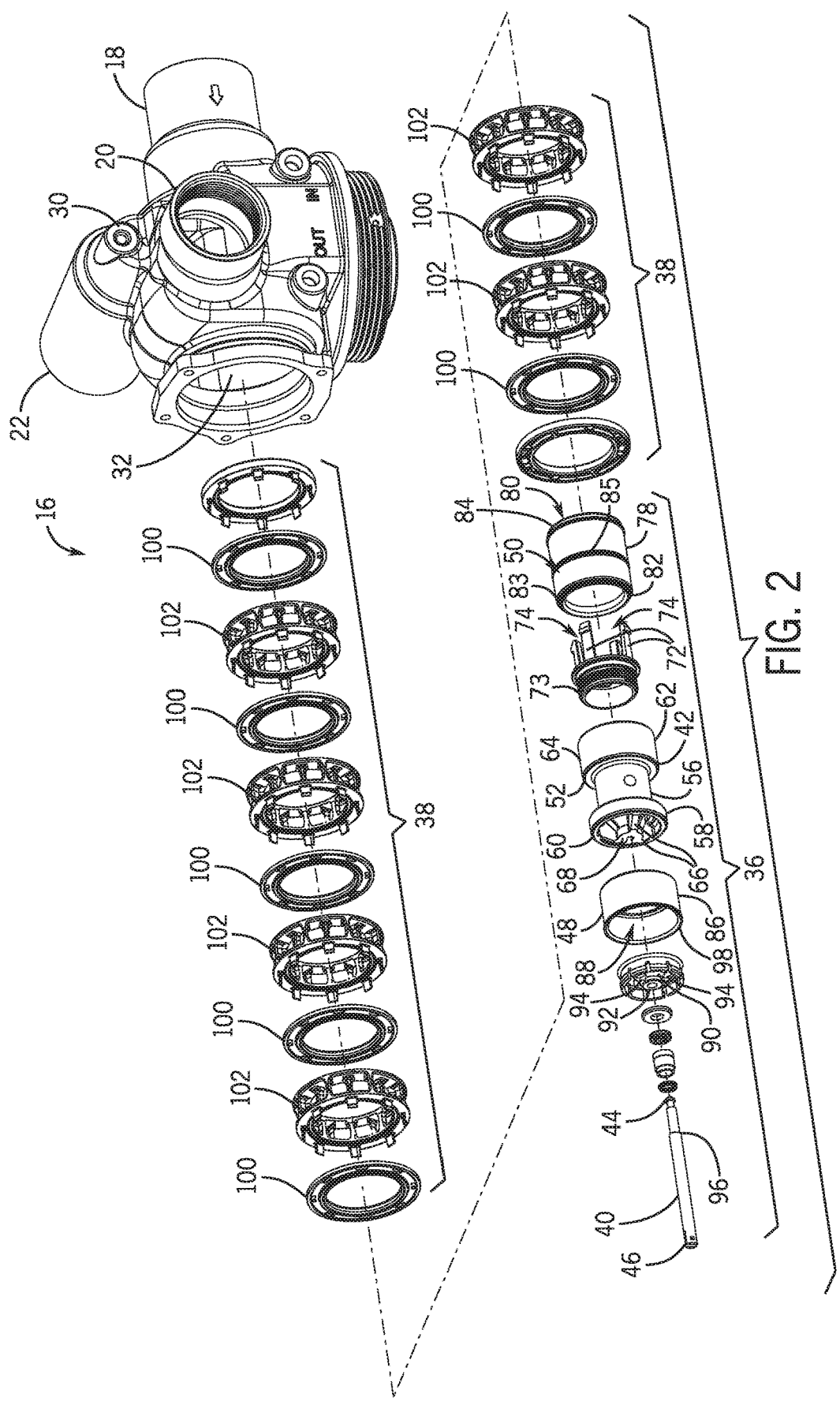
FIG. 2 is an exploded view of a control valve including a piston assembly and a seal assembly operable with the water softener of FIG. 1A.

As shown in the exploded view of FIG. 2, the central bore 32 of the valve body 30 may be configured to receive a piston assembly 36 and a seal assembly 38. The piston assembly 36 includes a piston rod 40 coupled to a piston 42 at a first end 44 and a drive assembly 45 at an opposing, second end 46 (see FIG. 3). An upper shuttle 48 may be received by the piston rod 40 adjacent the piston 42 to inhibit untreated water from going to the outlet 20 during the regeneration cycle, as will be described in further detail below. The upper shuttle 48 is axially translatable with respect to a first end 60 of the piston 42. The piston assembly 36 further includes a lower shuttle 50, adjacent an opposing end of the piston 42, that is axially translatable relative to a second end 64 of the piston 42 and allows the control valve 16 to include a standby position at which there is no flow through the valve body 30. The standby position of the piston assembly 36 allows the control valve 16 to operate in multi-tank systems without the need for an external solenoid, diaphragm or other type of valve or a second piston and drive mechanism, which is required by conventional multi-tank systems.

The drive assembly 45 may be driven by an electric motor 47 coupled thereto, as shown in FIG. 1B. The drive assembly 45 includes a drive shaft 49 coupled to an eccentric cam 51. A cam link 53 connects the eccentric cam 51 to the piston rod 40. Thus, activation of the electric motor 47 causes the drive shaft 49 and eccentric cam 51 to rotate. Rotation of the eccentric cam 51 results in translational movement of the cam link 53 to drive the piston 42 and piston rod 40 within the central bore 32 of the valve body 30. Accordingly, the various stages of the regeneration cycle can correspond to different rotational positions of the eccentric cam 51. In one non-limiting example, the drive assembly 45 rotates in a single direction. It should be appreciated that the use of an electric motor 47 and eccentric cam 51 is not meant to be limiting in any way and, in other embodiments, another drive mechanism (e.g., a solenoid, a linear actuator, a stepper motor, a servo motor, etc.) may be utilized to axially translate the piston assembly 36.

Figure 3:
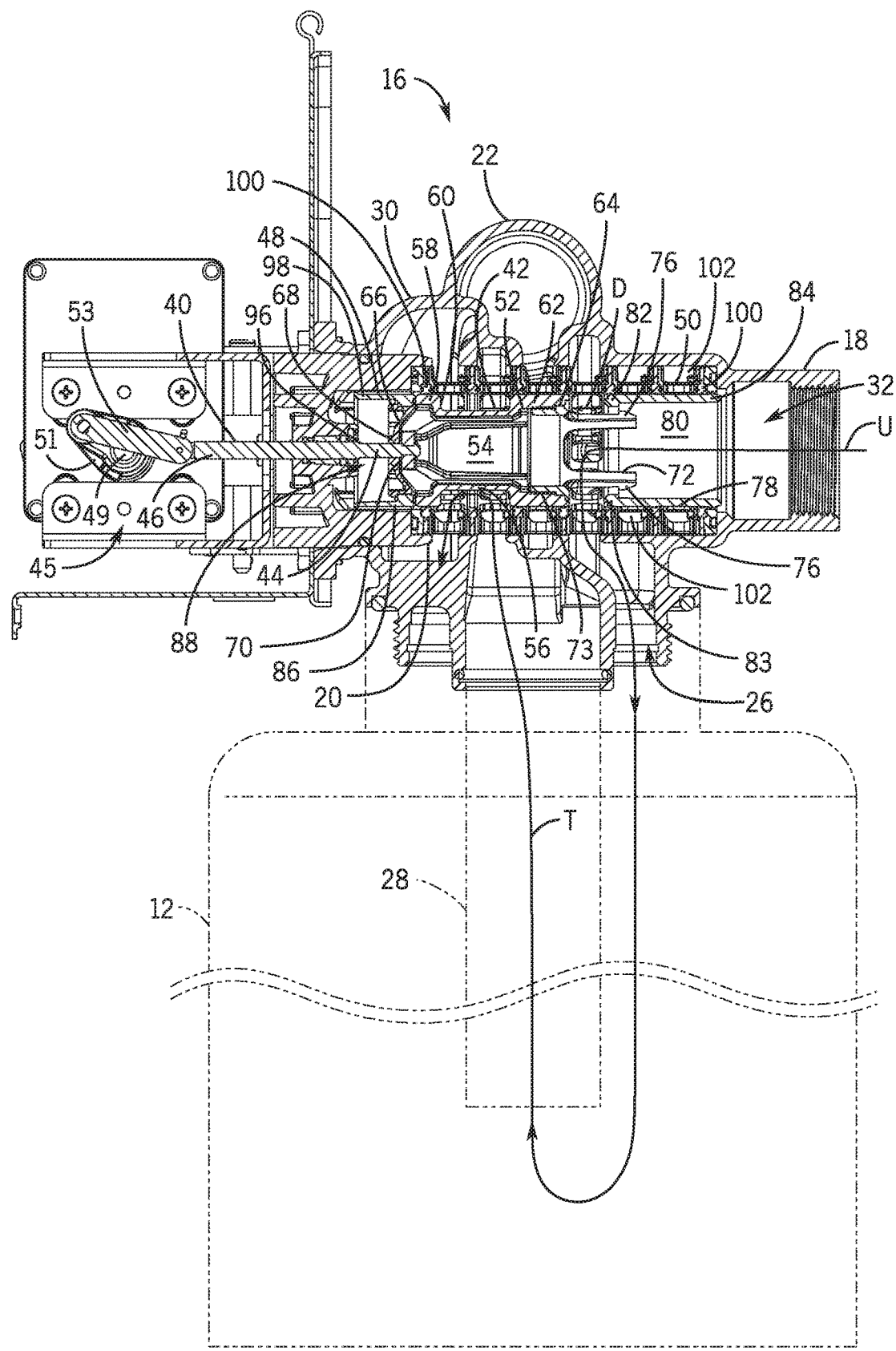
FIG. 3 is a cross-sectional view of the control valve of FIG. 2 during a service cycle.

As shown in FIGS. 2 and 3, the piston 42 may be characterized by a substantially hollow, cylindrical body 52 that defines a central opening 54. The outer surface of the cylindrical body 52 includes a radial recess 56 (i.e., a recess that extends radially inward toward a central axis of the piston 42), which creates a first flange 58 at the first end 60 of the piston 42 and a second flange 62 at the opposing, second end 64 of the piston 42. The arrangement of the radial recess 56 and flanges 58, 62 may help to direct the flow of water among the outlet 20, drain 22, distributor tube 28, and the opening 26 in the resin tank 12.

At the first end 60 of the piston 42, a plurality of arms 66 may radially extend from an inner surface of the cylindrical body 52 to a central base 68. As depicted in FIG. 2, three arms 66 extend from the inner surface of the cylindrical body 52 to the central base 68. However, any suitable quantity of arms 66 may extend from the cylindrical body 52, so long as the central base 68 is sufficiently supported. The central base 68 includes a slot 70 through which the piston rod 40 can connect. At the second end 64 of the piston 42, a plurality of feet 72 may axially extend from the cylindrical body 52. The plurality of feet 72 may be circumferentially spaced so as to create a plurality of openings 74 through which the water can flow. Each of the plurality of feet 72 may include a radially outward projecting stop 76 at a distal end thereof configured to engage the lower shuttle 50. As depicted in FIG. 2, four feet 72 extend from the cylindrical body 52, however, any suitable quantity of feet 72 may extend the cylindrical body 52, so long as the plurality of openings 74 permit sufficient water flow there through. In one embodiment, the plurality of feet 72 may be integrally formed with the cylindrical body 52 of the piston 42. In other embodiments, and as depicted in FIG. 2, the plurality of feet 72 may be coupled to a cylindrical base 73 having external threads that engage internal threads of the second flange 62 of the piston 42.

The lower shuttle 50 may be characterized by a substantially hollow, cylindrical body 78 that defines a central opening 80. A radially inward extending rib 82 may circumscribe an inner surface of the cylindrical body 78 at one end to engage the stops 76 of the plurality of feet 72 of the piston 42. Thus, as the lower shuttle 50 translates relative to the piston 42, the plurality of feet 72 can axially guide the lower shuttle 50 within the central bore 32 of the valve body 30, and the stops 76 can limit the axial translation of the lower shuttle 50 by engaging the inwardly extending rib 82. In some embodiments, a radial step 83, or step change in diameter of the cylindrical body 78, is disposed on the outer surface of the cylindrical body 78 to allow inlet flow to pass to the injector assembly 34, as will be described in further detail below. At an opposing end of the lower shuttle 50, a radially outwardly extending rib 84 may circumscribe an outer surface of the cylindrical body 78 to engage a portion of the seal assembly 38 within the central bore 32 of the valve body 30, as will be described in further detail below. In addition, the illustrated lower shuttle 50 includes a ridge, or band, 85 that extends radially outward from the outer surface of the cylindrical body 78. The ridge 85 is arranged axially between the extending rib 82 and the extending rib 84.

Similar to the lower shuttle 50, the upper shuttle 48 may be characterized by a substantially hollow, cylindrical body 86 that defines a central opening 88. A base 90 may extend across the central opening 88 at one end and include a central aperture 92 that receives the piston rod 40. In some embodiments, the base 90 may include one or more apertures 94 circumferentially spaced around the central aperture 92 to permit water flow there through. The upper shuttle 48 may axially translate relative to the piston 42 along the piston rod 40. Axial translation of the upper shuttle 48 may be limited by a stop 96 positioned on the piston rod 40 that is configured to engage the central aperture 92 of the base 90. At an opposing end of the upper shuttle 48, a radially outwardly extending rib 98 may circumscribe an outer surface of the cylindrical body 86 to engage a portion of the seal assembly 38 within the central bore 32 of the valve body 30, as will be described in further detail below.

With continued reference to FIG. 2, the seal assembly 38 may include seven single seals 100 that are axially spaced by six spacers 102. The seal assembly 38 may be received by the central bore 32 of the valve body 30. The piston 42, upper shuttle 48, and lower shuttle 50 extend through the seal assembly 38 and engage the seals 100. The piston assembly 36 and seal assembly 38 are configured, depending on the location of the piston 42, upper shuttle 48, and lower shuttle 50 within the seal assembly 38, to connect one or more internal orifices, or ports, (i.e., the outlet 20, drain 22, distributor tube 28, and the opening 26 in the resin tank 12) of the valve body 30 to one or more other internal orifices, or ports, and thus creating different flow paths between the external ports of the valve body 30.

As shown in FIGS. 3-8, during operation of the water softener system 10, the piston 42 is controlled by the drive assembly 45 that translates the piston 42 within the central bore 32 of the valve body 30. As the piston 42 is being translated by the drive assembly 45, the upper shuttle 48 and lower shuttle 50 can float and/or translate within the central bore 32 of the valve body 30. That is, translation of the piston 42 is selectively independent of the translation of the upper shuttle 48 and lower shuttle 50.

Referring to FIG. 3, the control valve 16 is shown in a service position in which untreated water, as indicated by arrow U, enters the inlet 18, flows through the central opening 80 of the lower shuttle 50, through the spacer 102, and into the opening 26 of the resin tank 12 to be treated. The now treated water, as indicated by arrow T, then flows up through the distributor tube 28, through the valve and to the outlet 20 of the valve body 30.

As previously described, the radial recess 56 on the outer surface of the piston 42 allows the treated water T to flow across a portion of the seal assembly 38 so that the distributor tube 28 is in fluid communication with the outlet 20. In the service position, the second flange 62 of the piston 42 may inhibit the flow of water to the drain 22. In addition, the outwardly extending rib 84 on the lower shuttle 50 may engage the outermost seal 100 in the service position to inhibit the lower shuttle 50 from engaging the piston 42, which may potentially block access to the opening 26 of the resin tank 12. That is, the outermost seal may act as a stop to ensure that the lower shuttle 50 axially separates from the second end 64 of the piston 42 to enable fluid flow through the plurality of openings 74. Engagement of the outwardly extending rib 84 and the outermost seal 100 also positions the lower shuttle 50 such that untreated water U is inhibited from flowing through the injector assembly 34. Additionally, an axial distance D between the second end 64 of the piston 42 and the lower shuttle 50 is maximized in the service position. The distance D can determine the fluid flow area through which fluid can flow. Thus, the magnitude of the distance D can determine the service flow rate, such that a larger distance D corresponds to a higher flow rate, and a smaller distance D corresponds to a lower flow rate.

When the system determines that the ion exchange capacity of the resin bed 24 will be exhausted in a designated period, a regeneration cycle may commence. This decision may be based on the time since the last regeneration cycle and/or sensed usage and/or other factors. To begin a regeneration cycle, the drive assembly 45, and thereby the piston assembly 36, translates to the position illustrated in FIG. 4A. This translation positions the piston 42 in a backwash position. In the backwash position, untreated water U enters the inlet 18, flows through the central opening 80 of the lower shuttle 50, through the central opening 54 of the piston 42 and into the distributor tube 28 of the resin tank 12. The untreated water U flows down through the distributor tube 28 to the bottom of the resin tank 12. The water then flows up through the resin bed 24 to flush trapped particulate matter from the resin bed 24. Resultant waste water W flows up through the opening 26 of the resin tank 12, through the valve and out the drain 22.

In the backwash position, the outwardly extending rib 98 of the upper shuttle 48 may engage the seal 100 and the cylindrical body 86 may engage the spacer 102 to close the service outlet 20, thereby inhibiting water from flowing to the service outlet 20. The radial recess 56 on the outer surface of the piston 42 allows the waste water W to flow across a portion of the seal assembly 38 and through the valve body 30 so that the opening 26 of the resin tank 12 is in fluid communication with the drain 22. In the backwash position, a pressure differential on the lower shuttle 50 may cause the lower shuttle 50 to engage the second end 64 of the piston 42, thereby keeping the lower shuttle 50 sealed against the piston 42.

Figure 4A:
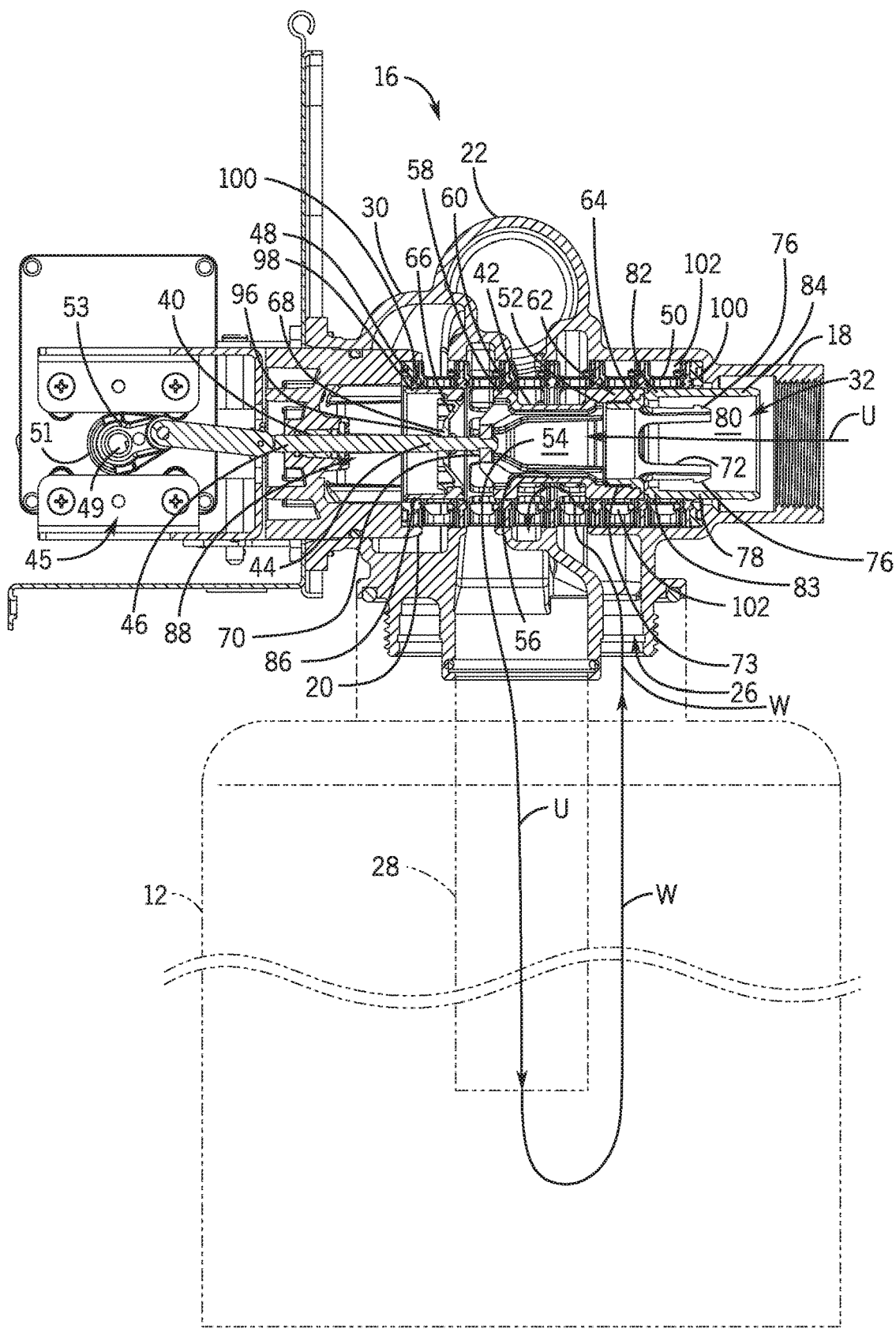
FIG. 4A is a cross-sectional view of the control valve of FIG. 2 during a backwash cycle.
Figure 4B:
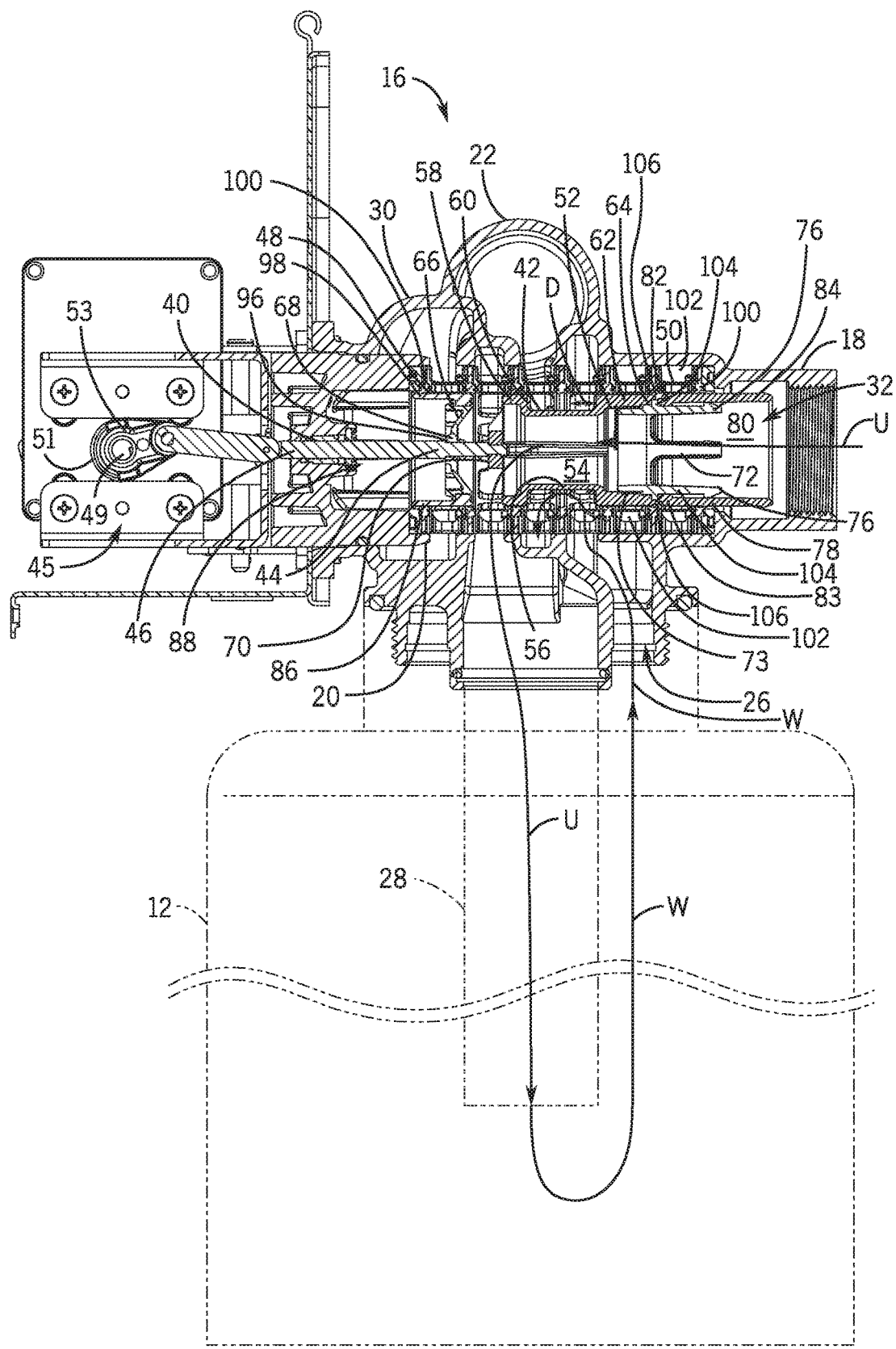
FIG. 4B is a cross-sectional view of another a control valve having a piston assembling with spacers during a backwash cycle according to another embodiment of the invention.

In an alternative embodiment, as shown in FIG. 4B, one or more of the plurality of feet 72 may include spacers 104 arranged adjacent to the cylindrical base 73. The spacers 104 may define a protrusion extending radially outward from the end of the feet 72 adjacent to the base 73. When assembled, the spacers 104 prevent the lower shuttle 50 from "pressure-locking" to the piston 42. For example, when the piston 42 moves from the backwash to a draw position, it is desired for the lower shuttle 50 to axially separate from the piston 42. In some configurations, a pressure differential acting on the lower shuttle 50 may force the shuttle 50 into the piston 42 and cause the lower shuttle 50 to travel with the piston 42. The spacers 104 create a small opening 106 between the lower shuttle 50 and the piston 42 to prevent the "pressure-locking". The opening 106 creates a small leak which results in the untreated water U bypassing from the inlet 18 directly to the drain 22. In other words, the untreated water U flows from the inlet 18 through the central opening 80 of the lower shuttle 50, through the opening 106 between the lower shuttle 50 and the piston 42, through the injector assembly 34, into the valve body 30 and to the drain 22.

Figure 5:
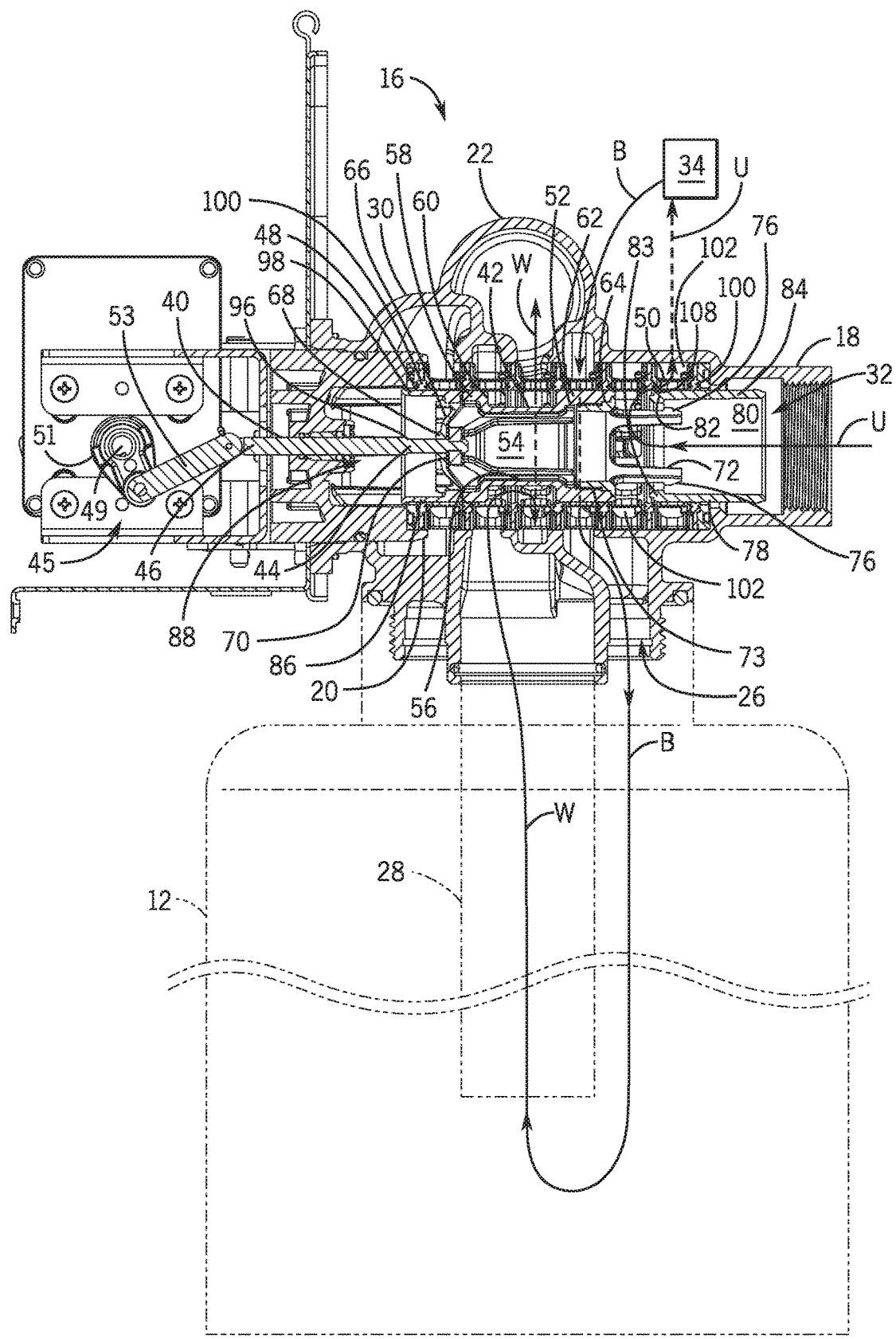
FIG. 5 is a cross-sectional view of the control valve of FIG. 2 during a draw cycle.

After the backwash cycle, the drive assembly 45 causes the piston 42 to move to a draw position, as shown in FIG. 5. When transitioning out of the backwash position, the ridge 85 on the outer cylinder 78 of the lower shuttle 50 is configured to provide a predetermined amount of resistance to the motion of the lower shuttle 50. The predetermined amount of resistance provided by the ridge 85 acts to separate the lower shuttle 50 from the piston 42 and create an opening therebetween that is required for subsequent regeneration positions. In some embodiments, the ridge 85 may work in concert with the spacers 104, described above. Also in the draw position, the brine cam opens the brine valve (not shown). In the draw position, untreated water U enters the inlet 18, flows through the central opening 80 of the lower shuttle 50, and through an opening 108 to the injector assembly 34. The radial step 83 of the lower shuttle 50 may create the opening 108 between the lower shuttle 50 and the seal 100. The flow of the untreated water U through the injector assembly may create a vacuum that pulls brine solution, or another regenerant, from the brine tank 14 and mixes the brine solution with the untreated water U flow through the injector, as indicated by arrow B. The brine mixture B flows through the valve body 30, to the opening 26 at the top of the resin tank 12. The brine mixture B then flows down through the media to regenerate the resin bed 24. Once the brine mixture B reaches the bottom of the resin tank 12, the brine mixture B flows up the distributor tube 28, through the valve body 30 and out to the drain 22. Similar to the backwash position, the cylindrical body 86 of the upper shuttle 48 may engage the spacer 102 to close the service outlet 20 in the draw position, thereby inhibiting water from flowing to the service outlet 20. Also, in the draw position, a pressure differential on the upper shuttle 48 may cause the upper shuttle 48 to engage the first end 60 of the piston 42, thereby keeping the upper shuttle 48 sealed against the piston 42.

Figure 6:
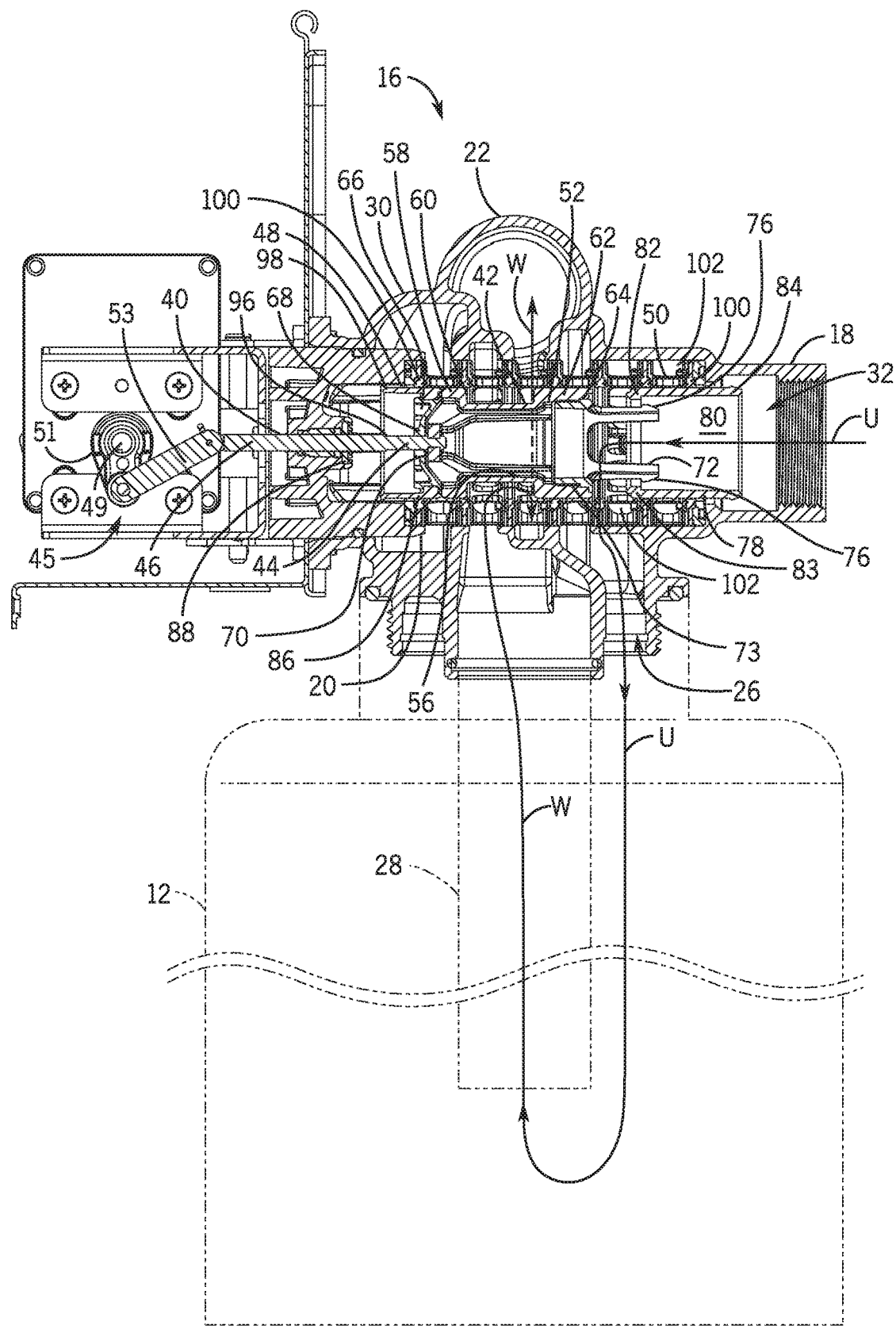
FIG. 6 is a cross-sectional view of the control valve of FIG. 2 during a rinse cycle.
Figure 8:
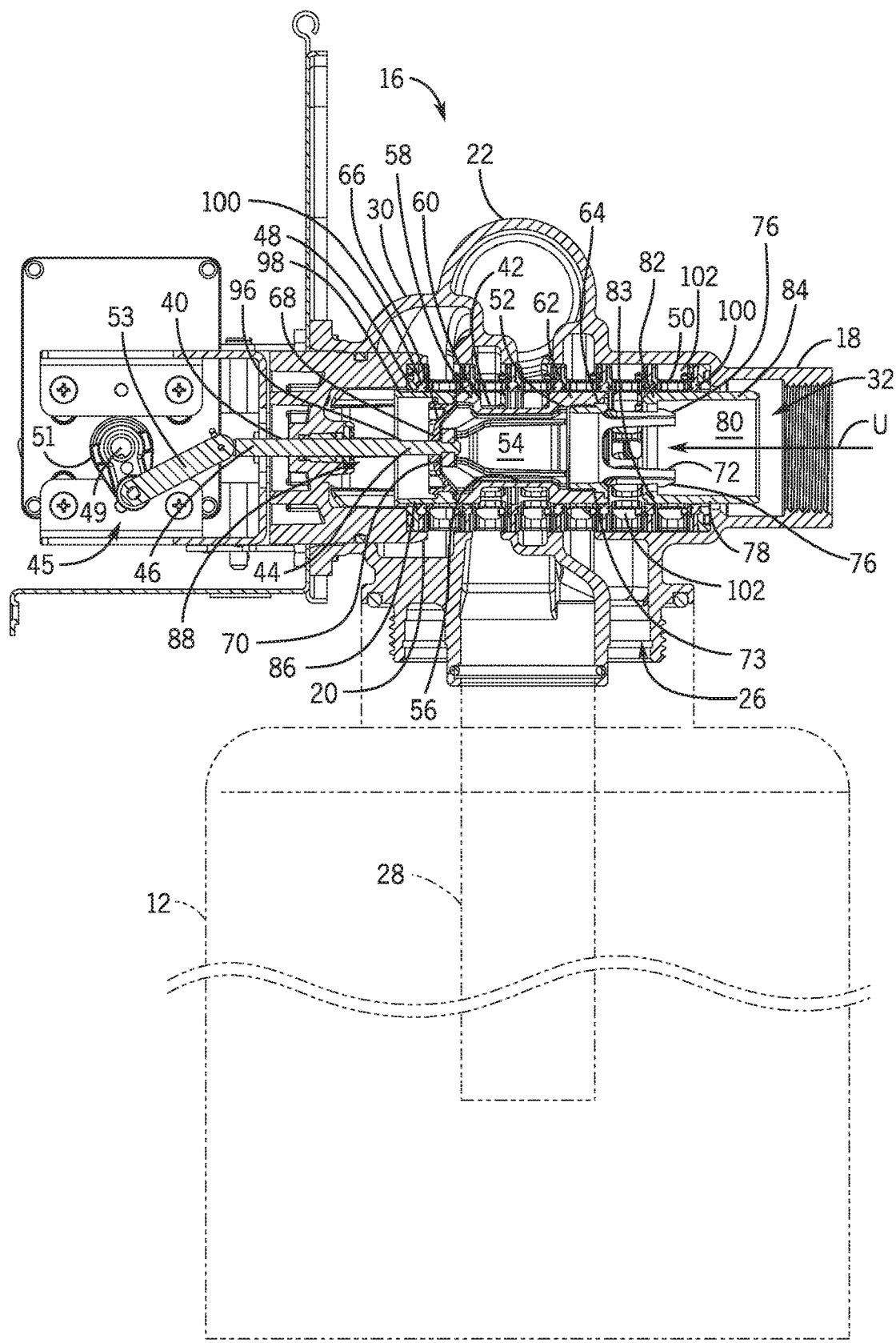
FIG. 8 is a cross-sectional view of the control valve of FIG. 2 during a standby cycle.
Figure 9:
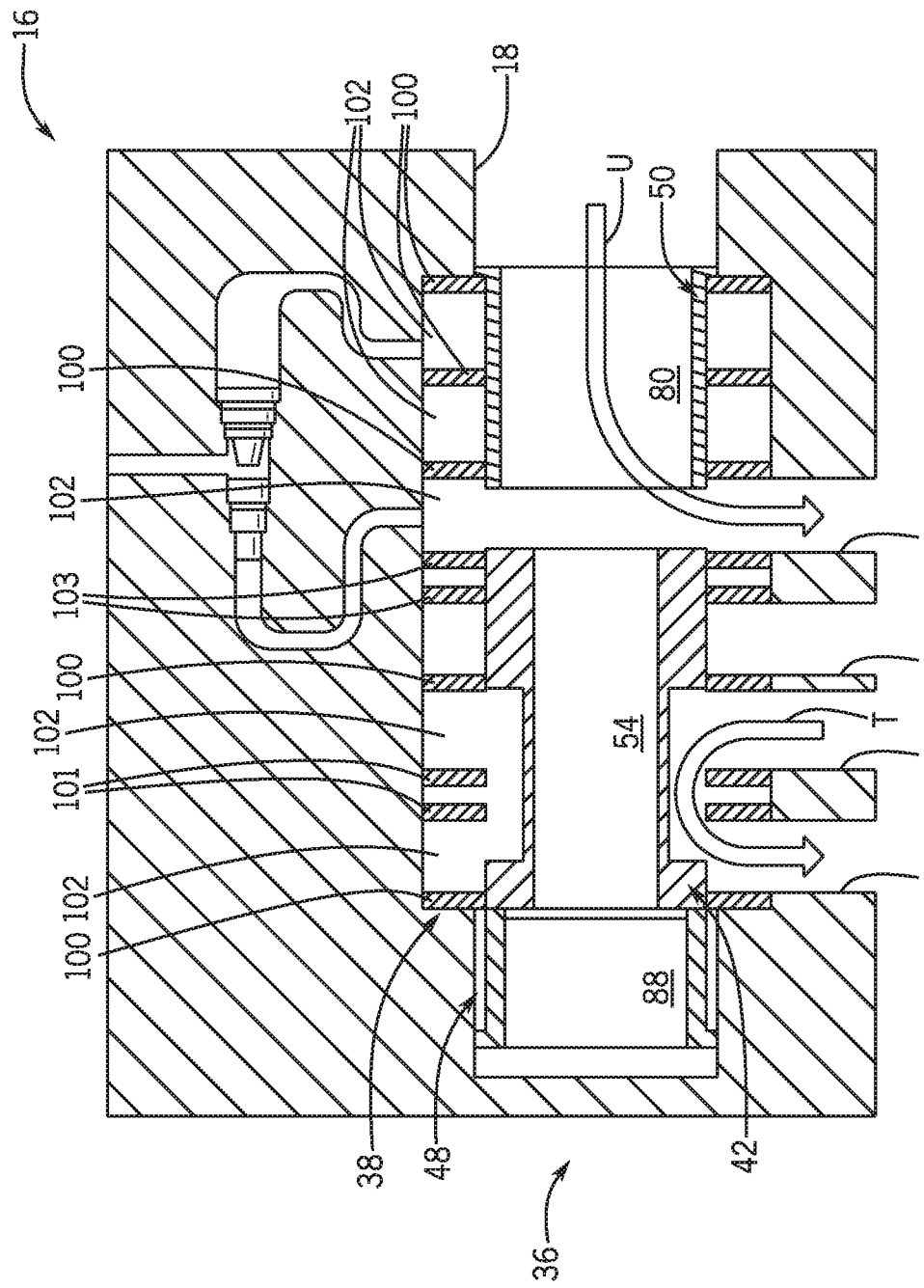
FIG. 9 is a cross-sectional view of the control valve of FIG. 2 including a first and second set of double seals during a service cycle.
Figure 10:
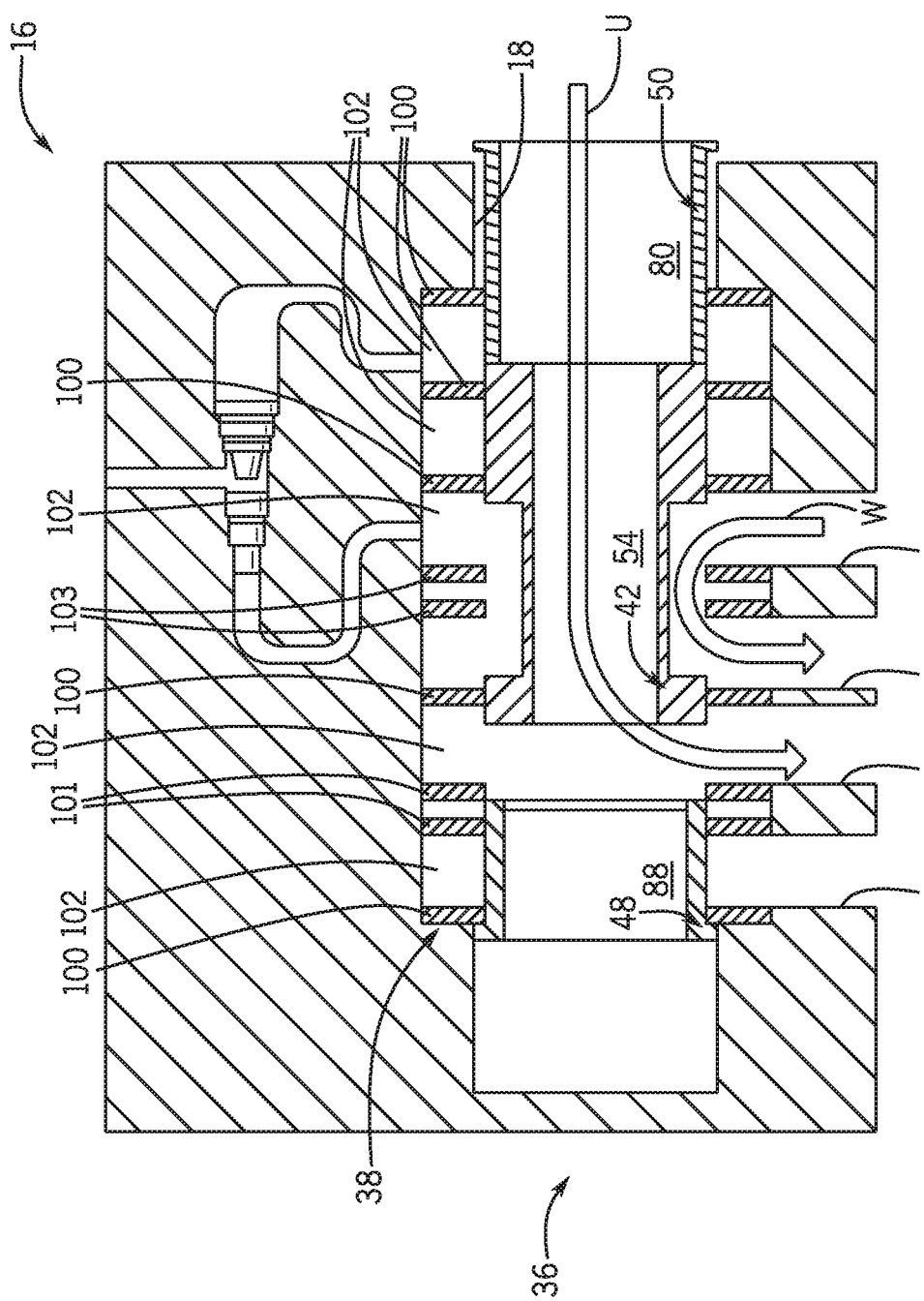
FIG. 10 is a cross-sectional view of the control valve of FIG. 2 including the first and second set of double seals during a backwash cycle.
Figure 11:
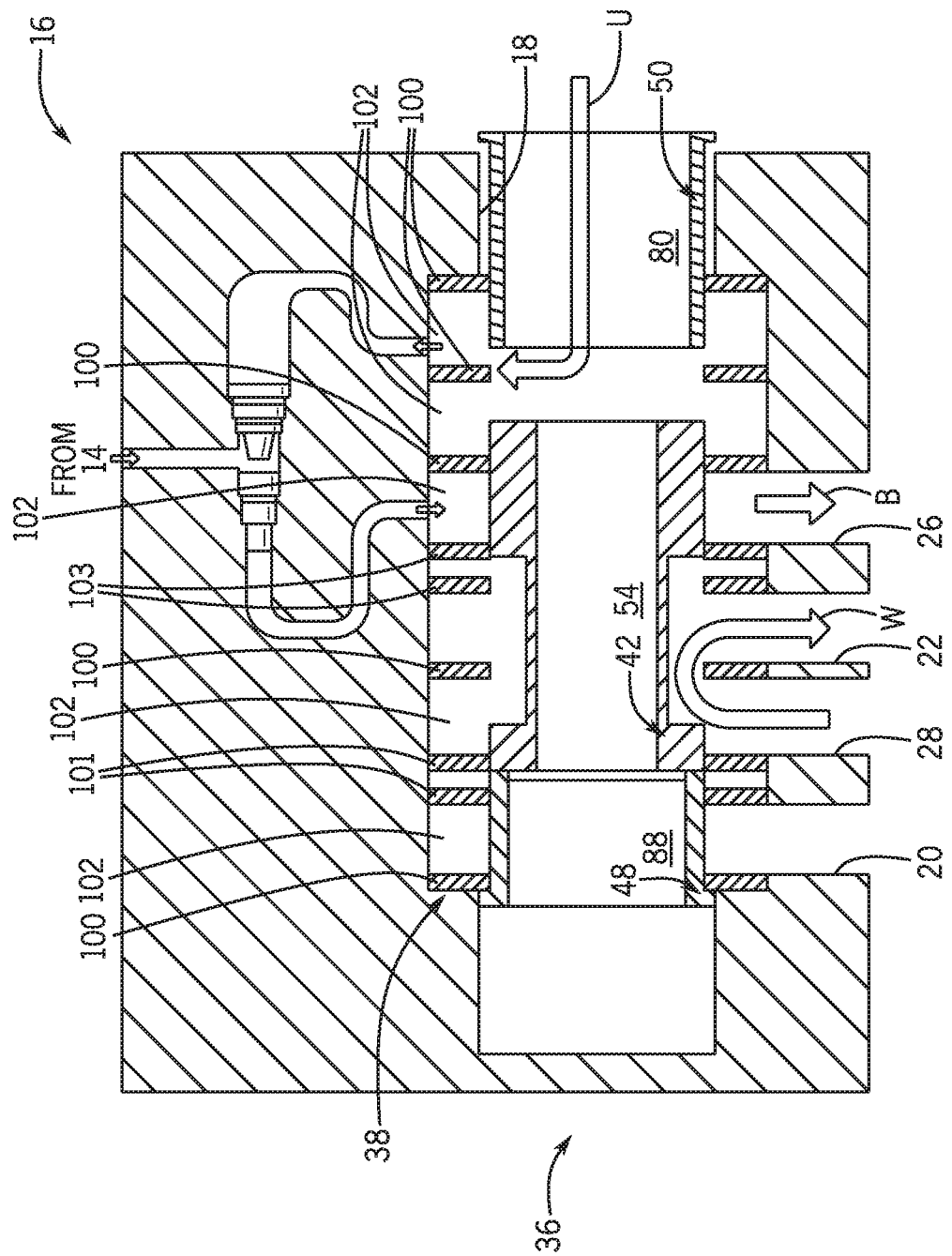
FIG. 11 is a cross-sectional view of the control valve of FIG. 2 including the first and second set of double seals during a draw cycle.
Figure 12:
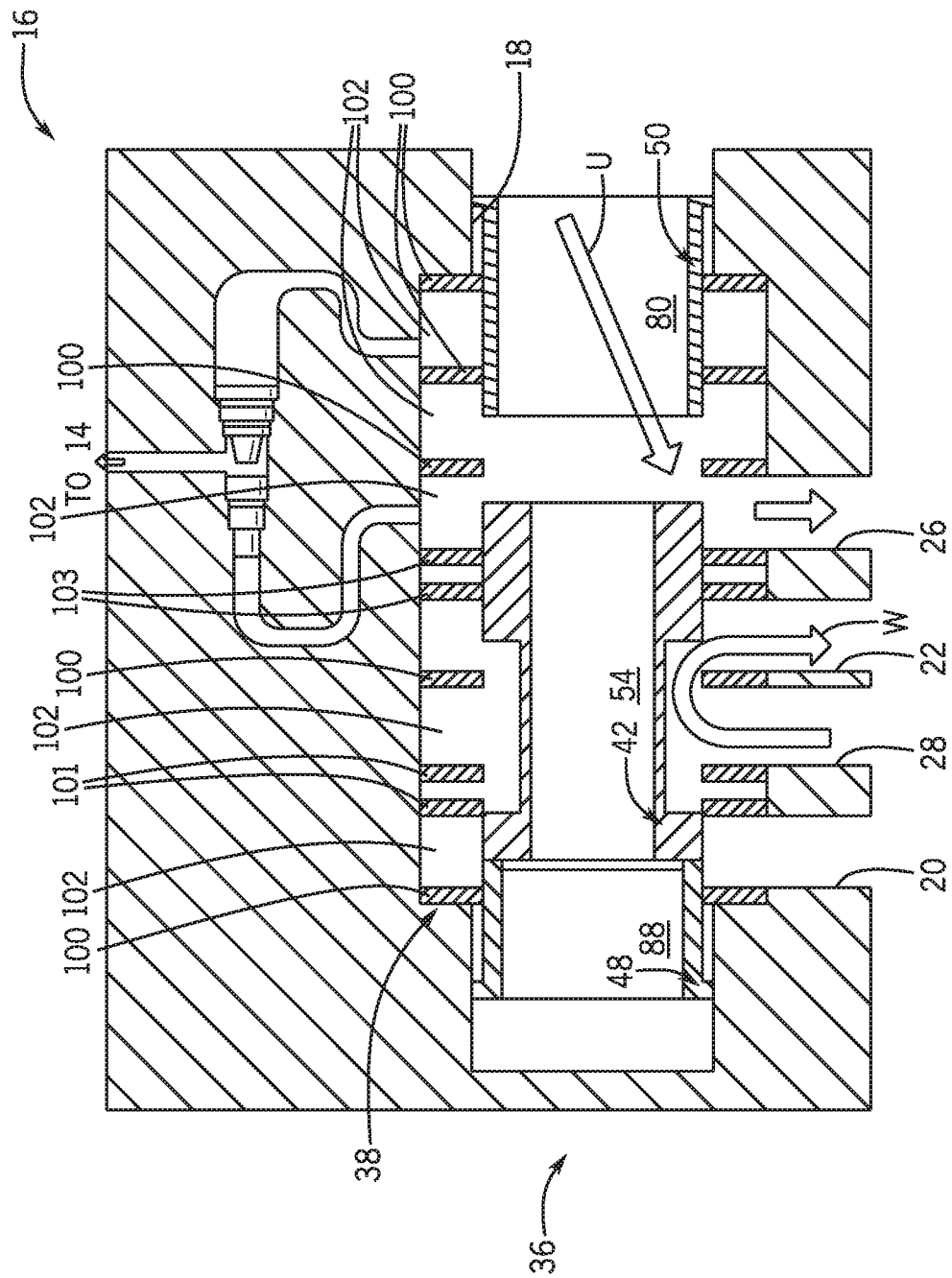
FIG. 12 is a cross-sectional view of the control valve of FIG. 2 including the first and second set of double seals during a rinse cycle.
Figure 13:
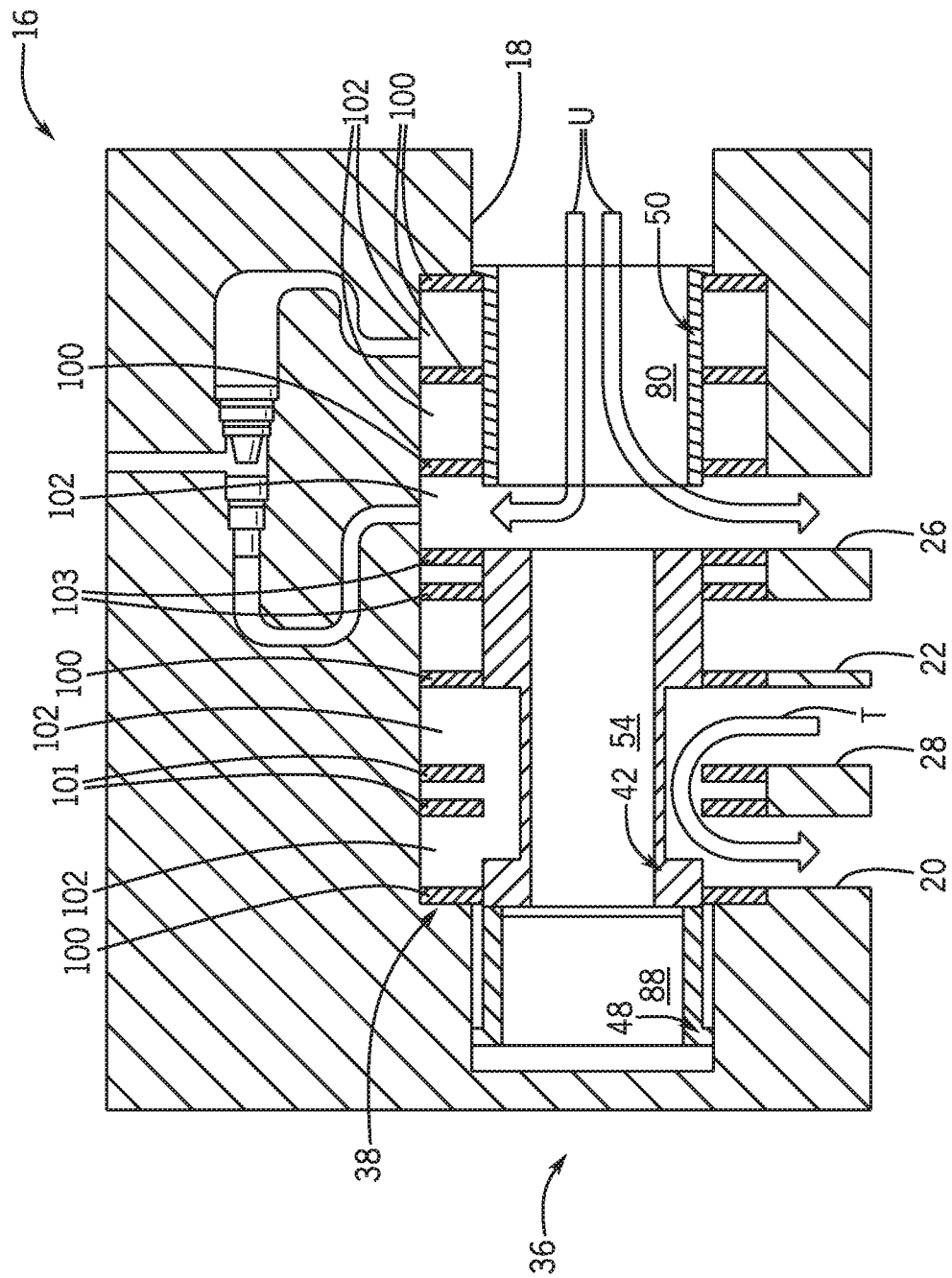
FIG. 13 is a cross-sectional view of the control valve of FIG. 2 including the first and second set of double seals during a fill cycle.
Figure 14:
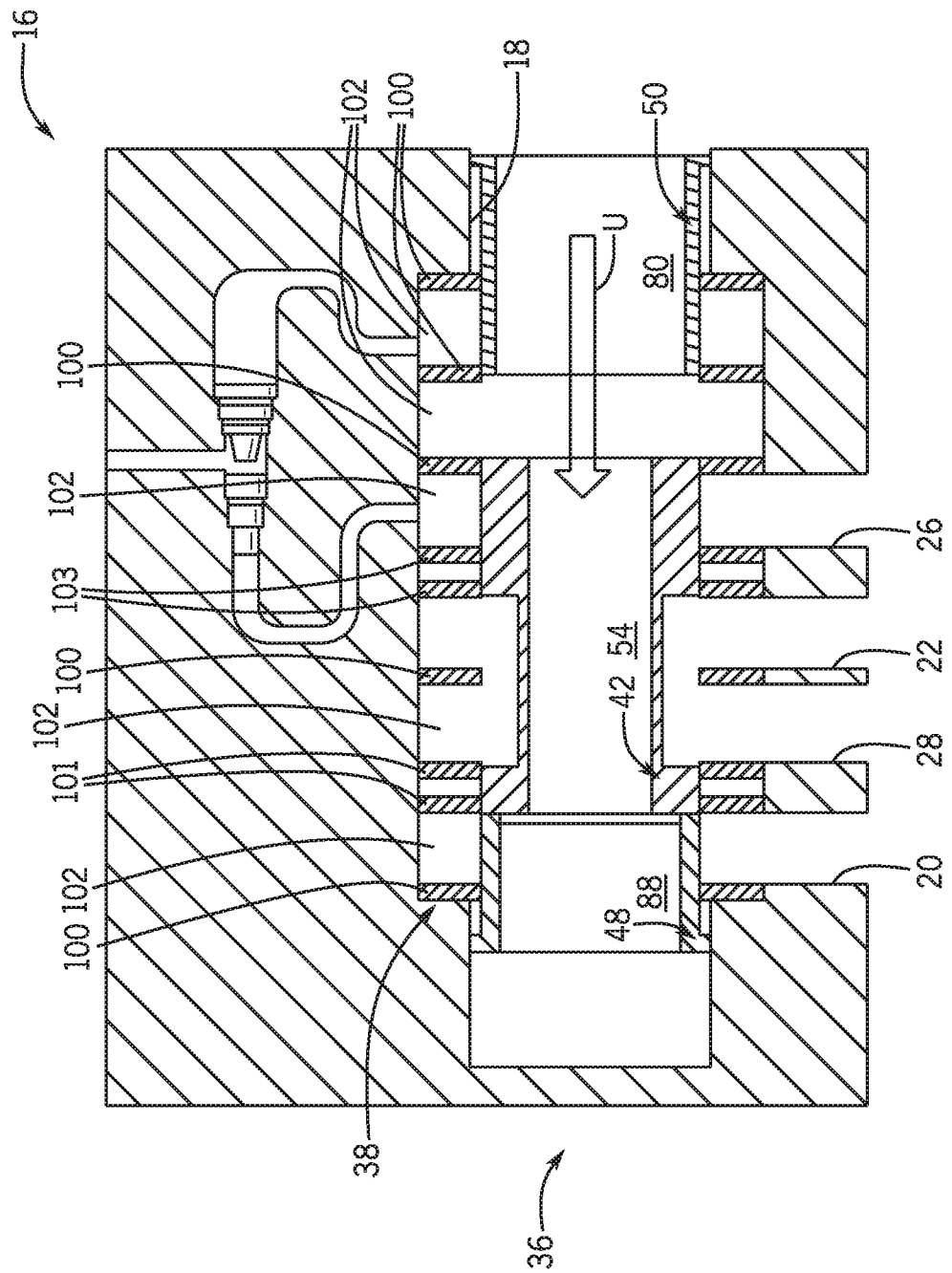
FIG. 14 is a cross-sectional view of the control valve of FIG. 2 including the first and second set of double seals during a standby cycle.

After the draw cycle, the drive assembly 45 causes the piston assembly 36 to move to a rinse position, as shown in FIG. 6. As the eccentric cam 51 is rotated, the piston assembly 36 initially moves past a standby position, as shown in FIG. 8 and as will be described in further detail below. In the rinse position, a stream of untreated water U enters the inlet 18, flows through the central opening 80 of the lower shuttle 50, and into the opening 26 in the top of the resin tank 12. The untreated water U flows through the media of the resin bed 24, up the distributor tube 28, through the valve body 30, and out through the drain 22 to remove any remaining brine solution B from the previous draw cycle. Also in the rinse cycle, a portion of the cylindrical body 86 of the upper shuttle 48 and a portion of the first circumferential flange 58 of the piston 42 may engage the spacer 102 to close the service outlet 20 in the rinse position, thereby inhibiting water from flowing to the service outlet 20. A pressure differential on the upper shuttle 48 may cause the upper shuttle 48 to engage the first end 60 of the piston 42, thereby keeping the upper shuttle 48 sealed against the piston 42.

Figure 7:
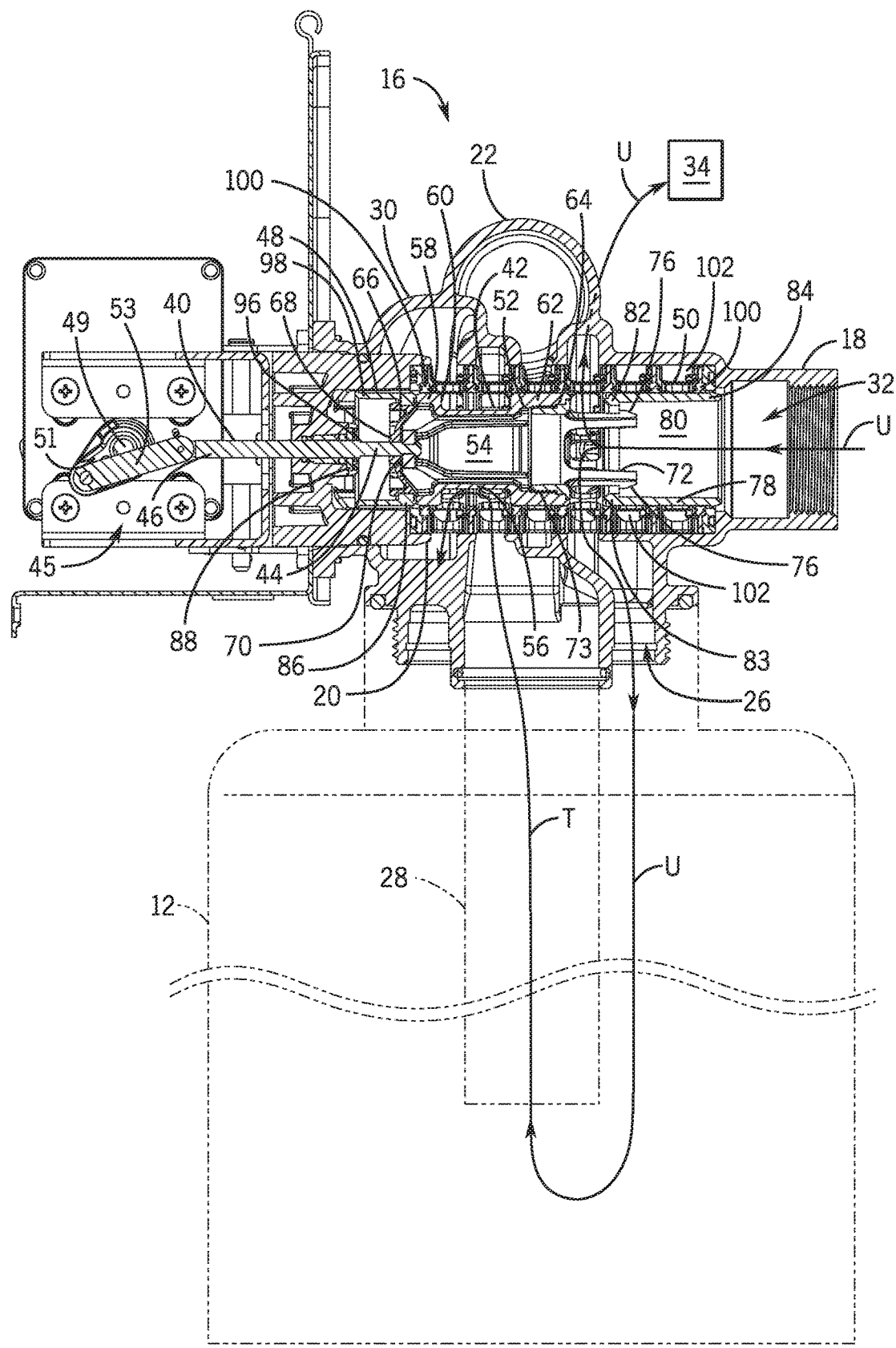
FIG. 7 is a cross-sectional view of the control valve of FIG. 2 during a fill cycle.

After the rinse cycle, the drive assembly 45 causes the piston assembly 36 to move to a fill position, as shown in FIG. 7. When transitioning to the fill position, the lower shuttle 50 translates with the piston 42 due to the engagement of the stops 76 and the rib 82 of the lower shuttle 50. The lower piston 42 and lower shuttle 50 may translate until the rib 84 of the lower shuttle 50 engages the outermost seal 100, which acts as a stop for the piston assembly 36. In the fill position, the brine cam opens the brine valve (not shown) and untreated water U enters the inlet 18, flows through the central opening 80 of the lower shuttle 50, and through the valve body 30 to the injector assembly 34. The untreated water U flows through the injector assembly 34 and out to the brine tank 14. The untreated water U may flow for a set period of time at a regulated flow rate to fill the brine tank 14 with the desired amount of water. Simultaneously, untreated water U enters the inlet 18 and flows to the opening 26 in the top of the resin tank 12 at a throttled flow rate. The untreated water U flows to the bottom of the resin tank 12, which then flows as treated water T up the distributor tube 28. The piston 42 is arranged such that the recess 56 provides fluid communication between the distributor tube 28 and the service outlet 42. Thus, the treated water T is allowed to flow from the distributor tube 28 past the recess 56 and to the service outlet 20.

After the fill cycle, the drive assembly 45 causes the piston assembly 36 to move to a standby position, as shown in FIG. 8. In the standby position, pressure at the inlet 18 deadheads to inhibit the flow of water through the valve body 30 until the system controller calls for the water softener system 10 to re-enter service. As shown in FIG. 8, a portion of the cylindrical body 86 of the upper shuttle 48 and a portion of the first circumferential flange 58 of the piston 42 may engage the spacer 102 to close the service outlet 20 thereby inhibiting water from flowing to the service outlet 20. A pressure differential on the upper shuttle 48 may cause the upper shuttle 48 to engage the first end 60 of the piston 42, thereby keeping the upper shuttle 48 sealed against the piston 42. In addition, the second circumferential flange 62 of the piston 42 may engage the spacer 102 near the opening 26 of the resin tank 12 to inhibit water flow there through, and the cylindrical body 78 of the lower shuttle 50 may inhibit water flow through the injector assembly 34 and to the brine tank 14. Thus, flow is inhibited through the valve body 30 in the standby position.

After the standby cycle, the drive assembly 45 causes the piston assembly 36 to move again to the rinse position, as shown in FIG. 6. As previously described, during the rinse cycle, any "stale" water from the resin tank 12 is flushed prior to entering the service cycle. After the rinse cycle, the drive assembly 45 rotates the eccentric cam 51 past the fill position and directly to the service position, as shown in FIG. 3.

Turning now to FIGS. 9-14, an alternative embodiment of the seal assembly 38 is shown. The seal assembly 38 is substantially similar to the seal assembly shown in FIGS. 2-8 except, for example, two of the single seals 100 are replaced with a first set of double seals 101 and a second set of double seals 103 positioned between the spacers 102. Thus, the service, backwash, draw, rinse, fill, and standby cycles are similar as shown by the water flow in FIGS. 9, 10, 11, 12, 13, and 14, respectively. Furthermore, an additional spacer 102 is positioned proximate the lower shuttle 50. The upper shuttle 48 and the lower shuttle 50 can define annular lips about an end to provide additional sealing with respective adjacent seals 100. Opposite ends of the lower shuttle 50 can be chamfered to provide for a small pressure relief leak between similarly chamfered mating ends of the piston 42. This feature can help ensure that the lower shuttle 50 separates properly from the piston 42 during, for example, the regeneration cycle, described above. This seal assembly 38 including the first and second sets of double seals 101 and 103 may increase a positional tolerance of the valve and enables the valve to handle larger pressure and flow rates that may be used in larger commercial valve applications, for example.

Figure 15A:
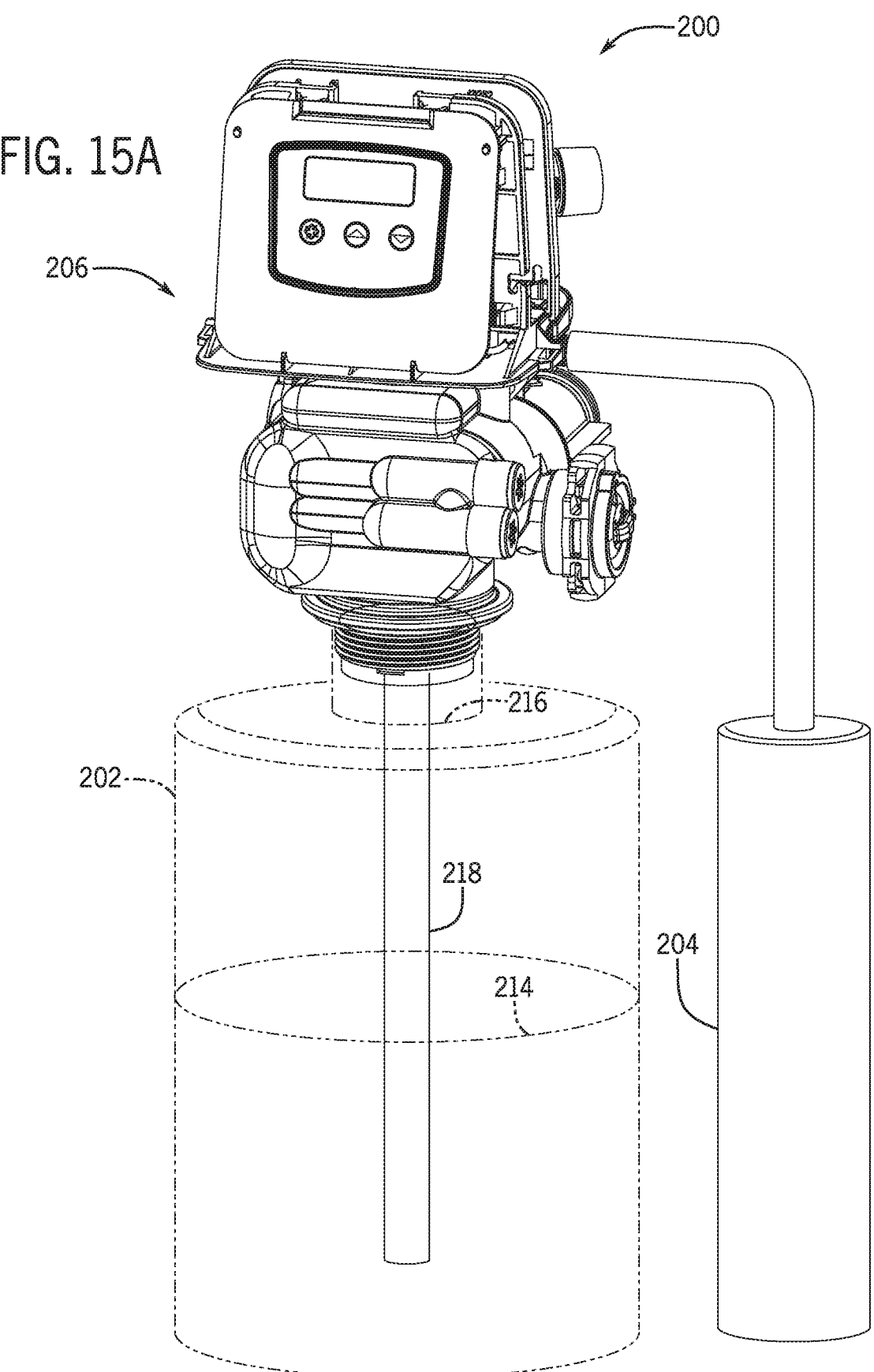
FIG. 15A is a front perspective view of a water softener according to one embodiment of the invention.
Figure 15B:
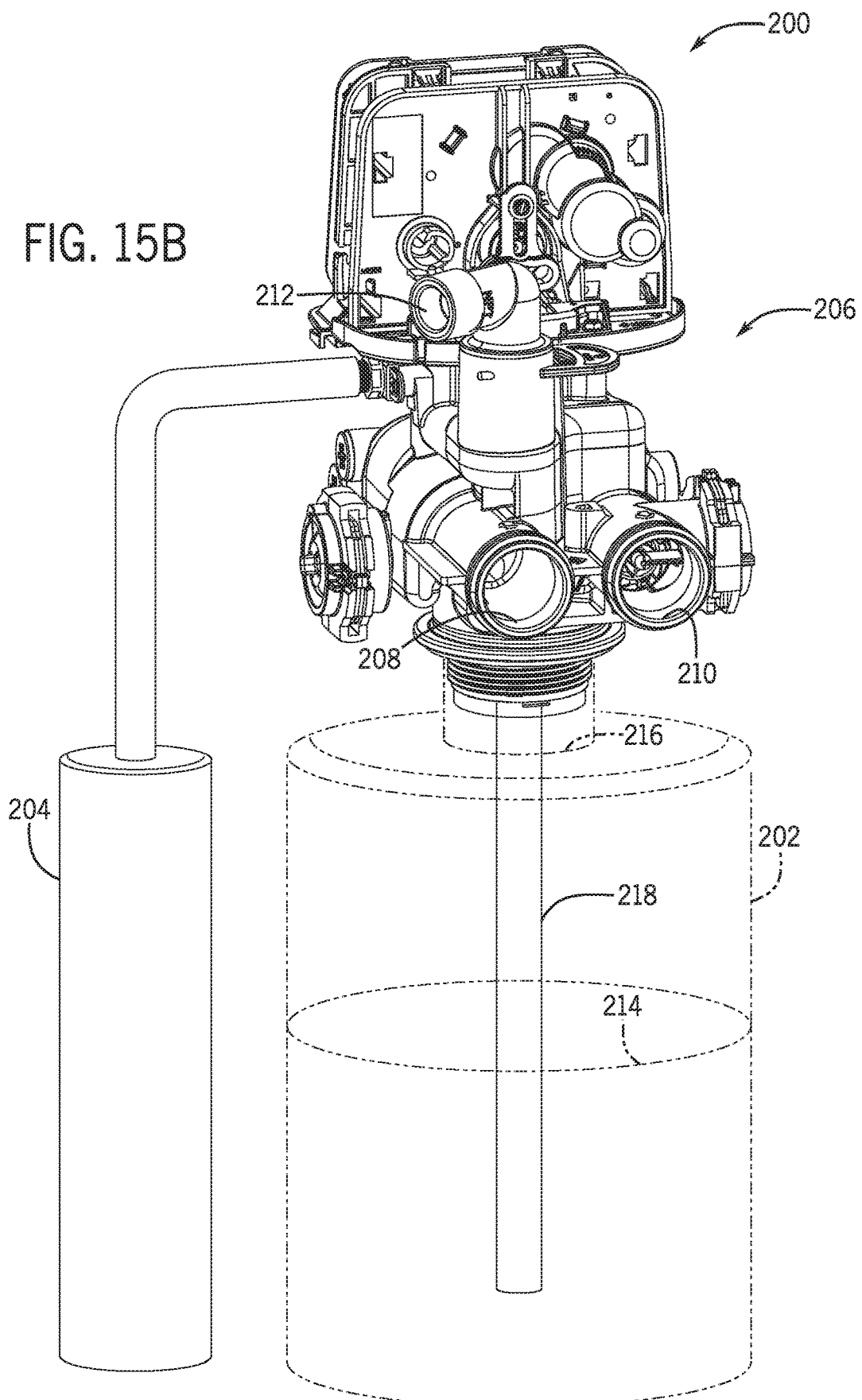
FIG. 15B is a rear perspective view of the water softener system of FIG. 15A.

FIGS. 15A and 15B illustrate a water softener system 200 according to another embodiment of the invention. The water softener system 200 can include a resin tank 202, a brine tank 204, and a control valve 206 attached to the top of the resin tank 202. When placed in service, the control valve 206 is fluidly coupled to the resin tank 202, the brine tank 204, an inlet 208 leading to a source of untreated water, an outlet 210 leading to a treated water line, and a drain 212. The resin tank 202 is filled with a treatment medium, such as an ion exchange resin bed 214, and the brine tank 204 contains particles of sodium chloride, potassium permanganate, or another suitable regeneration medium which can be dissolved by water to form a brine or regenerant solution. In operation, as incoming hard water enters the resin tank 202 through an opening 216 in the top of the resin tank 202, the water in the resin tank is forced through the resin bed 214 and out a distributor tube 218 extending through the center of the resin bed 214. The capacity of the resin bed 214 to exchange ions with the minerals and impurities in the incoming hard water is finite, and depends on the treatment capacity of the resin bed 214 as typically measured in kilograms of hardness or grams of $CaCO_3$ and the hardness of the incoming water as typically measured in grains per gallon. To regenerate the resin bed 214 once its treating capacity has been depleted, the resin bed 214 is flushed with the regenerant solution from the brine tank 204 so that the minerals and other impurities can be released from the resin bed 214 and carried out of the resin tank 202. All of these operations, as well as backwash, rinse, and standby operations, are controlled by the water softener control valve 206.

Figure 16:
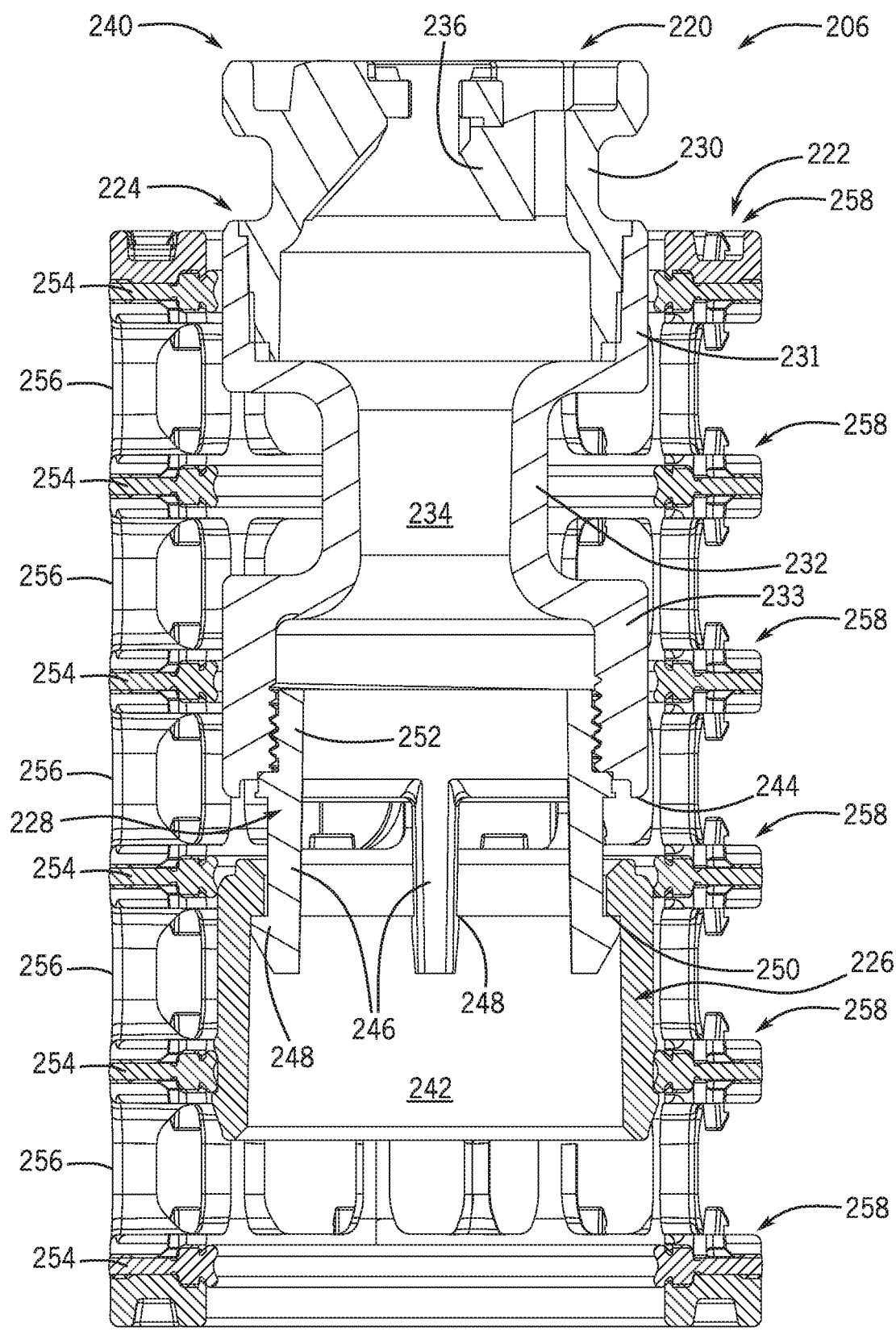
FIG. 16 is a partial cross-sectional view of another control valve illustrating another piston assembly and another seal assembly operable with the water softener of FIG. 15A.

As shown in FIG. 16, the control valve 206 includes a piston assembly 220 slidably received within a seal assembly 222. The piston assembly 220 includes a main piston 224, a shuttle piston 226, and a coupling feature 228. The main piston 224 defines a generally cylindrical, hollow body that includes an upper recess 230 and a lower recess 232 formed therein. A first flange 231 is arranged between the upper recess 230 and the lower recess 232, and a second flange 233 is arranged below the lower recess 232. The upper recess 230, the lower recess 232, the first flange 231, and the second flange 233 may be positioned to permit or inhibit fluid flow between the inlet 208, the outlet 210, the drain 212, the distributor tube 218, and the opening 216 in the resin tank 202 during operation of the water softener system 200, as will be described below. The main piston 224 includes a central passageway 234 and a coupling aperture 236. The central passageway 234 extends through the interior of the main piston 224 to permit fluid flow therethrough. The coupling aperture 236 is centrally arranged in a first side 240 of the main piston 224. The coupling aperture 236 may be configured to couple the piston assembly 220 to an actuation mechanism.

The shuttle piston 226 defines a generally cylindrical, hollow body that includes central passageway 242 extending through the interior of the shuttle piston 226 to permit fluid flow therethrough. The coupling feature 228 is configured to slidably couple the main piston 224 to the shuttle piston 226 such that the shuttle piston 226 is axially translatable with respect to the main piston 224. That is, the shuttle piston 226 is moveable with respect to the main piston 224 between a first position (FIG. 16) where the shuttle piston 226 is axially displaced from a second side 244 of the main piston 224 and a second position where the shuttle piston 226 engages the second side 244 of the main piston 224 to form a seal therebetween.

The coupling feature 228 includes a plurality of feet 246 that axially extend towards the shuttle piston 226. The plurality of feet 246 may be circumferentially spaced so as to create a plurality of openings through which the fluid can flow. Each of the plurality of feet 246 may include a radially, outwardly projecting stop 248 at a distal end thereof configured to engage an internal flange 250 of the shuttle piston 226. The projecting stops 248 define an axial height that can form between the main piston 224 and the shuttle piston 226 when the shuttle piston 226 is in the first position. The plurality of feet 246 may be coupled to a cylindrical base 252 of the coupling feature 228 having external threads that engage internal threads formed in the main piston 224. In another embodiment, the plurality of feet 246 may be integrally formed with the main piston 224.

The seal assembly 222 may include a plurality of single seals 254 that are axially spaced by a plurality of conventional spacers 256. Each of the plurality of spacers 256 define an external lobe 258 that abuts the respective seal 254 received therein. The external lobes 258 enable the seal assembly 222 to resist water pressure acting on the seal assembly 222 during operation of the water softener system 200. The main piston 224 and the shuttle piston 226 extend through the seal assembly 222 and engage the single seals 254. The main piston 224 and shuttle piston 226 are axially moveable with respect to the seal assembly 222 to permit or inhibit fluid flow between the inlet 208, the outlet 210, the drain 212, the distributor tube 218, and the opening 216 in the resin tank 202 during operation of the water softener system 200, as will be described below.

Figure 17:
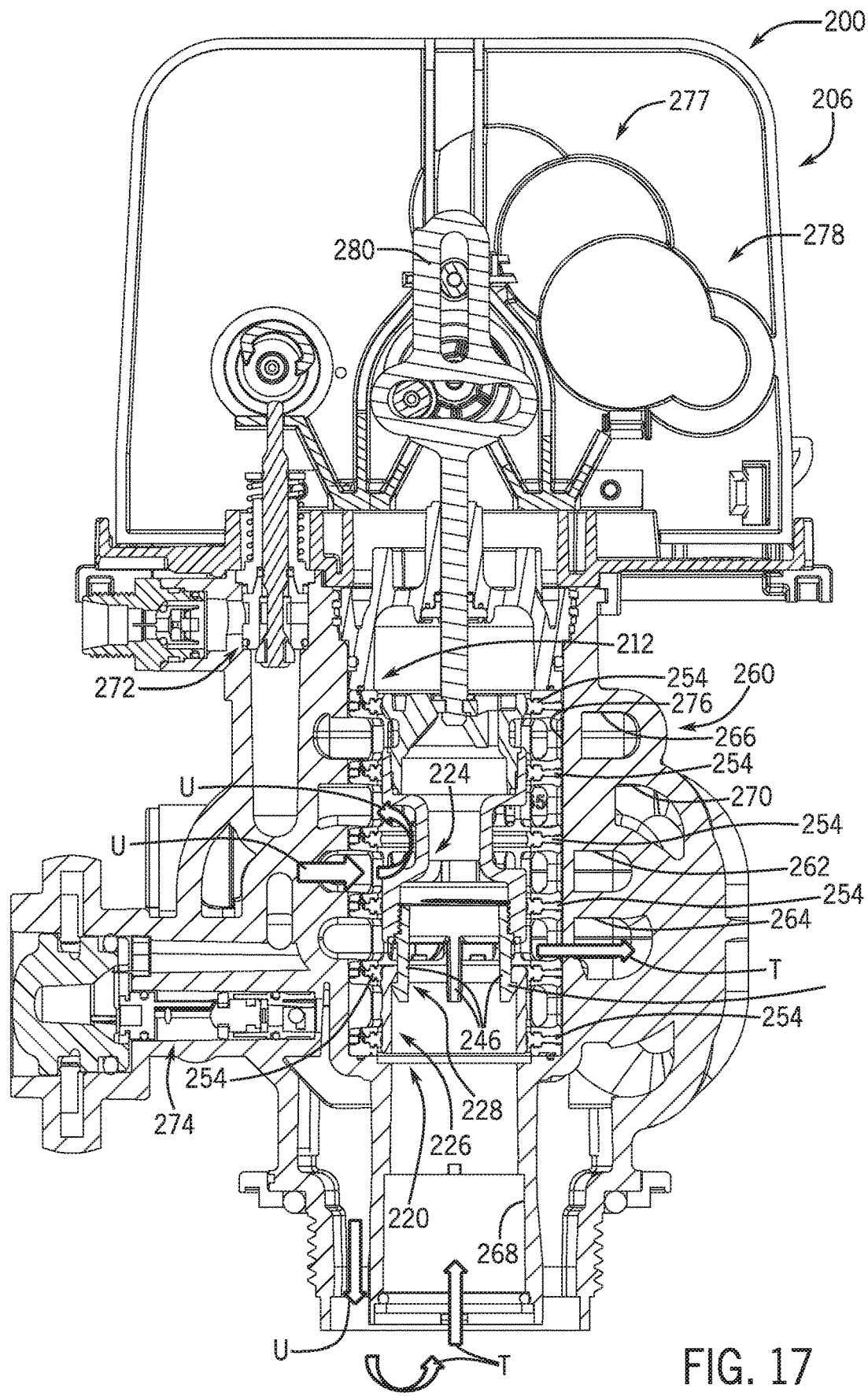
FIG. 17 is a cross-sectional view of the control valve of FIG. 16 during a service cycle.

Turning to FIG. 17, the control valve 206 includes a valve body 260 having a plurality of internal passages in fluid communication with the inlet 208, the outlet 210, the drain 212, the distributor tube 218, and the opening 216 in the resin tank 202. The illustrated valve body 260 includes an inlet passageway 262, an outlet passageway 264, a drain passageway 266, a distributor passageway 268, and a top of tank passageway 270 in fluid communication with the inlet 208, the outlet 210, the drain 212, the distributor tube 218, and the opening 216 in the resin tank 202, respectively. The control valve 206 may further include a brine valve 272 and an injector assembly 274 each arranged at least partially within the valve body 260. The valve body 260 defines a central bore 276 that is dimensioned to receive the seal assembly 222 and thereby the piston assembly 220. When the seal assembly 222 is assembled into the central bore 276, the external lobes 258 of the seal assembly 222 can be compressed in the central bore 276. Vertical/axial compressive forces act on the external lobes 258 and thereby on individual seals 254, and can cause the seals 254 to deform radially to the inside against the piston assembly 220 and to the outside against the central bore 276 of the control valve body 260, thus inhibiting water leakage.

A drive mechanism 277 may be configured to control an axial position of the piston assembly 200 within the control valve 206. In the illustrated example, the drive mechanism may be in the form of a gear train 278 that is coupled to an actuation member 280. A distal end of the actuation member 280 is received within the coupling aperture 236 of the main piston 224 thereby coupling the piston assembly 220 to the drive mechanism 277. In operation, the drive mechanism 277 is configured to axially translate the piston assembly 220 with respect to the seal assembly 222. It should be appreciated that the use of the gear train 278 and the actuation member 280 is not meant to be limiting in any way and, in other embodiments, the piston assembly 220 may be displaced axially with respect to the seal assembly 222 using, for example, a linear actuator, a step motor, a servo motor, and the like.

The operation of the water softener system 200 will be described with reference to FIGS. 17-22 by way of one or more non-limiting examples. Referring to FIG. 17, the control valve 206 is shown in a service position in which drive mechanism 277 positions the main piston 224 to inhibit fluid flow into the drain passageway 266 and the second side 244 of the main piston 224 is axially spaced from the shuttle piston 226 to enable fluid flow therebetween. During the service position, untreated water, as indicated by arrow U, enters the control valve 206 through the inlet passageway 262. The main piston 224 diverts the untreated water past the lower recess 232 of the main piston 224 to the top of tank passageway 270 and thereby to the top of the resin tank 202 to be treated. From the bottom of the resin tank 202, the now treated water, as indicated by arrow T, flows up through the distributor tube 218 to the distributor passageway 268. Since main piston 224 blocks the drain passageway 266 and the outlet passageway 264 is open between the second side 244 of the main piston 224 and the shuttle piston 226, the treated water is then directed through the outlet passageway 264 and to the outlet 210.

Figure 18:
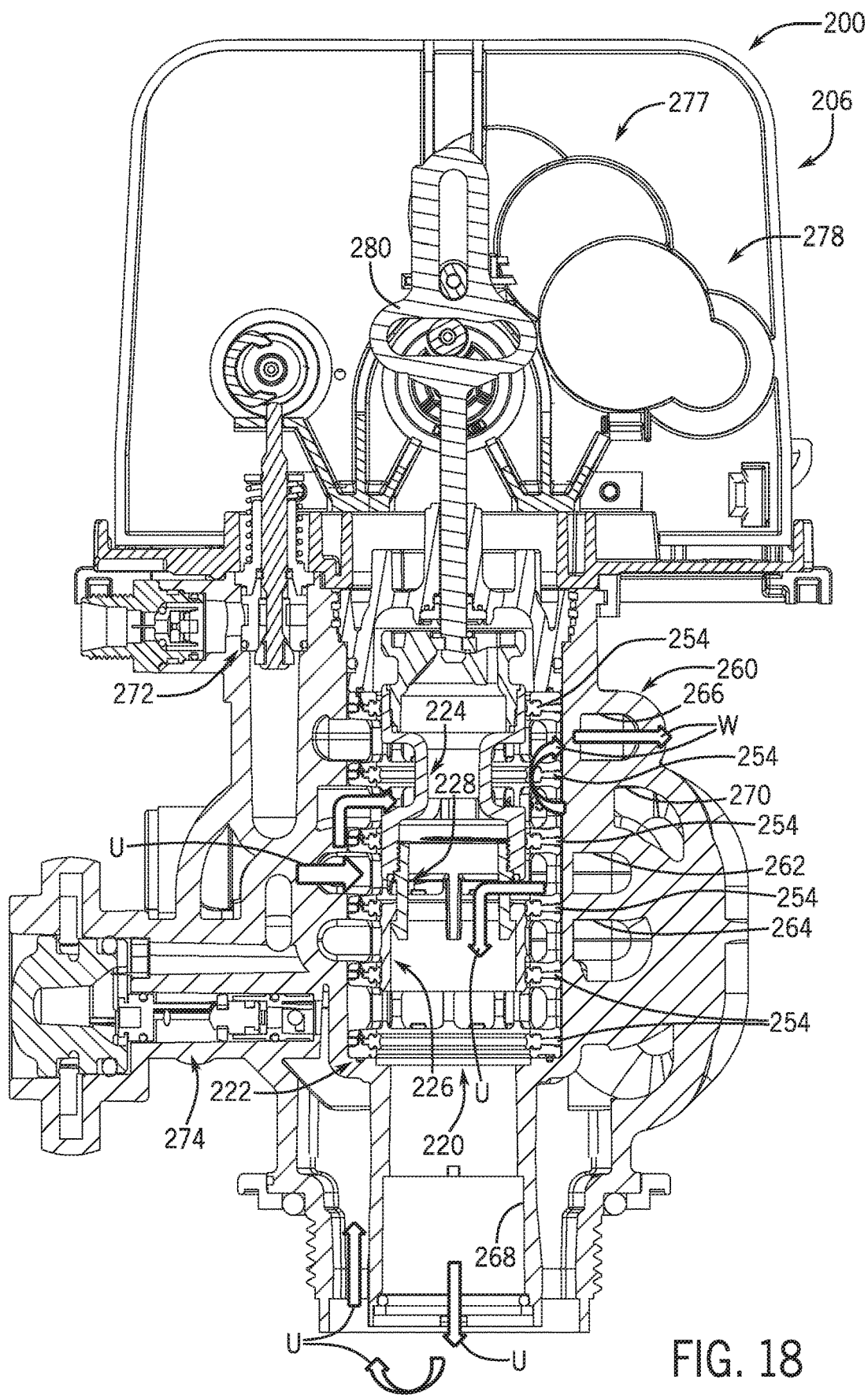
FIG. 18 is a cross-sectional view of the control valve of FIG. 16 during a backwash cycle.

When the water softener system 200 determines that the ion exchange capacity of the resin bed 214 will be exhausted in a designated period, a regeneration cycle may commence. This decision may be based on the time since the last regeneration cycle and/or sensed usage and/or other factors. To begin a regeneration cycle, the control valve 206 moves to a backwash position, as shown in FIG. 18, where drive mechanism 277 moves the main piston 224 upwards. As the main piston 224 moves up, stops 248 engage rib on inside of shuttle piston 226, causing shuttle piston 226 to move with the main piston 224 such that the shuttle piston 226 engages the seals 254 on either side of the outlet passageway 264, to inhibit fluid flow into the outlet passageway 264. In the backwash position, untreated water U enters the inlet passageway 262 and the piston assembly 220 directs the untreated water through the axial opening between the second side 244 of the main piston 224 and the shuttle piston 226 and into the distributor passageway 268. The water then travels through the distributor tube 218 to the bottom of the resin tank 202. This raises the resin slightly allowing any debris to be carried up to the top of the resin tank 202 with the water. Resultant waste water W then flows up into the top of tank passageway 270 where the main piston 224 directs the waste water to the drain passageway 266 and out of the drain 212.

Figure 19:
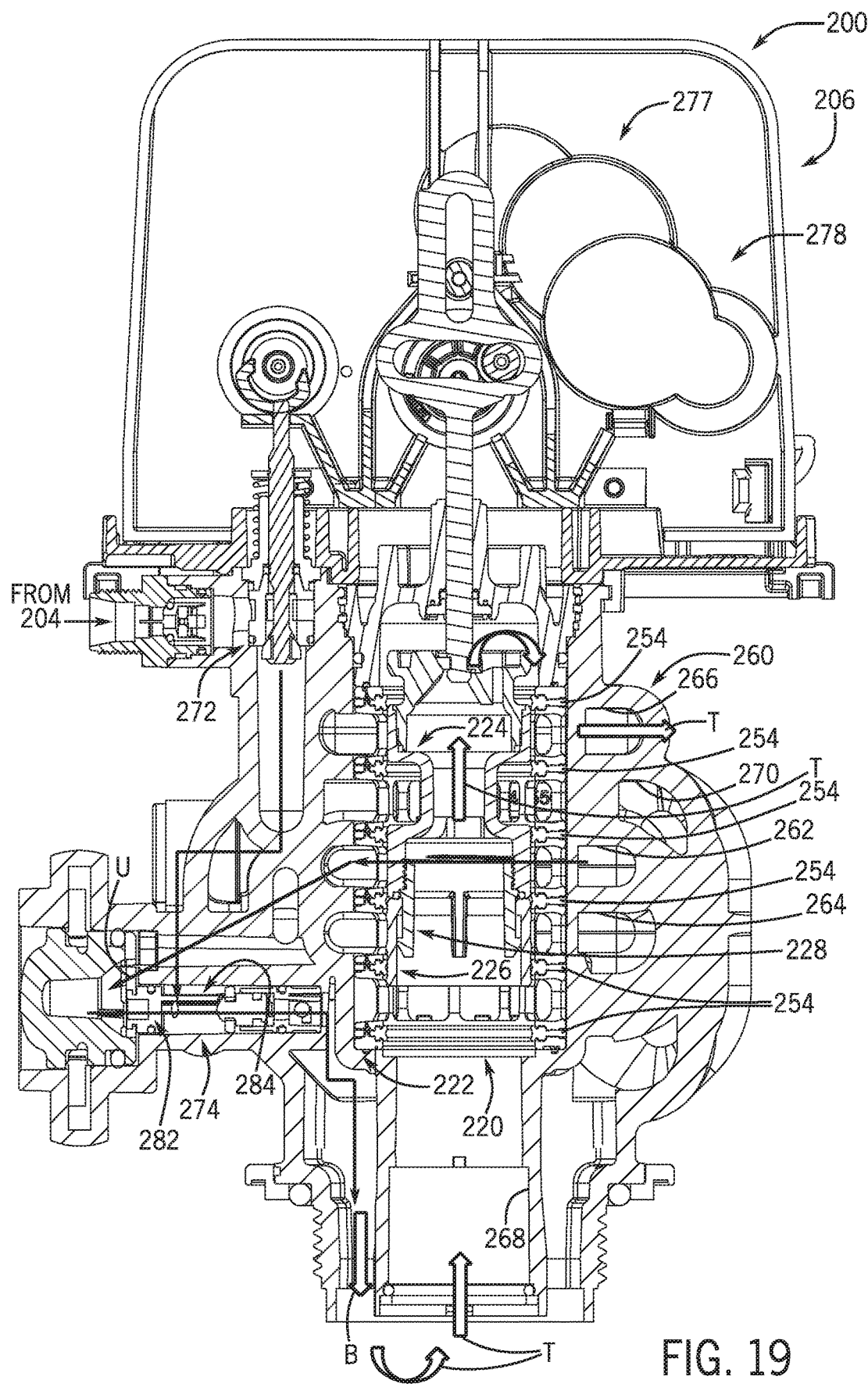
FIG. 19 is a cross-sectional view of the control valve of FIG. 16 during a draw cycle.

After the backwash position, the control valve 206 moves to a draw position, as shown in FIG. 19, where drive mechanism 277 moves the main piston 224 downward until the second side 244 of the main piston 224 contacts the shuttle piston 226 forming a seal therebetween. Since the shuttle piston 226 still engages the seals 254 on either side of the outlet passageway 264 to inhibit fluid flow into the outlet passageway 264. In the draw position, untreated water U enters the control valve 206 from the inlet passageway 262. The main piston 224 and shuttle piston 226 are now blocking fluid flow into the top of tank passageway 270 and the outlet passageway 264 which forces the untreated water through a port that connects the inlet passageway 262 to a nozzle element 282 of the injector assembly 274. A cam, for example, connected to the gear train 278 is now depressing the brine valve 272 which opens a passageway from the brine tank 204 to a venturi 284 within the injector assembly 274. The flow of untreated water through the constriction of the nozzle element 282 creates the venturi 284 drawing brine from the brine tank 204 to mix with the untreated water. The brine mixture B flows through injector assembly 274 and enters the top of tank passageway 270. The brine mixture is then forced into the resin tank 202 and down through the resin where ion exchange can take place regenerating the resin. From the bottom of the resin tank 202, the treated water T travels up through the distributor tube 218 to the distributor passageway 268. From the distributor passageway 268, the main piston 224 and the shuttle piston 226 block all of the passageways except the drain passageway 266. Thus, the treated water is forced to flow through the central passageways 234 and 242 of the main piston 224 and the shuttle piston 226 to the drain passageway 266 and out of the drain 212.

Figure 20:
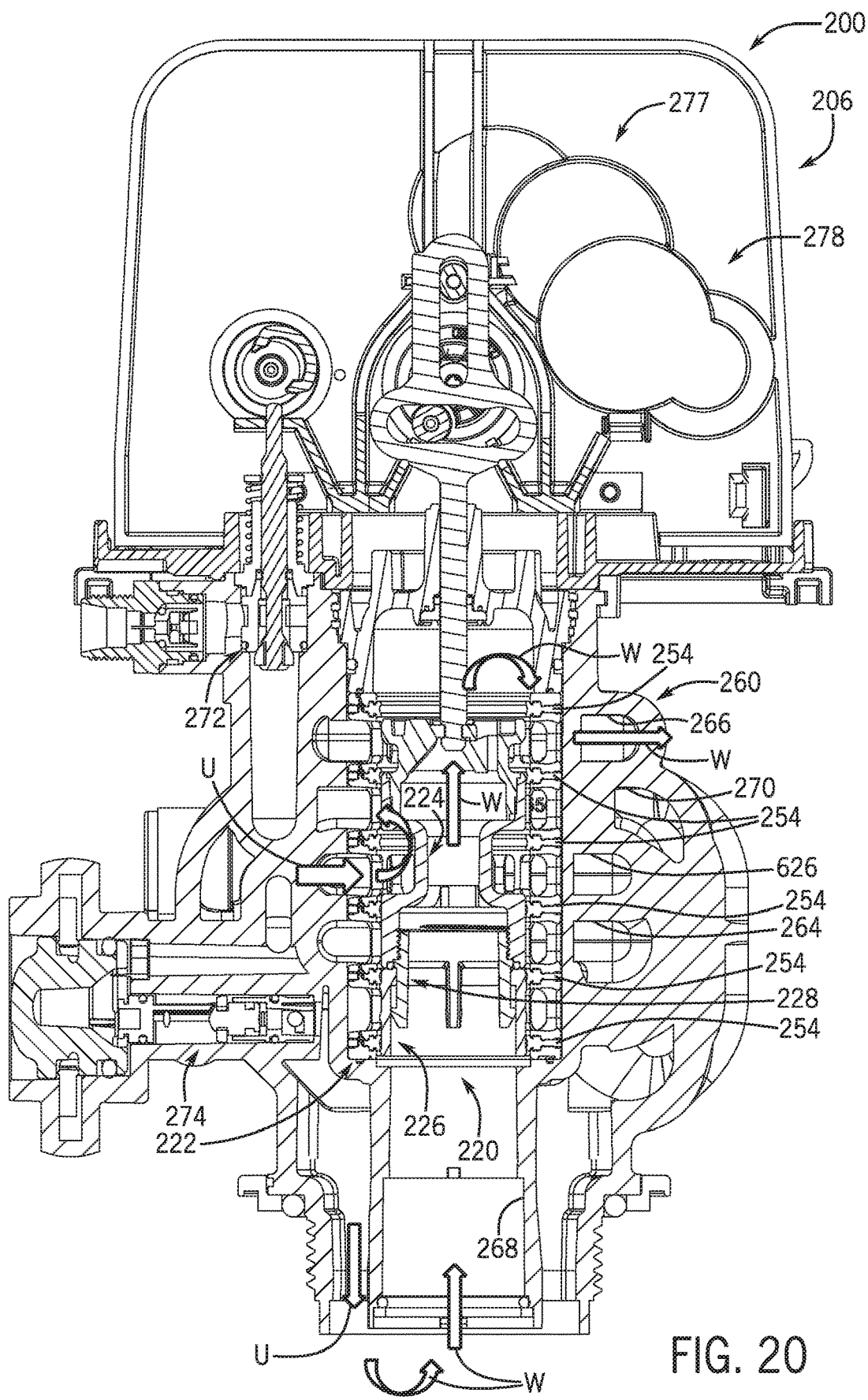
FIG. 20 is a cross-sectional view of the control valve of FIG. 16 during a fill cycle.

After the draw position, the control valve 206 can move to a rinse position, as shown in FIG. 20, where the drive mechanism 277 first moves the main piston 224 up to the top of the stroke bringing the shuttle piston 226 with it. The drive assembly 277 then pushes the main piston 224 down until the second side 244 of the main piston 224 engages the shuttle piston 226 creating a seal therebetween. The drive assembly 277 then pushes both the main piston 224 and the shuttle piston 226 until first side 240 of the main piston 224 opens a channel between the topmost seal 254 and the top side 240 of the main piston 224 thereby permitting fluid flow into the drain passageway 266. Additionally, the shuttle piston 226 engages the seals 254 on either side of the outlet passageway 264 to inhibit fluid flow into the outlet passageway 264. In the rinse position, untreated water U enters the control valve 206 through the inlet passageway 262. The main piston 224 diverts the untreated water to the top of the tank passageway 270 where the untreated water is forced through the resin in the bottom of the resin tank 202 thereby rinsing any residual brine from the resin. The waste water W then travels up the distributor tube 218 into the distributor passageway 268 and into the central passageways 234 and 242 of the main piston 224 and the shuttle piston 226. The waste water can then flow past the first side 240 of the main piston 224 and into the drain passageway 266 and out of the drain 212.

Figure 21:
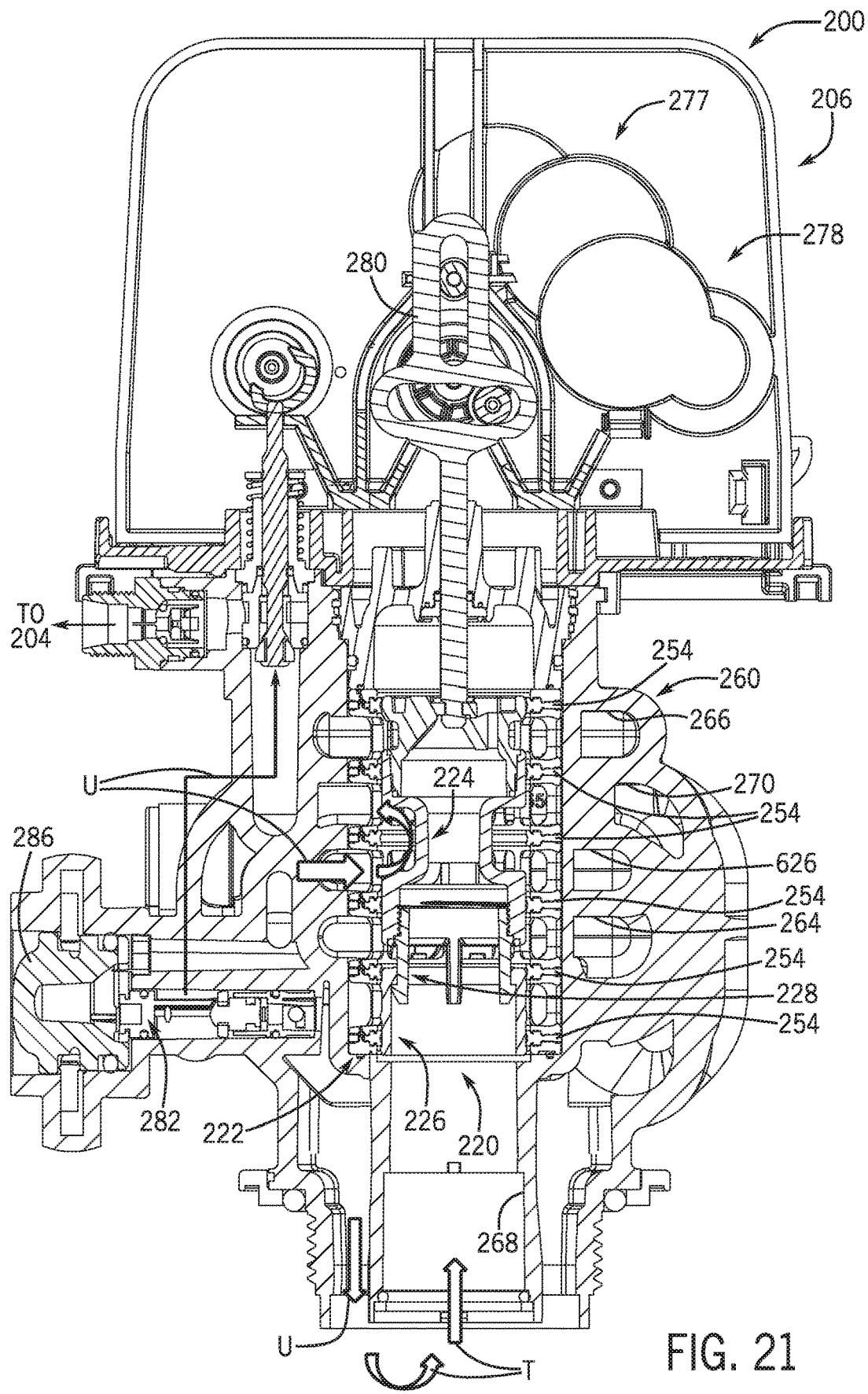
FIG. 21 is a cross-sectional view of the control valve of FIG. 16 during a rinse cycle.
Figure 22:
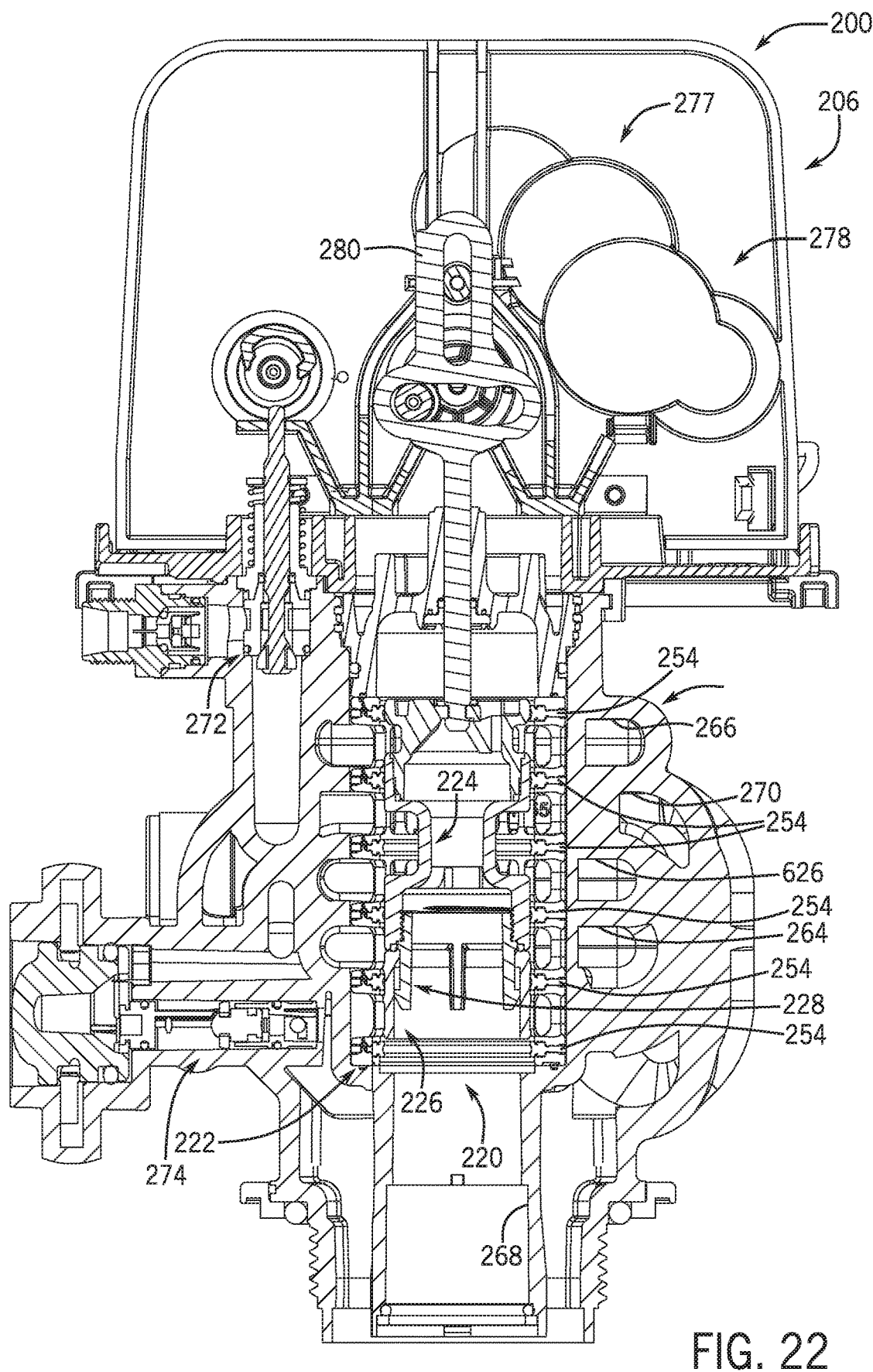
FIG. 22 is a cross-sectional view of the control valve of FIG. 16 during a standby cycle.

After the draw position or the rinse position, the control valve 206 may moves to a refill position, as shown in FIG. 21, where the drive mechanism 277 moves the main piston 224 upward until the upper recess 230 of the main piston 224 aligns with the drain passageway 266 such that the main piston engages the seals 254 on either side of the drain passageway 266 to inhibit fluid flow into the drain passageway 266. The cam, for example, coupled to the drive mechanism 277 will also open the brine valve 272. In the refill position, untreated water U enters the control valve 206 through the inlet passageway 262. The main piston 224 diverts the untreated water to the top of the tank passageway 270 and to the top of the resin tank 202. The water is forced through the resin thereby treating the water. The treated water T flows up through the distributor tube 218 to the distributor passageway 268 and then can travel through the axial/radial opening between the second side 244 of the main piston 224 and the shuttle piston 226 and exit the valve through the outlet passageway 264. Additionally, since the brine valve 272 is open, the untreated water U can flow to the nozzle element 282 of the injector assembly. This untreated water can then flow through the nozzle element 282 and the brine valve 272 to refill the brine tank 204. In one embodiment, a typical cycle is to go from brine draw to rinse. There are, however, situations where refill may be placed in a different order; for instance, refill could follow draw or also could follow rinse or standby.

In some configurations, it may be desirable to inhibit fluid flow to the outlet passageway 264 during refill. In this case, the drive mechanism 277 may perform additional movements to position the second side 244 of the main piston 224 into engagement with the shuttle piston 226 creating a seal therebetween.

In certain type of softener systems with multiple valves, it is necessary for a valve that has just completed a regeneration cycle to wait in standby until other valves are exhausted. In such a standby position, there is no flow into or out of the control valve 206. The standby position described below, may follow the refill position illustrated in FIG. 21. When changing from the refill position to the standby position, the gear train 278 can move the main piston 224 to the top of its stroke and push it back down to the standby position. In particular, the main piston 224 can be moved upwardly and the axial gap between the second side 244 of the main piston 224 and the shuttle piston 226 can open until the projecting stops 248 engage the internal flange 250 of the shuttle piston 226. Once the projecting stops 248 engage the internal flange 250, the shuttle piston travels upward with the main piston 224 as the main piston 224 reaches the top of its stroke. The main piston 224 may then be pushed back down until the second side 244 of the main piston 224 engages the shuttle piston 226 forming a seal therebetween. Both the main piston 224 and the shuttle piston 226 are then continued to be pushed downward to the standby position illustrated in FIG. 22. In the standby position, the main piston 224 and the shuttle piston 226 block the drain passageway 266, the inlet passageway 262, and the outlet passageway 264, which prevent any water from entering or leaving the control valve 206. From the standby position, the control valve 206, for example, may return to the service position illustrated in FIG. 17. To return to the service position, the drive mechanism 277 will cause the main piston 224 to move downward pushing the shuttle piston 226 past the outlet passageway 264. The drive mechanism 277 may then translate the main piston 224 upward to the service position, thereby creating a passage between the main piston 224 and the shuttle piston 226 allowing fluid flow into the outlet passageway 264.

Figure 23:
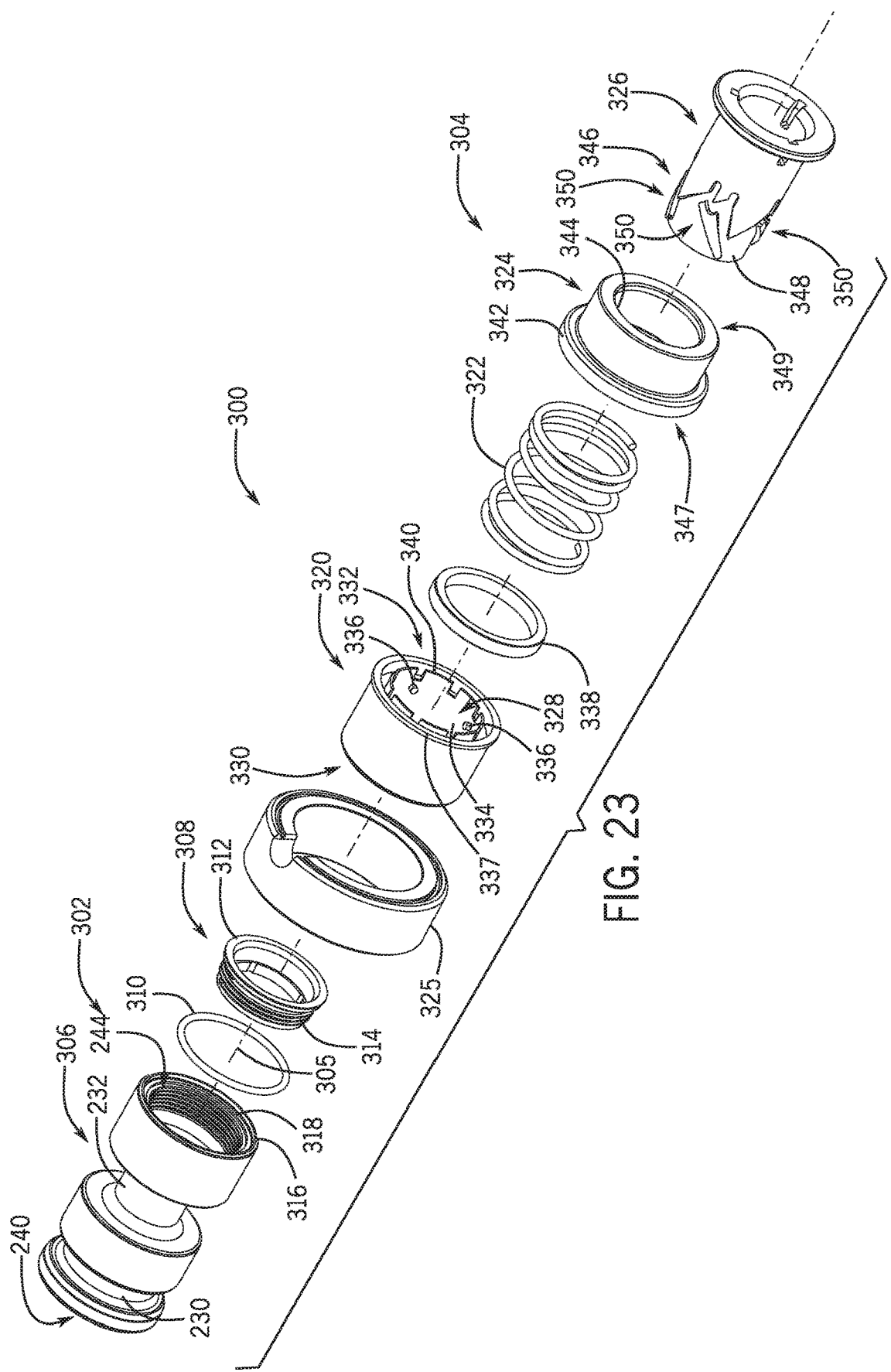
FIG. 23 is an exploded view of a piston assembly operable in a control valve of the water softener system of FIG. 15A according to one embodiment of the present invention.

FIG. 23 illustrates a piston assembly 300 that may be integrated into the control valve 206 of the water softener system 200 according to another embodiment of the invention. The piston assembly 300 includes a main piston assembly 302 and a shuttle piston assembly 304. The main piston assembly 302 and the shuttle piston assembly 304 may share a common center axis 305. The main piston assembly 302 includes a main piston 306, a seal retainer 308, and a seal 310. The main piston 306 may be similar to the main piston 224 of the piston assembly 220 in design and functionality. Similar components between the main piston 306 and the main piston 224 are identified using like reference numerals.

The seal retainer 308 defines a generally annular shape and includes a retainer flange 312, which extends radially outward from an end of the seal retainer 308. The seal retainer 308 includes external threads arranged on an outer surface 314 that extends axially from the retainer flange 312. The external threads are configured to be threaded into internal threads arranged on an inner surface 316 of the main piston 306 to attach the seal retainer 308 to the main piston 306. When assembled, the seal retainer 308 is configured to secure the seal 310 onto the second side 244 of the main piston 306. Specifically, an outer diameter defined by the retainer flange 312 may be sized such that the seal 310 is secured between the retainer flange 312 and a notch 318 formed in the second side 244 of the main piston 306, when the seal retainer 308 is attached to the main piston 306. In the illustrated embodiment, the seal 310 is in the form of an o-ring.

The shuttle piston assembly 304 includes a shuttle piston 320, a biasing element 322, a biasing retainer 324, and a cam tube 326. The shuttle piston 320 defines a generally cylindrical, hollow body that includes a central passageway 328, a first end 330, and an opposing second end 332. The central passageway 328 extends through the interior of the shuttle piston 320 to permit fluid flow therethrough. An interior surface 334 of the shuttle piston 320 includes a plurality of pins 336 extending radially into the central passageway 328. In the illustrated embodiment, the shuttle piston 320 may include four pins 336 that are axially aligned (i.e., arranged on the same axial plane) and spaced circumferentially in approximately 90 degree increments around the interior surface 334. In other embodiments, the shuttle piston 320 may include more or less than four pins 336 equally, or non-equally, spaced circumferentially around the interior surface 334. A shuttle flange 337 extends radially outward from the second end 332 of the shuttle piston 320.

The shuttle piston 320 is configured to receive an output element 338 that may be used to trigger, for example, a Hall Effect sensor such that the position of the shuttle piston 320 may be detected. This information may be provided to a controller (not shown) to provide confirmation of the axial position of the shuttle piston 320 within the control valve 206. The output element 338 may be received, or embedded, within a notch 340 that is recessed axially within the second end 332 of the shuttle piston 320. In the illustrated embodiment, the output element 338 is in the form of a magnetic ring dimensioned to be received within the notch 340.

The biasing retainer 324 defines a generally cylindrical, hollow body that includes a first flange 342 and a second flange 344. The first flange 342 extends radially outward from a first end 347 of the biasing retainer 324. The first flange 342 is dimensioned to engage a structure within the control valve 206 to inhibit axial displacement of the biasing retainer 324. The second flange 344 extends radially inward from a second end 349 of the biasing retainer 324. The second flange 344 is dimensioned to engage the biasing element 322 and to provide a surface from which the biasing element 322 may extend from toward the shuttle piston 320. The biasing element 322 is configured to be arranged between the biasing retainer 324 and the shuttle piston 320, and to provide a biasing force on the shuttle piston 320 in an axial direction toward the main piston 306. In the illustrated embodiment, the biasing element 322 is engaged between the second flange 344 of the biasing retainer 324, which is axially fixed and provides a base for the biasing element 322 to extend from, to the second end 322 of the shuttle piston 320. In this way, the biasing element 322 is configured to provide a biasing force onto the second end 322 of the shuttle piston 320 in an axial directed toward the main piston 306. The illustrated biasing element 322 is in the form of a spring. In other embodiments, for example, the biasing element 322 may be in the form of a mechanical linkage, a pre-stressed structure, and the like.

Figure 25:
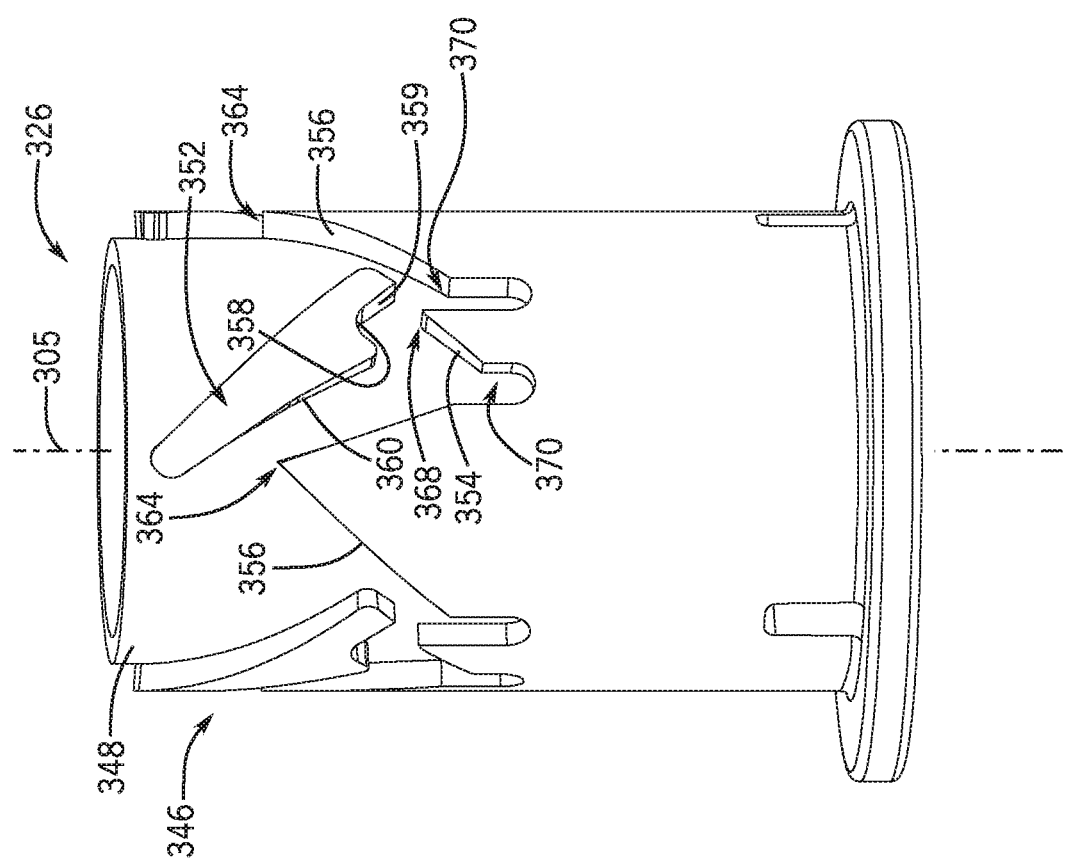
FIG. 25 is a right side view of the cam tube of FIG. 24.
Figure 24:
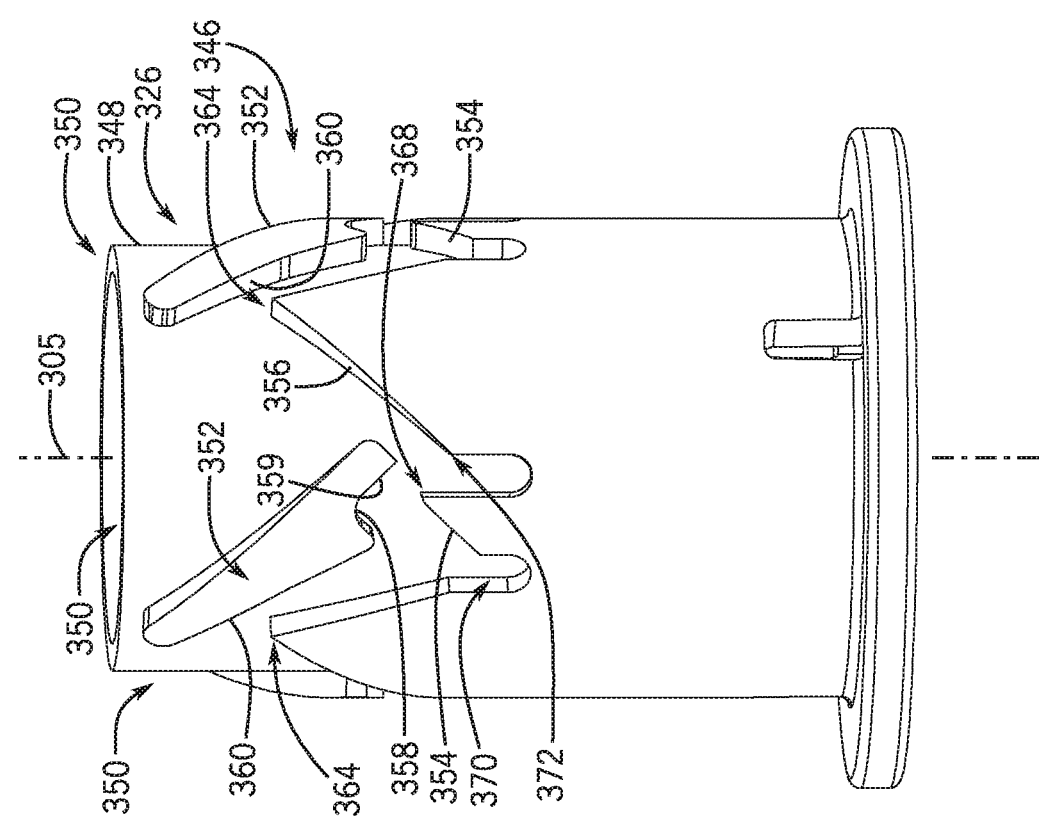
FIG. 24 is a front view of a cam tube of the piston assembly of FIG. 23.

Turning to FIGS. 24 and 25, the cam tube 326 defines a generally cylindrical, hollow tube that includes a camming structure 346 arranged on an outer surface 348 thereof. The cam tube 326 is dimensioned such that the cam tube 326 can extend into and/or through the biasing retainer 324, the biasing element 322, and the shuttle piston 320. The camming structure 346 extends radially outward from the outer surface 348 and may be defined by a plurality of cam sections 350 that are arranged circumferentially around the cam tube 326. In the illustrated embodiment, the cam tube 326 includes four cam sections 350 arranged circumferentially around the outer surface 348 in approximately 90 degree increments. Each of the cam sections 350 are configured to interact with a corresponding one of the pins 336 of the shuttle piston 320 to provide selective latching of the shuttle piston 320, as will be described below. In other embodiments, the cam tube 326 may include more or less that four cam sections 350 arranged circumferentially in any increment about the outer surface 348, and a corresponding number of pins 336 configured to interact with the cam sections 350.

Each of the cam sections 350 may include similar structure with that structure repeating circumferentially around the cam tube 326. The specific structure within each cam section 350 enables the latching and unlatching of the shuttle piston 320 to selectively control an axial position thereof. It should be appreciated that the specific structure within the cam sections 350 is not meant to be limiting in any way, and other structures may be possible to enable the latching and unlatching of the shuttle piston 320.

The cam sections 350 each include cam lobe 352, a first cam surface 354, and a second cam surface 356. The cam lobe 352 includes a pocket 358 and a cam lobe surface 360. The pocket 358 is dimensioned to retain the pin 336 therein and is axially aligned with a portion of the first cam surface 354. The pocket 358 includes a pocket surface 359 that extends circumferentially past the first cam surface 354 and is angled with respect to the center axis 305. In other words, the pocket surface 359 may act as a ramp along which the pin 336 may travel. The cam lobe surface 360 may extend from a side of the pocket 358 opposite the pocket surface 359 and extend circumferentially past a peak 364 of the second cam surface 356 and is angled with respect to the center axis 305. In other words, the cam lobe surface 360 may act as a ramp along which the pin 336 may travel.

The first cam surface 354 extends circumferentially from a peak 368 to an end 370 and is angled with respect to the center axis 305. In this way, the first cam surface 354 may act as a ramp along which the pin 336 may travel. The peak 368 of the first cam surface 354 is axially aligned with at least a portion of the pocket 358 such that the pin 336 engages the first cam surface 354 when it is axially displaced from the pocket 358 toward the first cam surface 354. The end 370 of the first cam surface 354 extends circumferentially past the pocket 358. This ensures that once the pin 336 has traversed the first cam surface 354, the pin 336 engages the cam lobe surface 360 when it is axially displaced from the end 370 of the first cam surface 354 toward the cam lobe 352.

The second cam surface 356 extends circumferentially from the peak 364 to an end 372 and is angled with respect to the center axis 305. In this way, the second cam surface 356 may act as a ramp along which the pin 336 may travel. As described above, the cam lobe surface 360 may extend circumferentially past the peak 364 of the second cam surface 356. This ensures that the peak 364 of the second cam surface 356 is axially aligned with at least a portion of the cam lobe surface 360 such that once the pin 336 has traversed the cam lobe surface 360, the pin 336 engages the second cam surface 356 as it is displaced axially in a direction toward the second cam surface 356. The end 372 of the second cam surface 356 extends circumferentially such that once the pin 336 has traversed the second cam surface 356, the pin 336 engages the pocket surface 359 when it is displaced in a direction toward the pocket 358.

As will be described, the pocket surface 359, the cam lobe surface 360, the first cam surface 354, and the second cam surface 356 may all facilitate rotation of the cam tube 326 as the pins 336 traverse these surfaces. In the illustrated embodiment, each of the pocket surface 359, the cam lobe surface 360, the first cam surface 354, and the second cam surface 356 are angled to facilitate rotation of the cam tube 326 in the same direction. In this way, the circumferential symmetry of the cam sections 350 around the cam tube 326 may be cyclically rotated as the shuttle piston 320 is transitioned between a latched position and an unlatched position.

Each of the components in the shuttle piston assembly 304 may define a generally hollow shape such that the central passageway 328 extends through the shuttle piston assembly 304 to enable fluid flow therethrough. As will be described below, the interaction between the shuttle piston 320, the biasing element 322, and the cam tube 326 provides a mechanism configured to latch and unlatch the shuttle piston 320 to selectively control an axial position thereof. The collective interaction between the shuttle piston 320, the biasing element 322, and the cam tube 326 will be referred to herein as the latching mechanism 374 of the shuttle piston assembly 304.

Operation of the piston assembly 300 in the control valve 206 of the water softener system 200 will be described with reference to FIGS. 26-39. The piston assembly 300 is configured to selectively provide and inhibit the same fluid flow paths in the different positions of the control valve 206 (i.e., the service position, the backwash position, the draw position, the rinse position, the refill position, and the standby position) as the piston assembly 200. Thus, the specific axial alignment of the piston assembly 200 in the different positions with respect to the passageways 262, 264, 266, 268, 270 of the control valve body 260, and the corresponding fluid flow paths that are provided and/or inhibited by the piston assembly 200 in the respective positions also applies to the piston assembly 300.

Figure 26:
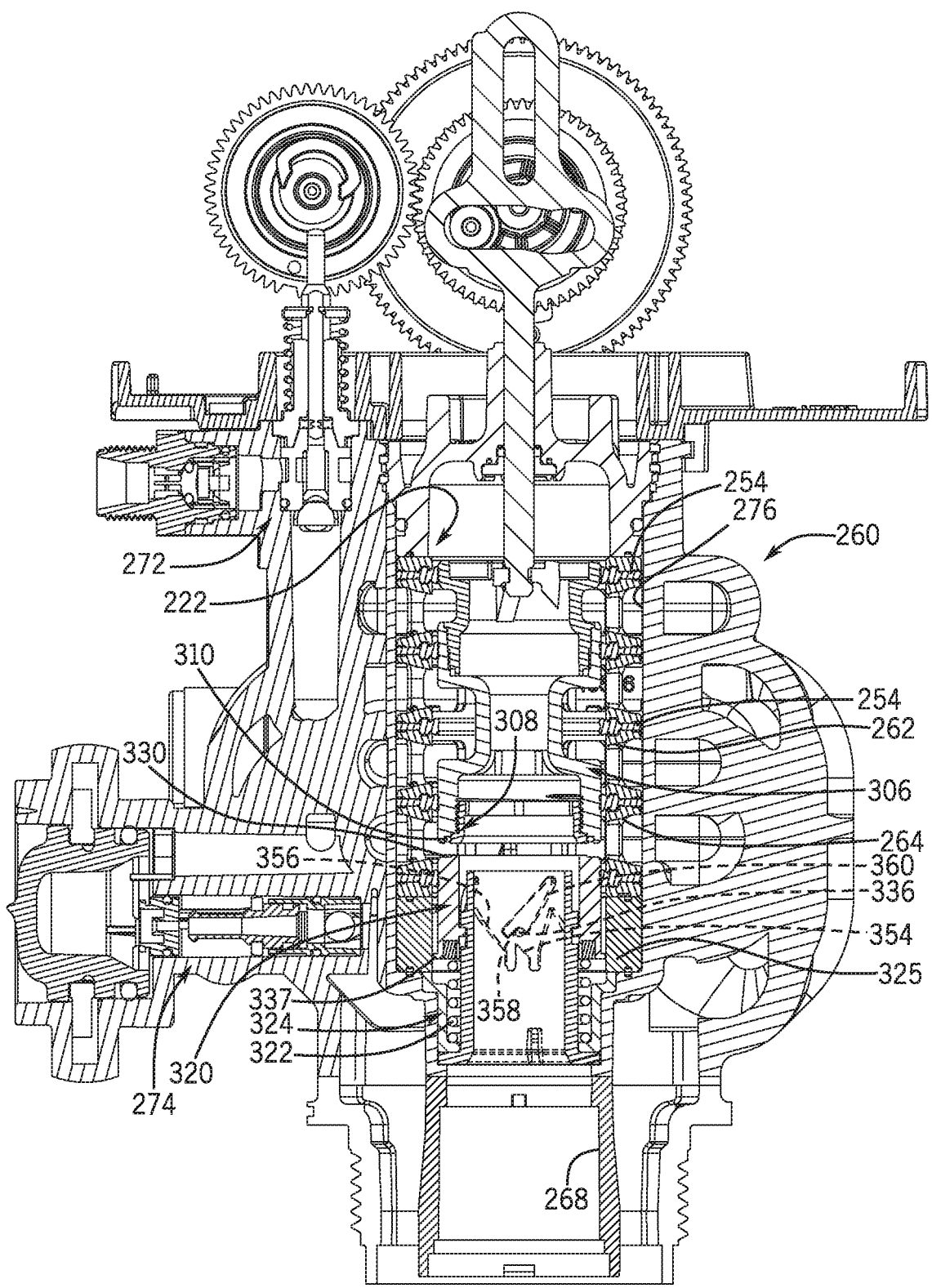
FIG. 26 is a cross-sectional view of the piston assembly of FIG. 23 integrated into a control valve of the water softener system of FIG. 15A.

As illustrated in FIG. 26, the last spacer 256 and the last seal 254 (i.e., the spacer 256 and seal 254 spaced furthest from the first side 240 of the main piston 224) of the seal assembly 222 may be replaced by a single spacer 325. The single spacer 225 is configured to retain the bias retainer 324 and cam tube 326 in the valve body 260 by the seal assembly 222.

Figure 27:
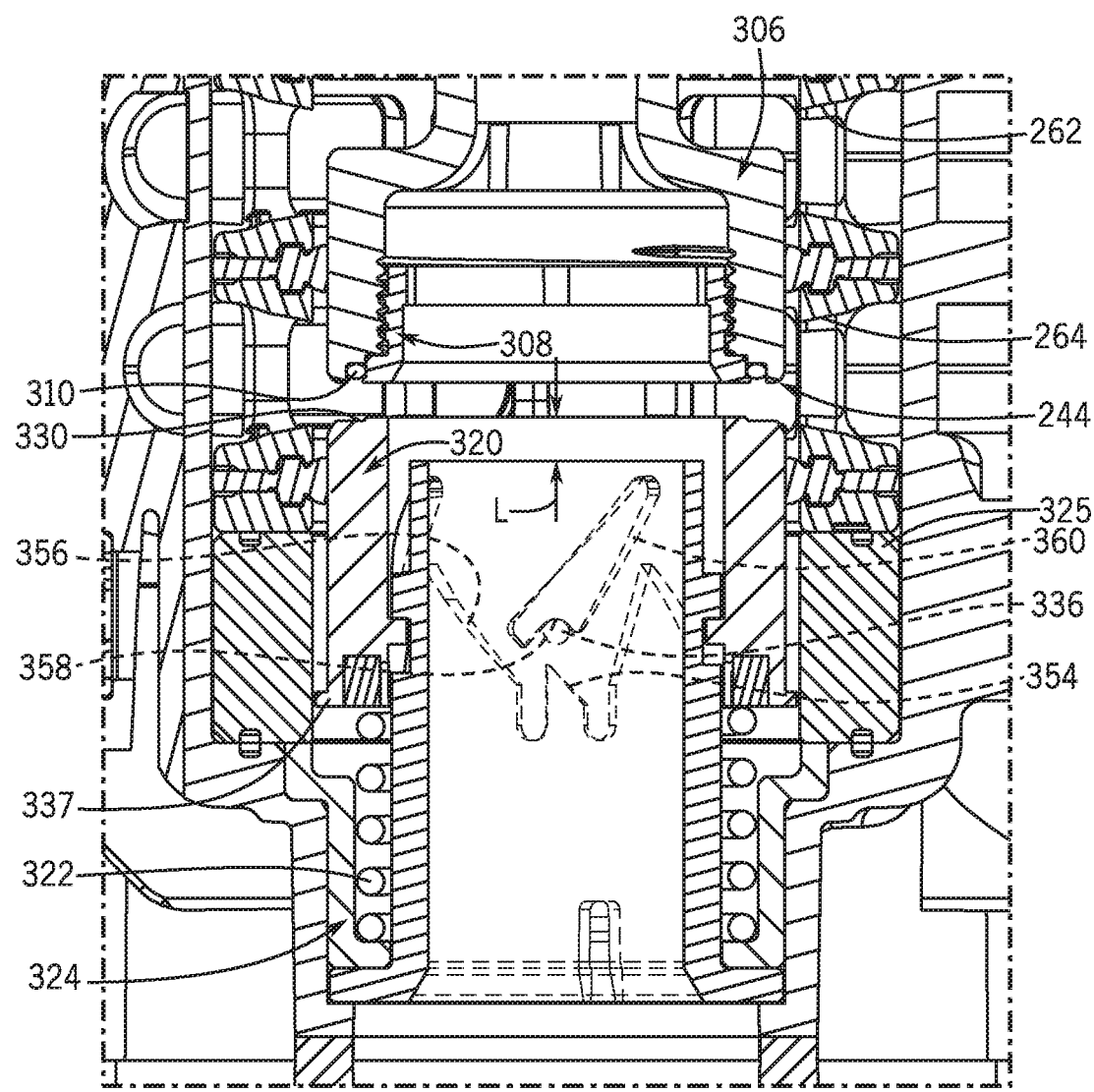
FIG. 27 is a partial cross-sectional view of the control valve of FIG. 26 during a service cycle.

FIGS. 26 and 27 illustrate the piston assembly 300 in the service position. In the service position, the latching mechanism 374 constrains the axial position of the shuttle piston 320 in a latched position. That is, the pins 336 are retained within the pockets 358 and held in place by the biasing force provided by the biasing element 322. Thus, in the latched position, the shuttle piston 320 is inhibited from displacing further axially toward the main piston 306 due to the arrangement of the pins 336 within the pockets 358 prevent. The axial position of the pockets 358 along the cam tube 326 and/or the axial position of the pins 336 along the shuttle piston 320 may be used to control the axial position of the shuttle piston 320 when in the latched position. As such, when the shuttle piston 320 is in the latched position, the axial position of the shuttle piston 320 may be known or constrained.

In the illustrated configuration, the shuttle piston 320 is positioned axially such that the outlet passageway 264 is not blocked, when latched. The main piston 306 may be positioned axially by the drive mechanism 277 such that the second end 244 of the main piston 306 is axially spaced from the first end 330 of the shuttle piston 320, thereby forming an annular gap through which fluid can flow from the distributor passageway 268 to the outlet passageway 264.

Figure 28:
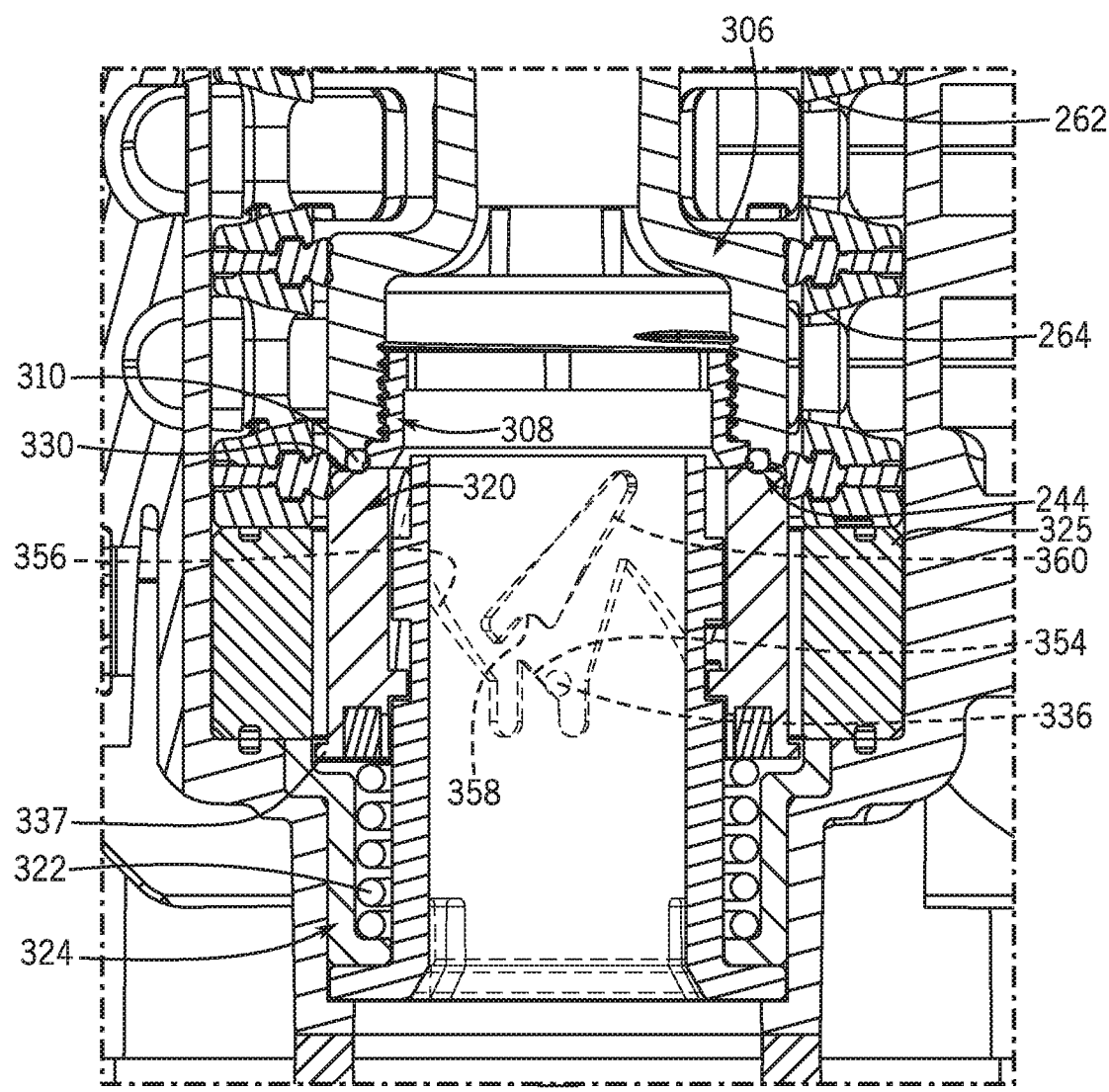
FIG. 28 is a partial cross-sectional view of the control valve of FIG. 26 during an unlatch movement.

From the service position, it may be desired to transition the piston assembly 300 to the backwash position, for example, to initiate a regeneration. To facilitate this the shuttle piston 320 is transitioned from the latched position to an unlatched position. Initially, as illustrated in FIG. 28, the drive mechanism 277 displaces the main piston 306 to a bottom-dead center position, which causes the second end 244 of the main piston 306 to engage and subsequently displace the shuttle piston 320 in a direction toward the biasing retainer 324. As the shuttle piston is displaced, the pins 336 axially displace from the pockets 358 into engagement with the first cam surface 354. Once the pins 336 engage and traverse along the first cam surface 354, the cam tube 326 is rotated (e.g., approximately 45 degrees, in this embodiment) due to the angled orientation of the first cam surface 354. Thus, the axial displacement of the main piston 306 to a bottom-dead center position results in a rotation of the cam tube 326, which axially aligns the pins 336 with a portion of the cam lobe surface 360.

Figure 29:
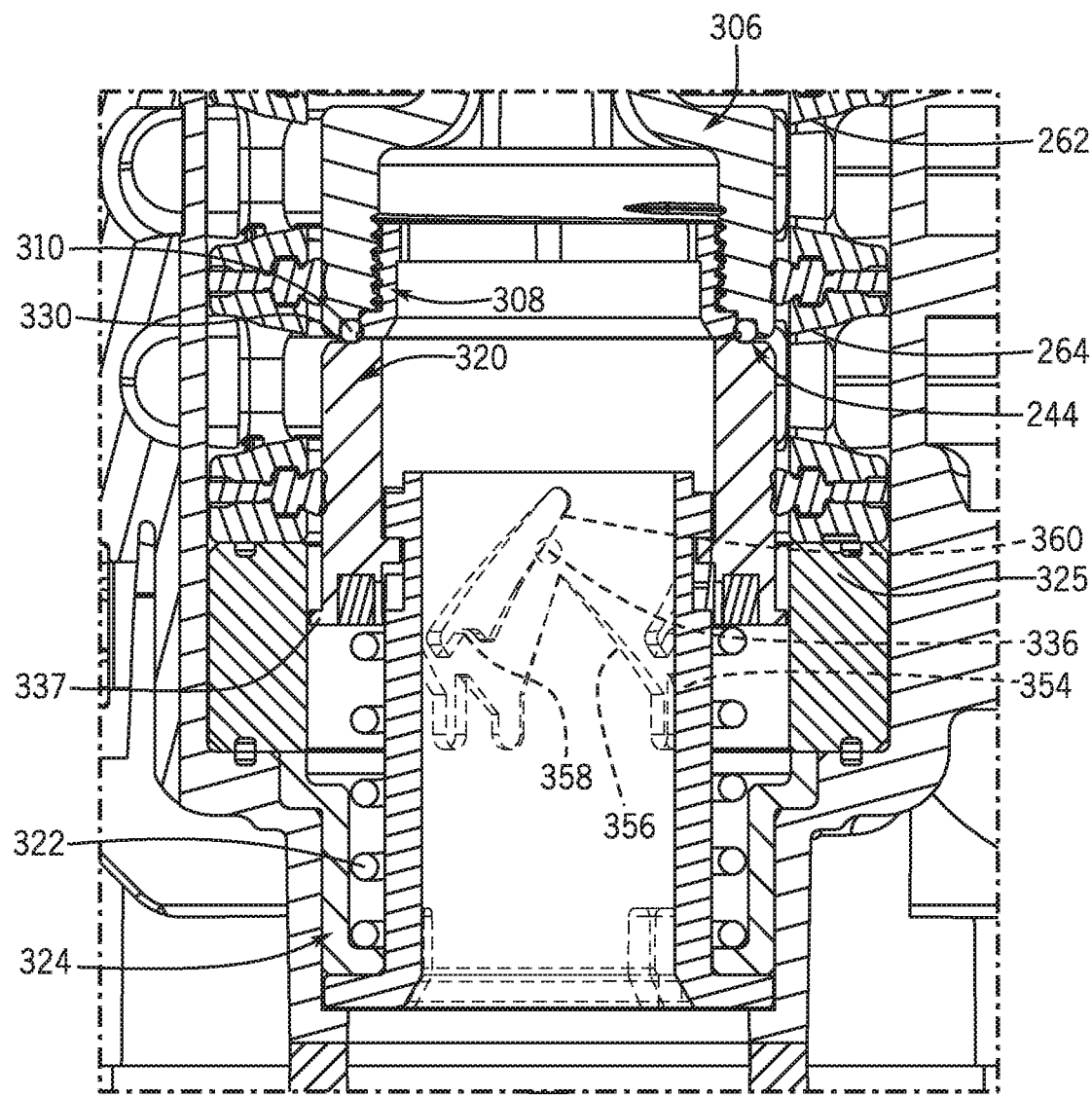
FIG. 29 is a partial cross-sectional view of the control valve of FIG. 26 during an approach to a backwash position.

Once the main piston 306 reaches the bottom-dead center position, the main piston 306 is displaced in an opposing direction away from the bottom-dead center position, as shown in FIG. 29. The biasing element 322 forces the shuttle piston 320 to maintain in contact and displace with the main piston 306. As the shuttle piston 320 displaces with the main piston 306, the pins 336 axially displace to engage the cam lobe surfaces 360 and subsequently traverse the cam lobe surface 360. The biasing force provided by the biasing element 322 will force the pins 336 to traverse the cam lobe surfaces 360, thereby rotating the cam tube 326 (e.g., approximately 45 degrees) due to the angled orientation of the cam lobe surfaces 360. In addition to the rotation of the cam tube 326, the first end 330 of the shuttle piston 320 will enter and traverse the seal 254 between the outlet passageway 264 and the inlet passageway 262, which inhibits fluid flow to the outlet passageway 264.

Figure 30:
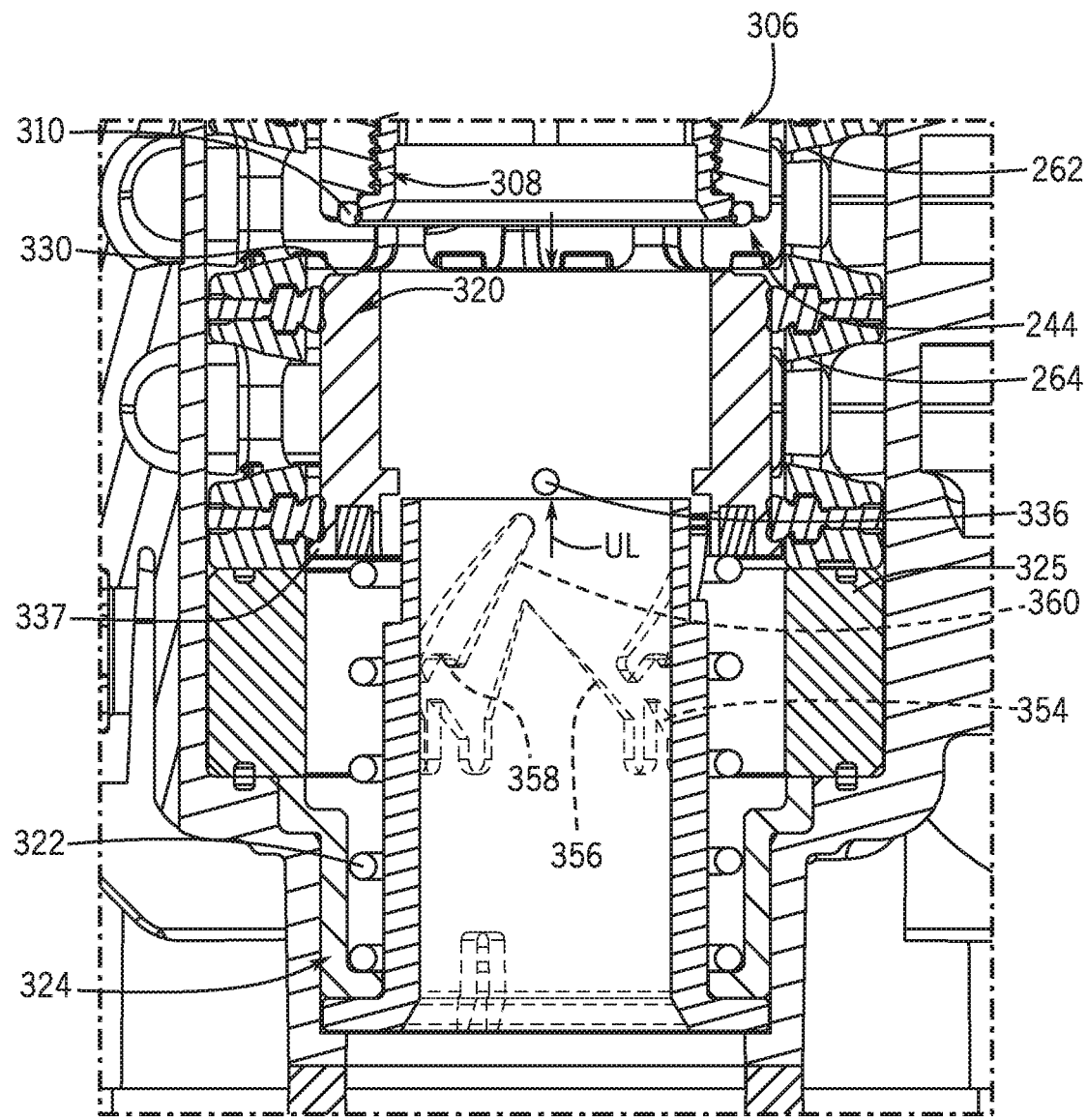
FIG. 30 is a partial cross-sectional view of the control valve of FIG. 26 during a backwash cycle.

The shuttle piston 320 will remain in contact and displace with the main piston 306 until the shuttle flange 337 engages one of the outermost seals 254 of the control valve 206, as shown in FIG. 30. The drive mechanism 277 can continue to axially displace the main piston 306 such that such that the second end 244 of the main piston 306 is axially spaced from the first end 330 of the shuttle piston 320, thereby forming an annular gap through which fluid can flow from the inlet passageway 262 to the distributor passageway 268. In this arrangement, the piston assembly 300 is in the backwash position. While the backwash is taking place, further axial displacement of the shuttle piston 320 is inhibited by the engagement of the shuttle flange 337 and the outermost seal 254, and the biasing element 322 maintains the shuttle piston 320 in this unlatched position, which inhibits flow to outlet passageway 264 as described above.

Figure 31:
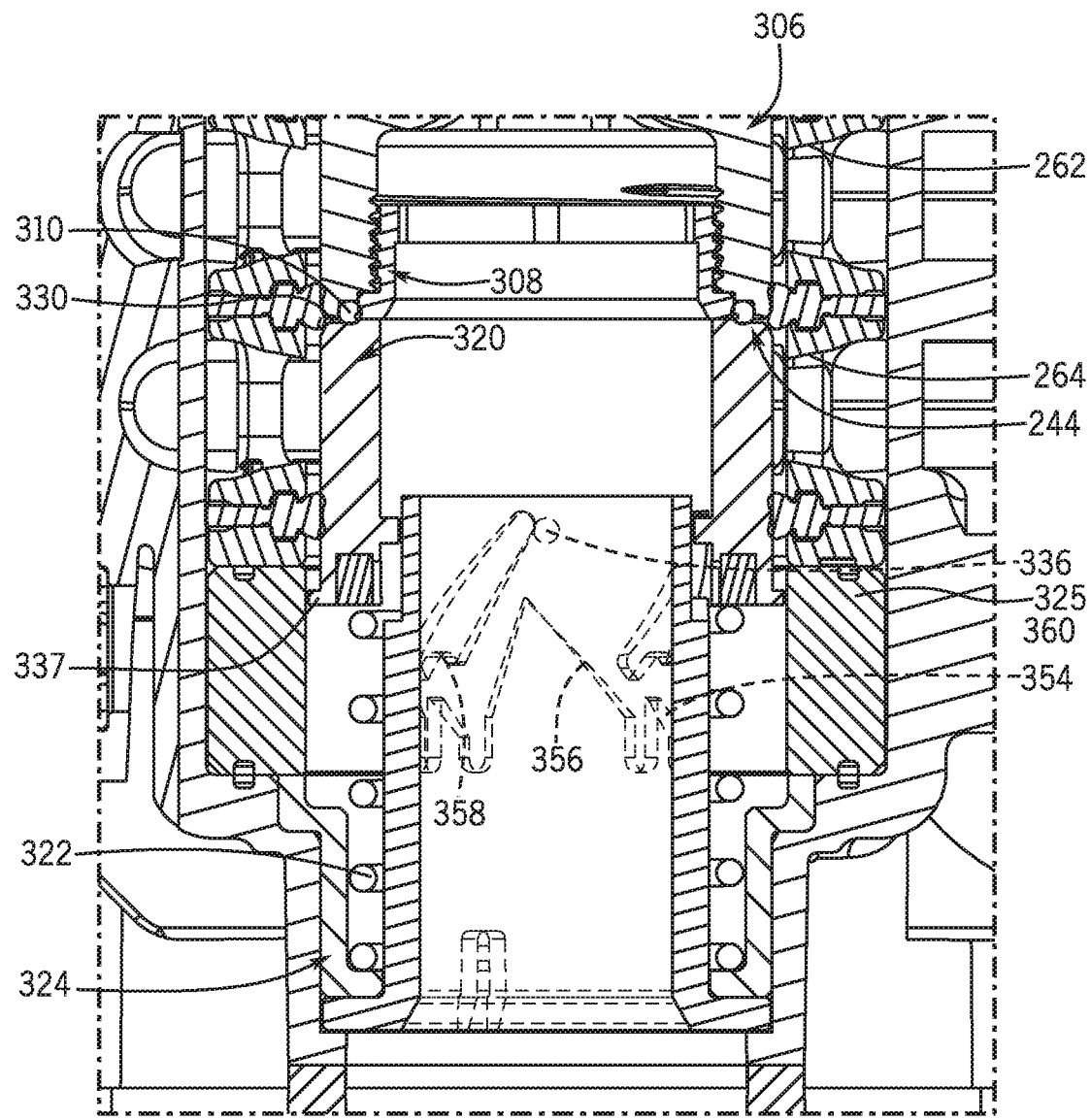
FIG. 31 is a partial cross-sectional view of the control valve of FIG. 26 during an approach to a draw cycle.

Following the backwash position, for example, the piston assembly 300 may be moved to the draw position, as shown in FIG. 31. To transition to the draw position, the drive mechanism 277 displaces the main piston 306 such that the second end 244 of the main piston 306 engages the first end 330 of the shuttle piston 320. This brings the seal 310 into contact with the first end 330 of the shuttle piston 320, thereby forming a seal between the second end 244 of the main piston 306 and the first end 330 of the shuttle piston 320. The seal between the second end 244 of the main piston 306 and the first end 330 of the shuttle piston 320 inhibits fluid flow into the outlet passageway 264. In addition, the second flange 233 of the main piston 306 provides a seal between the top of tank passageway 270 and the inlet passageway 262. This forces water entering the control valve 206 through the inlet passageway 262 to travel through the nozzle element 282 and mix with brine. The waste water is forced to exit the control valve through the drain passageway 266.

Figure 32:
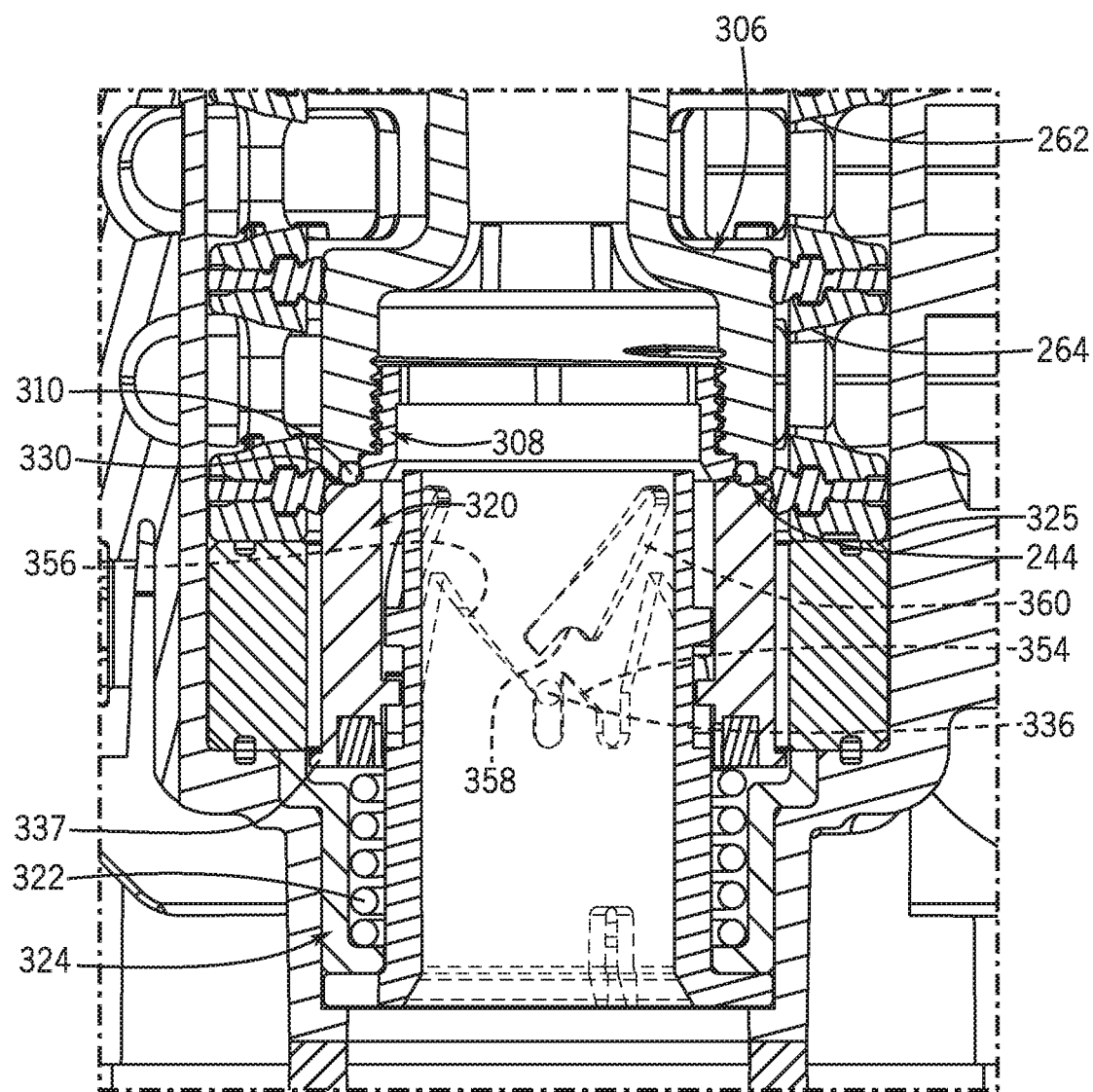
FIG. 32 is a partial cross-sectional view of the control valve of FIG. 26 during an approach to a rinse position.
Figure 33:
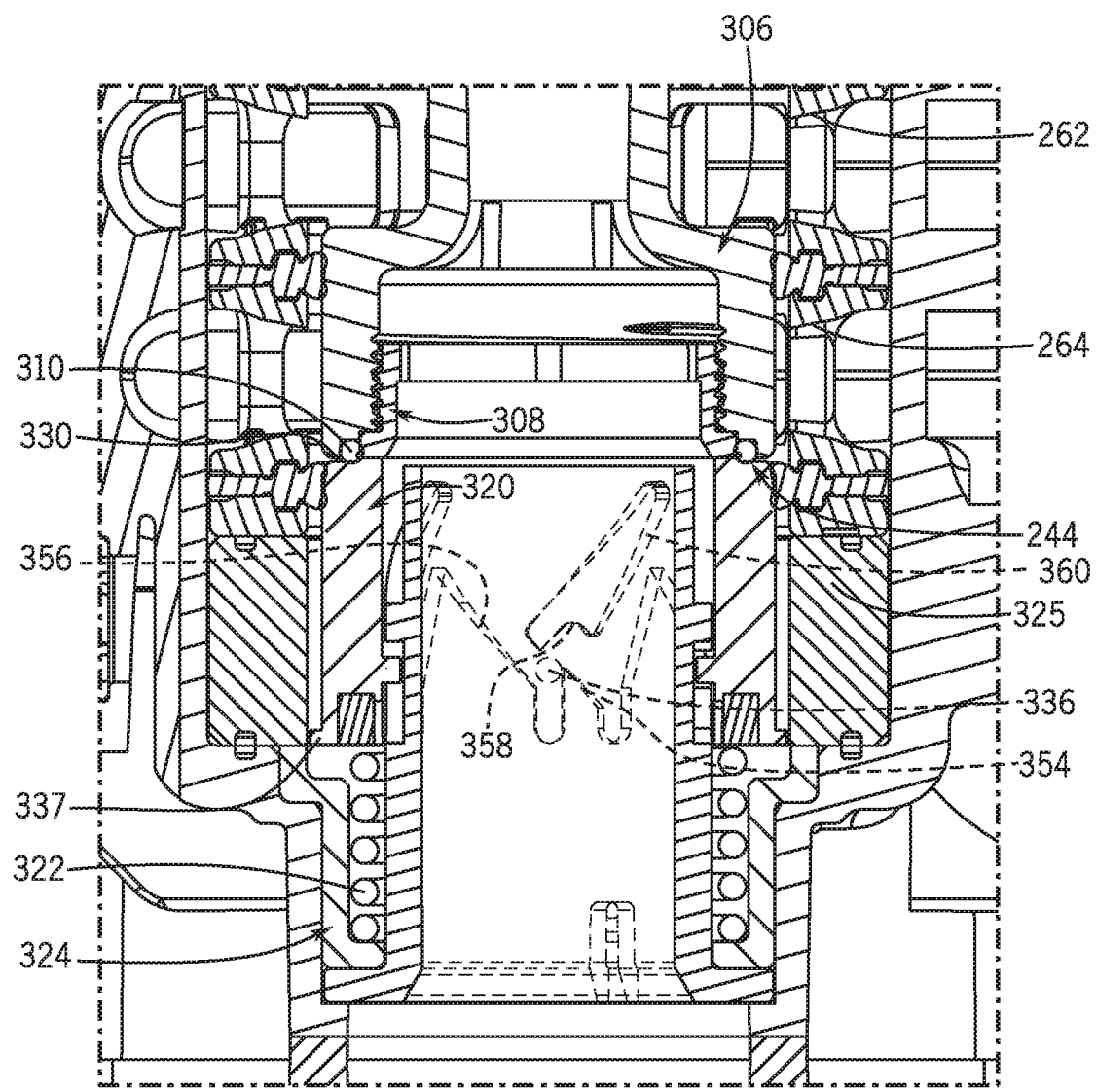
FIG. 33 is a partial cross-sectional view of the control valve of FIG. 26 during a rinse cycle.

After the draw position, for example, the piston assembly 300 may be moved to the rinse position. Initially, as shown in FIG. 32, the drive mechanism 277 continues to displace the main piston 306, and thereby the shuttle piston 320, toward the bottom-dead center position of the main piston 306. As the shuttle valve 320 is displaced with the main piston 306, the pins 336 engage and subsequently traverse the second cam surfaces 356 causing the cam tube to rotate (e.g., approximately 45 degrees). Once the main piston 306 reaches the bottom-dead center position, the drive mechanism 277 displaces the main piston 306 in an opposing direction away from the bottom-dead center position to the rinse position, as shown in FIG. 33. The biasing element 322 applies the basing force on the shuttle piston 320 to maintain the seal between the second end 244 of the main piston 306 and the first end 330 of the shuttle piston 320 and the piston assembly displaces to the rinse position.

Figure 34:
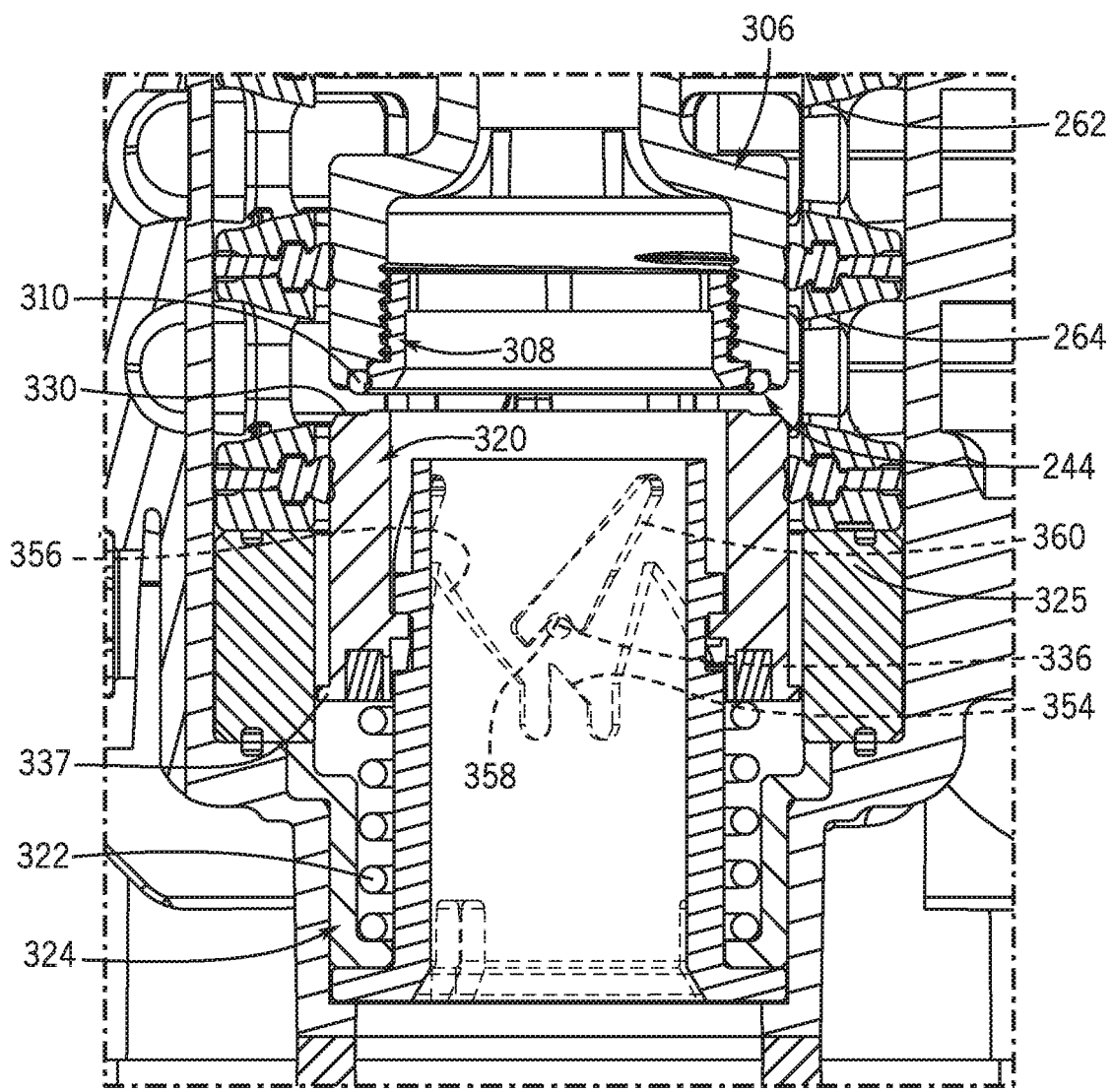
FIG. 34 is a partial cross-sectional view of the control valve of FIG. 26 during a refill cycle.

Following the rinse position, for example, the piston assembly 300 may be moved to the refill position, as shown in FIG. 34. To transition to the refill position shown in FIG. 34, the drive mechanism 277 displaces the main piston 306 in an opposing direction away from the bottom-dead center position. As the main piston 306 is displaced, the biasing force provided by the biasing element 322 maintains the shuttle piston 320 in engagement with the main piston 306, thereby axially displacing the pins 336. The shuttle piston 320 and the pins 336 continue to displace axially with the main piston 306 until the pins 336 engage and subsequently traverse the pocket surfaces 359. Due to the angled arrangement of the piston surfaces 359, the cam tube 326 rotates as the pins 336 traverse the piston surface 359 until the pins 336 are secured within the pockets 358. Once the pins 336 are secured within the pockets 358, the shuttle piston 320 is in the latched position and further axial displacement of the shuttle piston 320 is inhibited.

With the shuttle piston 320 in the latched position and inhibited from further axial displacement toward the main piston 306, the drive mechanism 277 continues to displace the main piston 306 such that an annular gap forms between the main piston 306 and the shuttle piston 320, as the main piston 306 approaches the refill position. The annular gap that forms as the main piston 306 axially separates from the shuttle piston 320 provides a fluid path for treated water to flow to the outlet passageway 264.

In other embodiments, an adjustment may be made to the sequencing of the movements such that the shuttle piston 320 transitions to the unlatched position during the movement of the piston assembly 300 to the refill position. In this way, the shuttle piston 320 may be allowed to displace, via the biasing element 322, and engage the second end 244 of the main piston 306 forming a seal therebetween. This may eliminate the annular gap that forms during the movement to the refill position, and block fluid flow into the outlet passageway 264, if desired.

Figure 35:
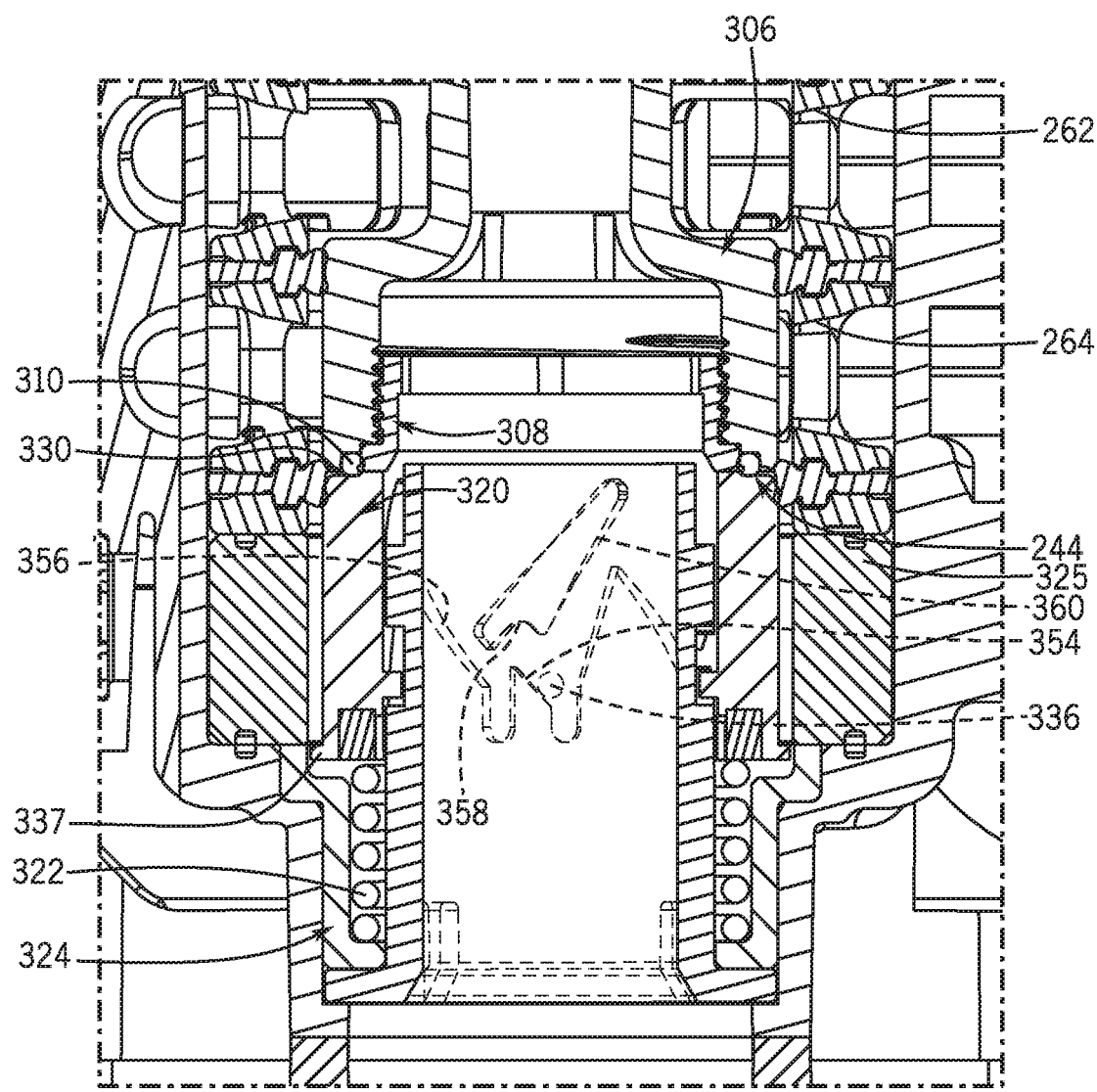
FIG. 35 is a partial cross-sectional view of the control valve of FIG. 26 during an approach to a standby position.

Movement from the refill position, for example, to the standby position begins with displacement of the main piston 306 toward the bottom-dead center position, as illustrated in FIG. 35. As the main piston 306 displaces toward the bottom-dead center position, the second end 244 of the main piston 306 engages the first end 330 of the shuttle piston 320 thereby displacing the shuttle piston 320 against the biasing element 322. The displacement of the shuttle piston 320 against the biasing element 322 axially displaces the pins 336 from the latched position within the pockets 358 toward the first cam surface 354. Once the pins 336 engage and subsequently traverse the first cam surface 354, the angled arrangement of the first cam surface 354 rotates the cam tube 326 (e.g., 45 degrees), thus unlatching the shuttle piston 320.

Figure 36:
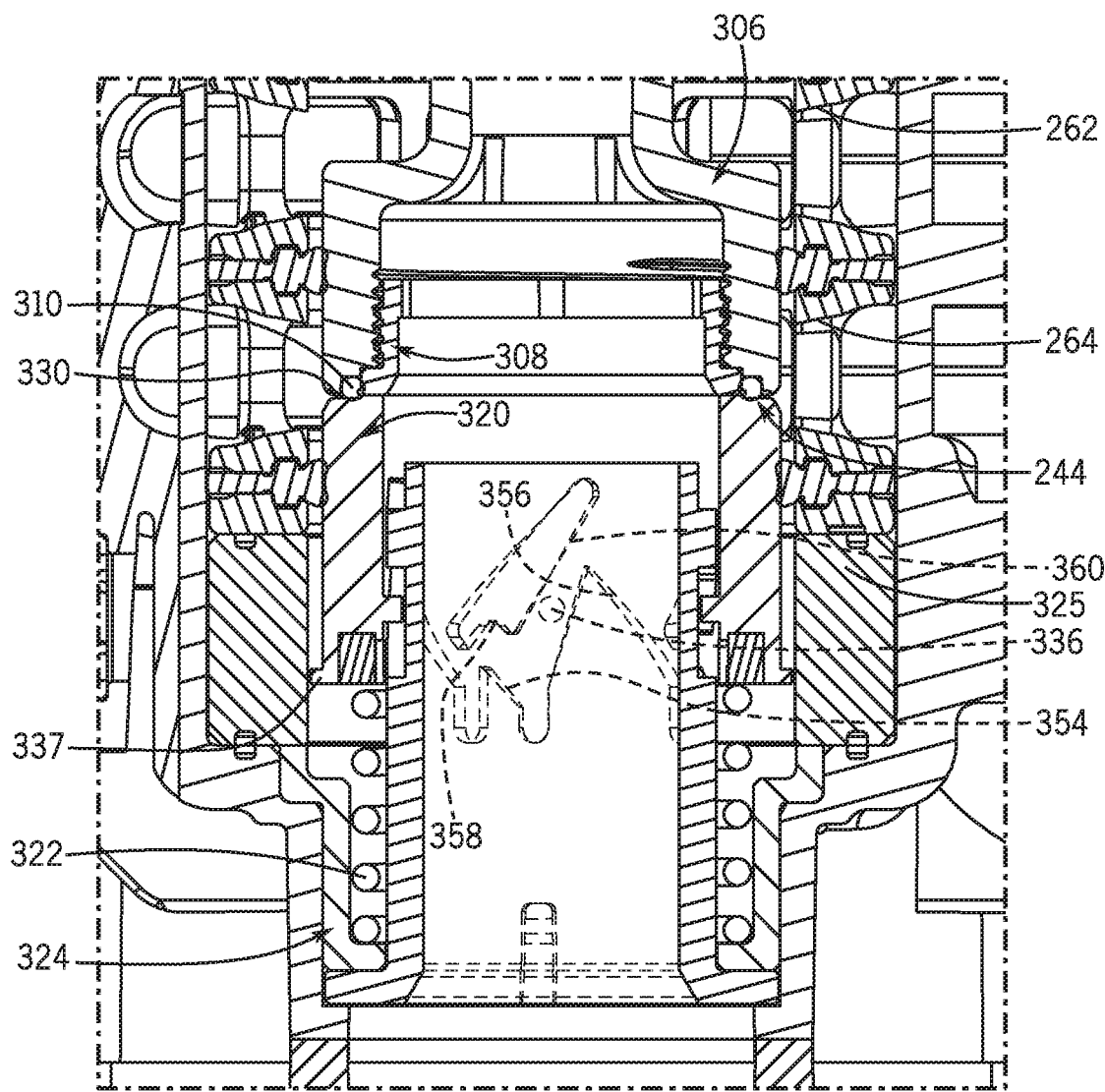
FIG. 36 is a partial cross-sectional view of the control valve of FIG. 26 during a standby cycle.

From the bottom-dead center position, the drive mechanism 277 will displace the main piston 306 in an opposing direction away from the bottom-dead center position to the standby position, as shown in FIG. 36. As the main piston 306 displaces away from the bottom-dead center position, the biasing element 322 forces the shuttle piston 320 into contact with the main piston 306, thereby displacing the shuttle piston 320 with the main piston 306. This displacement of the shuttle piston 320 axially displaces the pins 336 into engagement with the cam lobe surfaces 360. The cam tube 326 will rotate as the pins 336 traverse the cam lobe surfaces 360, while the shuttle piston 320 follows the main piston 306 to the standby position.

In the standby position, the shuttle piston 320 is in engagement with the main piston 306 to form a seal therebetween and contact the seals 254 between the inlet passageway 362 and the outlet passageway 364, which inhibits fluid flow into the outlet passageway 364. Simultaneously, the main piston 306 inhibits fluid flow to the drain passageway 266.

Figure 37:
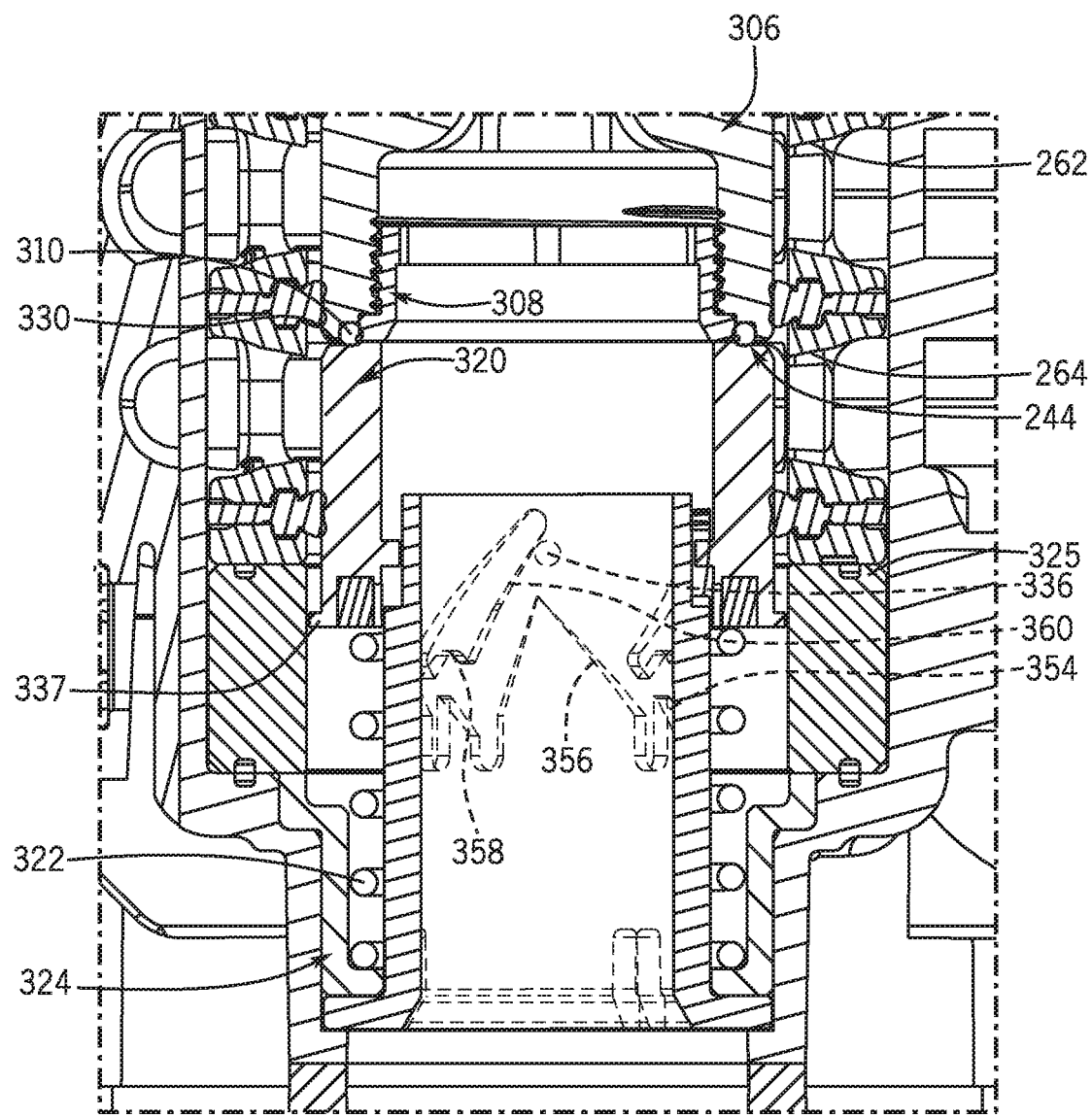
FIG. 37 is a partial cross-sectional view of the control valve of FIG. 26 during an initial approach to the service position.
Figure 38:
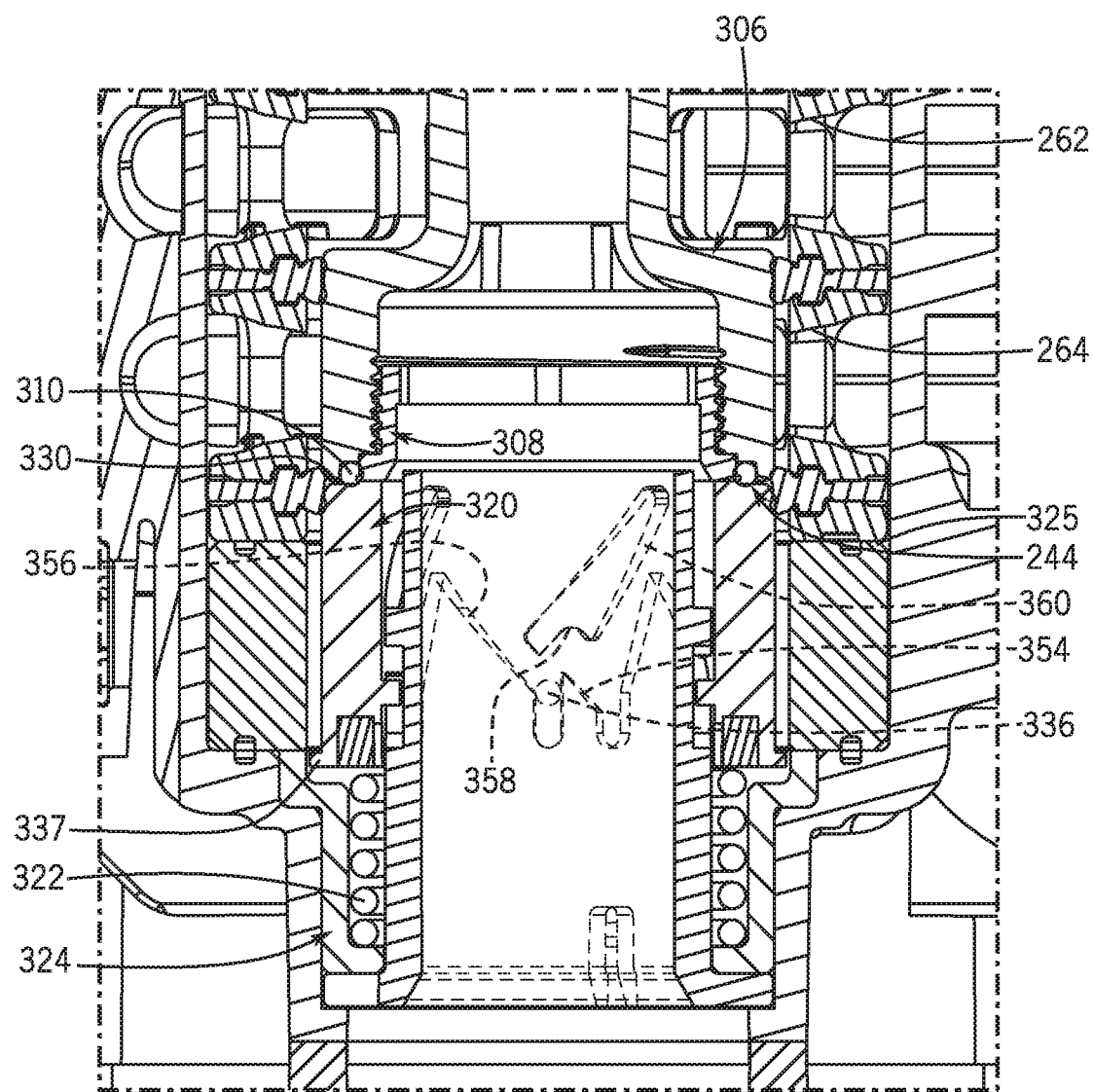
FIG. 38 is a partial cross-sectional view of the control valve of FIG. 26 during an intermediate approach to the service position.
Figure 39:
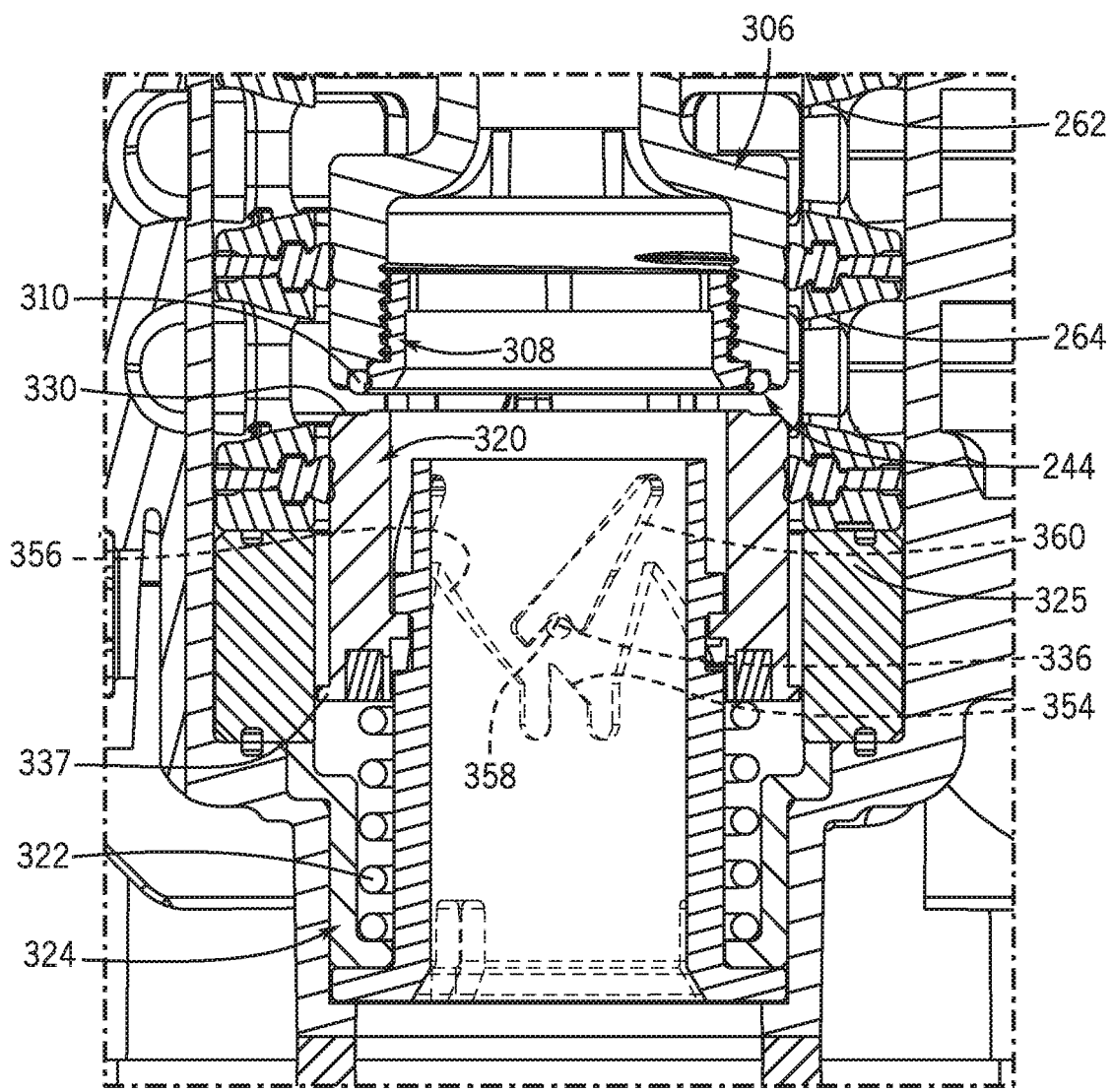
FIG. 39 is a partial cross-sectional view of the control valve of FIG. 26 returned to the service cycle.

Following the standby position, for example, the piston assembly 300 may transition back to the service position as illustrated in FIGS. 37-39. To transition back to the service position, the drive mechanism 277 continues to displace the main piston 306 away from the bottom-dead center position. The biasing element 322 continues to displace the shuttle piston 320 with the main piston 306, and maintains therebetween. This movement continues until the pins 336 traverse the entire cam lobe surface 360, thereby further rotating the cam tube 326. Once the pins 336 have traversed the entire cam lobe surface 360, the drive mechanism 277 reverses the direction of the main piston 306 and displaces it back toward the bottom-dead center position. This also displaces the shuttle piston 320 against the biasing element 322, thereby axially displacing the pins 336 toward the second cam surfaces 356. The main piston 306 continues to displace to the bottom-dead center, which forces the pins 336 to traverse the second cam surfaces 356 thereby rotating the cam tube 326. From the bottom-dead center position, the drive mechanism 277 then displaces the main piston 306 in an opposite direction away from the bottom-dead center position. The biasing element 322 forces the shuttle piston 320 to follow the main piston 306 until the shuttle piston 320 reaches the latched position with the pins 336 secured within the pockets 358. With the shuttle piston 320 in the latched position, the drive mechanism continues to displace the main piston 306 axially away from the shuttle piston 320 to form an annular gap therebetween until the piston assembly 300 reaches the service position.

The latching mechanism 374 is configured to enable the shuttle piston 320 to cyclically transition between the latched position (e.g., FIG. 26) and the unlatched position (e.g., FIG. 29). As shown in the transition between the latched position and the unlatched position illustrated in FIGS. 26-29, the transition between the latched position and the unlatched position varies an axial position of the shuttle piston 320. In the latched position, the shuttle piston 320 defines a distance L between the first end 330 of the shuttle piston 320 and a first end 376 of the cam tube 326. Once the shuttle piston 320 reaches the unlatched position, the distance between the first end 330 of the shuttle piston 320 and a first end 376 of the cam tube 326 increases to a distance UL. The different between the distance L and the distance UL may be defined by the geometry and location of the shuttle flange 337 and the outermost seal 254. The shuttle piston assembly 304 is designed to ensure that the difference between the distance UL and the distance L is sufficient to ensure that the first end 330 of the shuttle piston 320 and traverses the seal 254 between the outlet passageway 264 and the inlet passageway 262, which inhibits fluid flow into the outlet passageway 264.

Due to the cam sections 350 being circumferentially cyclical about the cam tube 326, each time the main piston 306 is displaced to the bottom-dead center position and subsequently retracted sufficiently allow the shuttle flange 337 to engage the outermost seal 254, the latching mechanism 374 is configured to transition the shuttle piston 320 between the latched position and the unlatched position or between the unlatched position and the latched position. Thus, the drive mechanism 277 may selectively transition the shuttle piston 320 between the latched position and the unlatched position, as desired based on the desired operational position of the control valve 206.

The illustrated latching mechanism 374 resulted in rotation of the cam tube 326 due to the movement of the pins 336 against the camming structure 346. In another embodiment, the latching mechanism 374 may be configured to provide rotation of the shuttle piston 320 as the pins 336 traverse the camming structure 346 of the cam tube 326. In yet another embodiment, both the shuttle piston 320 and the cam tube 326 may rotate a portion of the, for example, 45 degrees, as the shuttle piston 320 is displaced in one direction or the other.

Figure 40:
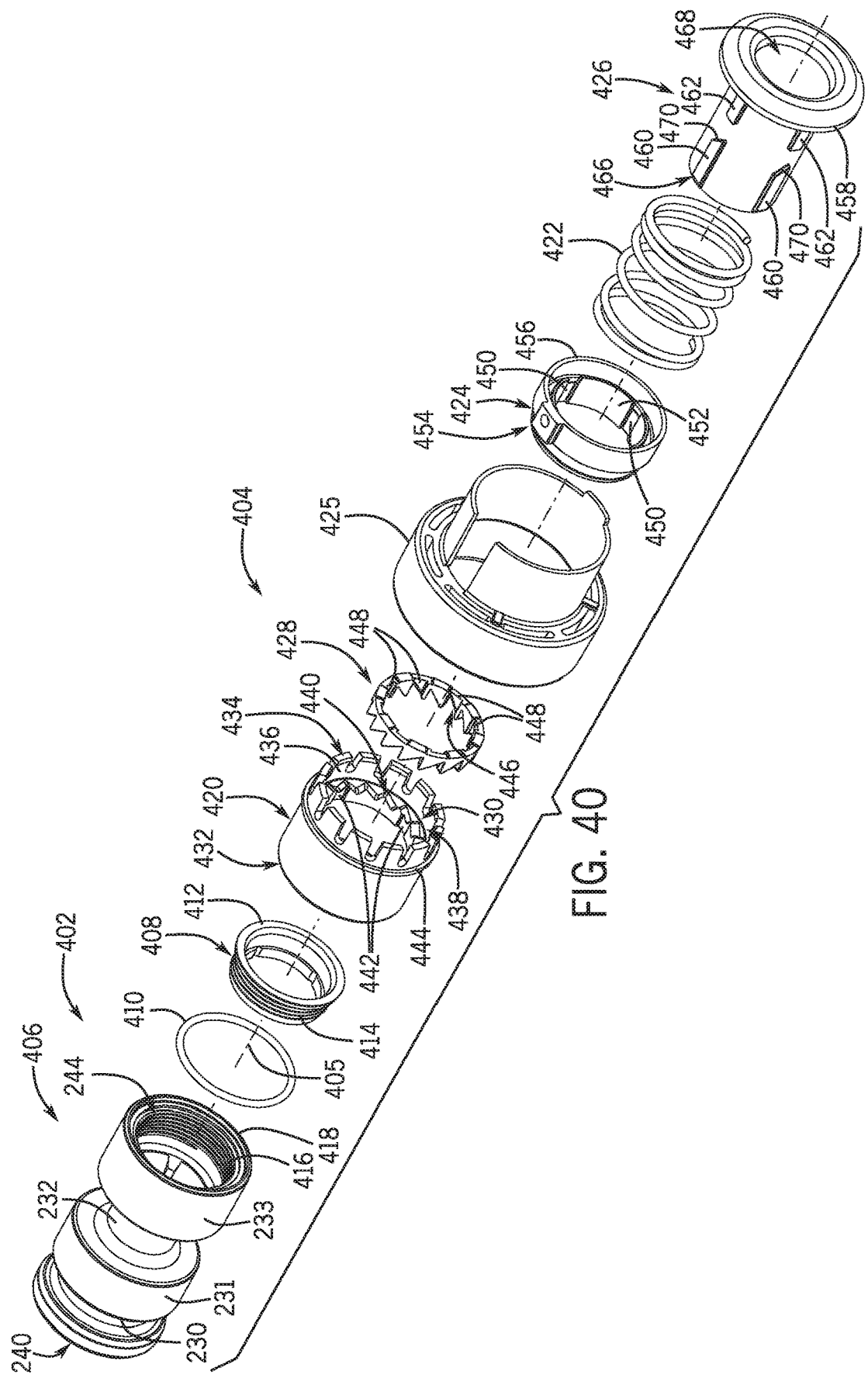
FIG. 40 is an exploded view of another piston assembly operable in a control valve of the water softener system of FIG. 15A according to one embodiment of the present invention.

FIG. 40 illustrates a piston assembly 400 that may be integrated into the control valve 206 of the water softener system 200 according to another embodiment of the invention. The piston assembly 400 includes a main piston assembly 402 and a shuttle piston assembly 404. The main piston assembly 402 and the shuttle piston assembly 404 may share a common center axis 405. The main piston assembly 402 includes a main piston 406, a seal retainer 408, and a seal 410. The main piston 406 may be similar to the main piston 224 of the piston assembly 220 in design and functionality. Similar components between the main piston 406 and the main piston 224 are identified using like reference numerals.

The seal retainer 408 defines a generally annular shape and includes a retainer flange 412, which extends radially outward from an end of the seal retainer 408. The seal retainer 408 includes external threads arranged on an outer surface 414 that extends axially from the retainer flange 412. The external threads are configured to be threaded into internal threads arranged on an inner surface 416 of the main piston 406 to attach the seal retainer 408 to the main piston 406. When assembled, the seal retainer 408 is configured to secure the seal 410 onto the second side 244 of the main piston 406. Specifically, an outer diameter defined by the retainer flange 412 may be sized such that the seal 410 is secured between the retainer flange 412 and a notch 418 formed in the second side 244 of the main piston 406, when the seal retainer 408 is attached to the main piston 406. In the illustrated embodiment, the seal 410 is in the form of an o-ring.

The shuttle piston assembly 404 includes a shuttle piston 420, a biasing element 422, a biasing retainer 424, a guide tube 426, and a rotating ring 428. The shuttle piston 420 defines a generally cylindrical, hollow body that includes a central passageway 430, a first end 432, and an opposing second end 434. The central passageway 430 extends through the interior of the shuttle piston 420 to permit fluid flow therethrough. An interior surface 436 of the shuttle piston 420 includes camming structure 438. The camming structure 438 extends radially inward from the interior surface 436 and includes a plurality of shuttle teeth 440 arranged circumferentially around the interior surface 436. Each of the plurality of shuttle teeth 440 are formed by a pair of angled surfaces that extend toward one another. A tooth recess 442 is arranged along circumferentially alternating pairs of the plurality of shuttle teeth 440. That is, adjacent pairs of the plurality of shuttle teeth 440 will include one tooth recess 442. The tooth recesses 442 are recessed radially inward on the camming structure 438 and extend axially along the camming structure 438. A shuttle flange 444 extends radially outward from the second end 434 of the shuttle piston 420.

The rotating ring 428 defines a generally annular shape and includes a plurality of lock teeth 446 that are configured to interact with the plurality of shuttle teeth 440 on the shuttle piston 420. Each of the plurality of lock teeth 446 are formed by an axial surface (i.e., a surface that extends substantially parallel to the center axis 405) and an angled surface (i.e., a surface that is angled with respect to the center axis 405). Similar to the plurality of shuttle teeth 440, a lock recess 448 is arranged along circumferentially alternating pairs of the plurality of lock teeth 446. That is, adjacent pairs of the plurality of lock teeth 446 will include one lock recess 448. The lock recesses 448 are recessed radially inward on the respective one of the lock teeth 446 on which they are arranged and extend axially along the rotating ring 428.

The rotating ring 428 is dimensioned to be received within the inner surface 436 of the shuttle piston 420 such that the lock teeth 446 interact with the shuttle teeth 440, as will be described.

The biasing retainer 424 defines a generally cylindrical, hollow shape and includes a plurality of retainer slots 450 arranged circumferentially around an inner surface 452 thereof. The retainer slots 450 are recessed radially into the inner surface 452 and extend axially along the inner surface 452. The biasing retainer 424 is dimensioned to be coupled to the second end 434 of the shuttle piston 420. For example, a first end 454 of the biasing retainer 424 may be configured to snap-fit into the second end 434 of the shuttle piston 420. A bottom surface 456 of the biasing retainer is dimensioned to engage the biasing element 422 and provide a surface onto which the biasing element 422 may provide a biasing force against. The biasing element 422 is configured to be arranged between the biasing retainer 424 and the guide tube 426, and to provide a biasing force on the shuttle piston 420 in an axial direction toward the main piston 406. In the illustrated embodiment, the biasing element 422 is engaged between the bottom surface 456 of the biasing retainer 424 and a guide flange 458 of the guide tube 426, which is axially fixed and provides a base for the biasing element 422 to extend from. In this way, the biasing element 422 is configured to provide a biasing force onto the shuttle piston 420 in an axial directed toward the main piston 406. The illustrated biasing element 422 is in the form of a spring. In other embodiments, for example, the biasing element 422 may be in the form of a mechanical linkage, a pre-stressed structure, and the like.

The guide tube 426 defines a generally cylindrical, hollow tube that includes the guide flange 458, a plurality of first ribs 460, and a plurality of second ribs 462. The first ribs 460 are arranged circumferentially around an outer surface 464 of the guide tube 426. In the illustrated embodiment, the guide tube 426 includes four first ribs 460 arranged circumferentially in approximately 90 degree increments around the outer surface 464. In other embodiments, the guide tube 426 may include more or less than four first ribs 460 arranged in any increment circumferentially around the outer surface 464. The first ribs 460 extend radially outward from the outer surface 464 and extend axially along the outer surface from a first end 466 of the guide tube 426 to a position between the first end 466 and a second end 468 of the guide tube 426. An end of the first ribs 460 arranged opposite from the first end 466 includes an angled surface 470.

The second ribs 462 are arranged circumferentially around an outer surface 464 of the guide tube 426. The second ribs 462 are circumferentially aligned with the first ribs 462. In the illustrated embodiment, the guide tube 426 includes four second ribs 462 that are aligned with the first ribs 460. In other embodiments, the guide tube 426 may include more or less than four second ribs 462 that may be either aligned with or circumferentially offset from the first ribs 406. The second ribs 462 extend radially outward from the outer surface 464 and extend axially along the outer surface from the second end 468 of the guide tube 426 to a position between the first end 466 and the second end 468 of the guide tube 426.

The guide flange 458 extend radially outward from the second end 468 of the guide tube 426. The guide flange 458 is dimensioned to extend radially such that the biasing element 422 engages the guide flange 458, when assembled.

Figure 41:
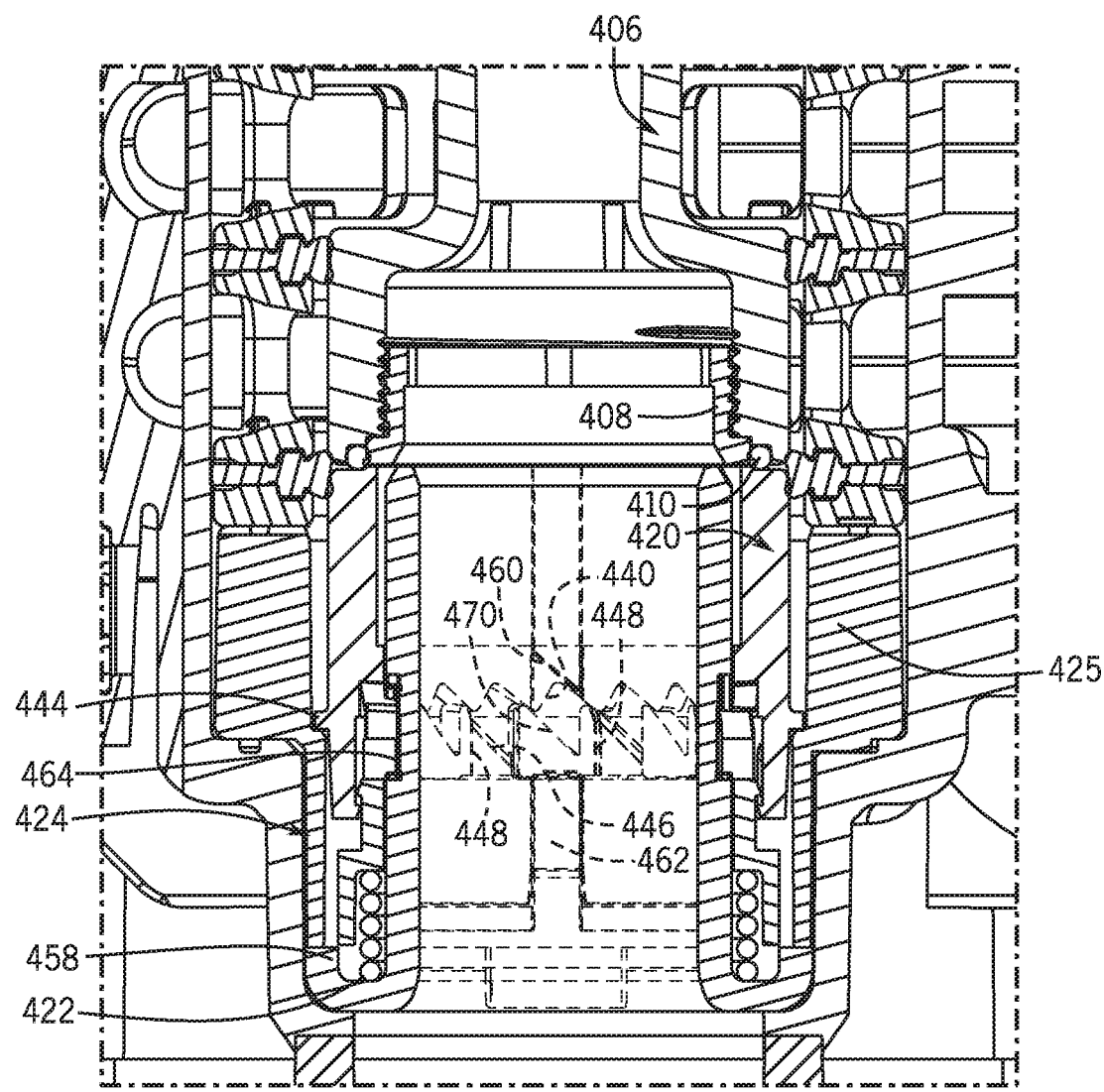
FIG. 41 is a cross-sectional view of the piston assembly of FIG. 40 integrated into a control valve of the water softener system of FIG. 15A.

The outer surface 464 is dimensioned such that the guide tube 426, can extend into and/or through the biasing element 422, the biasing retainer 424, the rotating ring 428, and the shuttle piston 420, as illustrated in FIG. 41. Each of the components in the shuttle piston assembly 404 may define a generally hollow shape such that the central passageway 430 extends through the shuttle piston assembly 404 to enable fluid flow therethrough. As will be described below, the interaction between the shuttle piston 420, the biasing element 422, the rotating ring 428, and the guide tube 426 provides a mechanism configured to latch and unlatch the shuttle piston 420 to selectively control an axial position thereof. The collective interaction between the shuttle piston 420, the biasing element 422, the rotating ring 428, and the guide tube 426 will be referred to herein as the latching mechanism 474 of the shuttle piston assembly 404.

Operation of the piston assembly 400 in the control valve 206 of the water softener system 200 will be described with reference to FIG. 41. The piston assembly 400 is configured to selectively provide and inhibit the same fluid flow paths in the different positions of the control valve 206 (i.e., the service position, the backwash position, the draw position, the rinse position, the refill position, and the standby position) as the piston assembly 200. Thus, the specific axial alignment of the piston assembly 200 in the different positions with respect to the passageways 262, 264, 266, 268, 270 of the control valve body 260, and the corresponding fluid flow paths that are provided and/or inhibited by the piston assembly 200 in the respective positions also applies to the piston assembly 400. Further, it should be appreciated that the latching mechanism of the piston assembly 400 functions to provide a similar result as the latching mechanism of the piston assembly 300. That is, the shuttle piston 420 may be selectively transitioned between a latched position and an unlatched position to control an axial position of the shuttle piston 420.

As illustrated in FIG. 41, the last spacer 256 and the last seal 254 (i.e., the spacer 256 and seal 254 spaced furthest from the first side 240 of the main piston 224) of the seal assembly 222 may be replaced by a single spacer 425. The single spacer 425 is configured to retain the guide tube 426 in the central bore 276 of valve body 260.

The operation of the piston assembly 400 when transitioning between the service, backwash, draw, rinse, refill, and standby positions may be similar to the piston assembly 300, described above. However, latching mechanism 474 may function as described below during this operation. From the position illustrated in FIG. 41 with the main piston 406 in the bottom-dead center position, for example, the drive mechanism 277 displaces the main piston 406 in a direction away from the bottom-dead center position. The biasing element 422 then forces the biasing retainer 424 into the rotating ring 428, which rotates the rotating ring 428 due to the interaction between the angled surfaces of the shuttle teeth 440 and the lock teeth 446. This rotation arranges the lock teeth 446 that include a lock recess 448 extending therethrough with the second ribs 462. As the biasing element 422 continues to force the biasing retainer 424 and the shuttle piston 420 to follow the main piston 406, the first ribs 460 extend through the lock recesses 448 in the respective lock teeth 446, thereby enabling the shuttle piston 420 to continue to extend axially until the main piston 406 stops or the shuttle flange 444 engages the outermost seal 254.

To transition to the latched position, the drive mechanism 277 displaces the main piston 406 to the bottom-dead center position. Once the main piston 406 engages the shuttle piston 420, the shuttle piston 420 displaces with the main piston 406 toward the bottom-dead center position. Once the first ribs 460 slide out of and clear the lock recesses 448, the rotating ring 428 is free to rotate with respect to the shuttle valve 420 and the guide tube 326. When the main piston 406 reaches the bottom-dead center position, the force on the shuttle piston 420 provided by the main piston 406 rotates the rotating ring 428 due to the interaction between the shuttle teeth 440 and the lock teeth 446. This rotation aligns the second ribs 462 with the lock teeth 446 that do not include the lock recesses 448. Thus, once the main piston 406 is displaced in the opposite direction away from the bottom-dead center position, the biasing element 422 will force the shuttle piston 420 to follow the main piston 406 until the first ribs 460 engage the lock teeth 446 that do not include the lock recesses 448. Since these lock teeth 448 do not include the lock recesses 448, the first ribs 460 are not allowed to axially displace past the rotating ring 428, thereby restricting an axial position of the shuttle piston 420.

Figure 42:
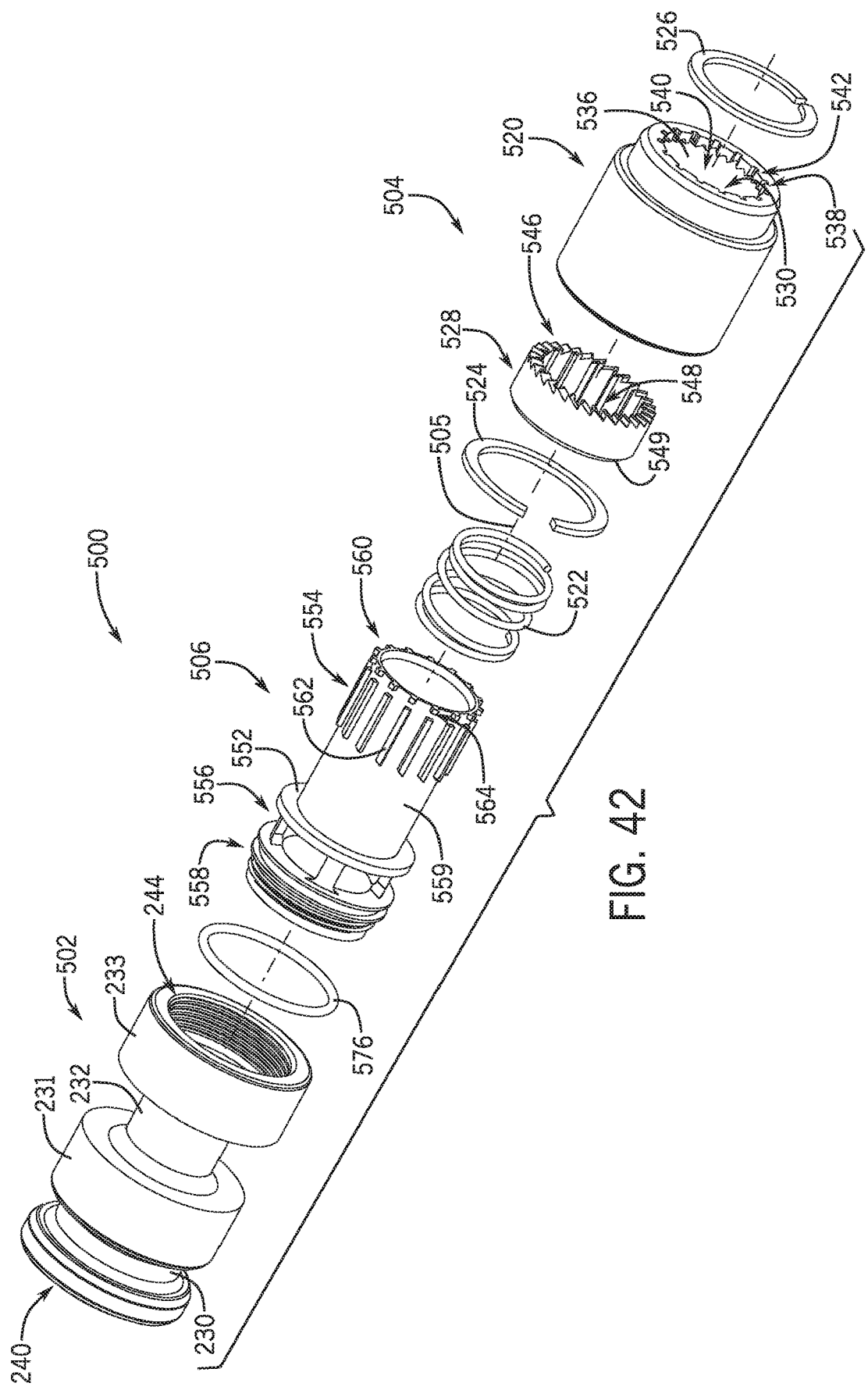
FIG. 42 is an exploded view of yet another piston assembly operable in a control valve of the water softener system of FIG. 15A according to one embodiment of the present invention.
Figure 44:
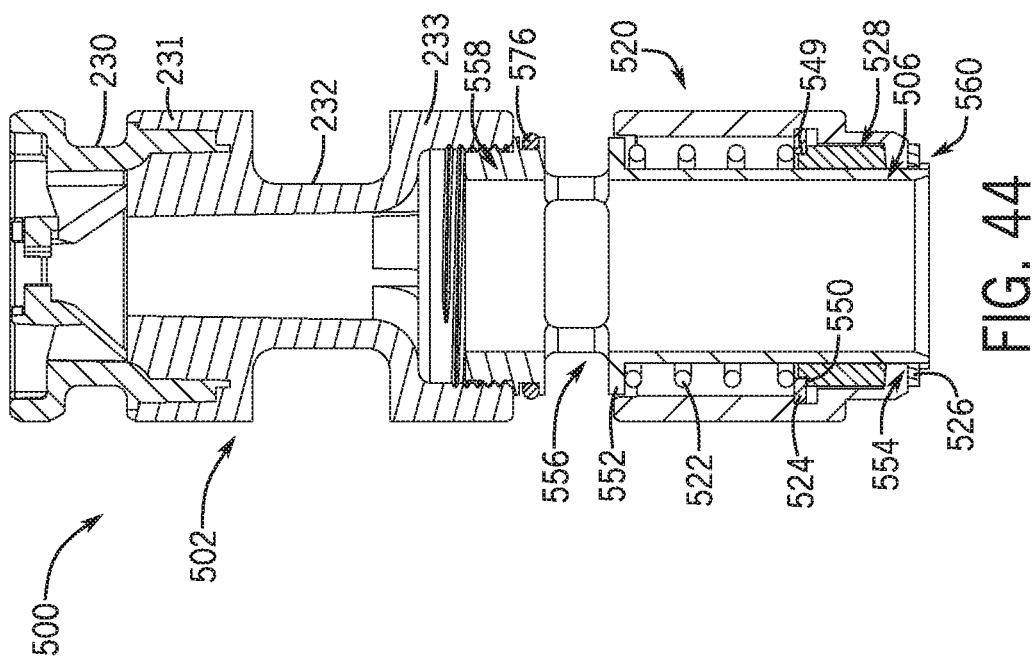
FIG. 44 is a cross-sectional view of the piston assembly of FIG. 43 in an unlatched position.
Figure 43:
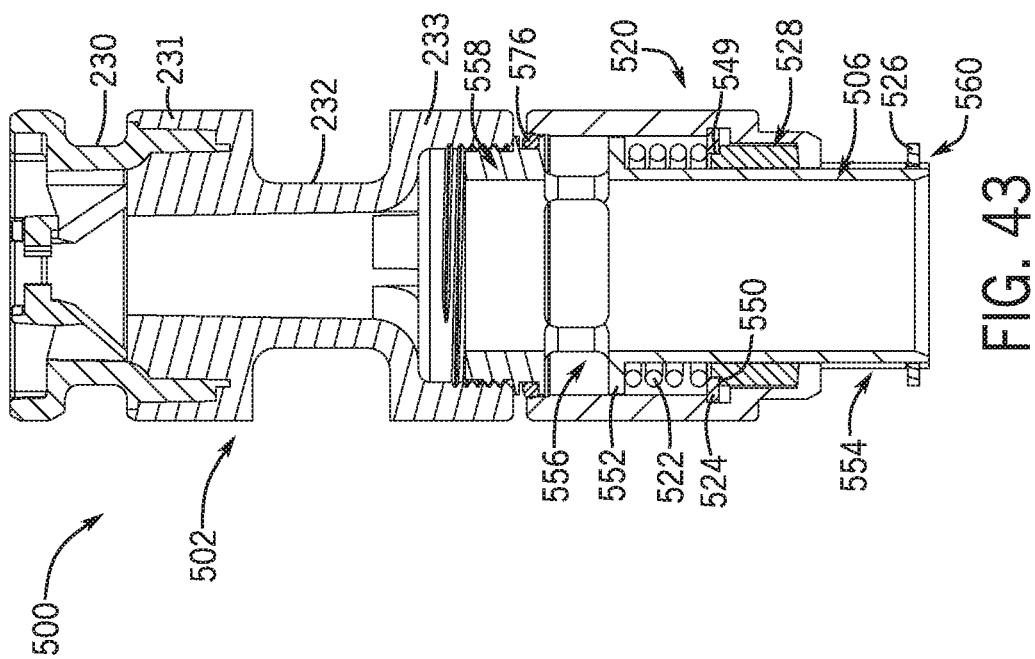
FIG. 43 is a cross-section view of the piston assembly of FIG. 42 in a latched position.

It should be appreciated that, in some embodiments, the shuttle piston assembly 404 of the piston assembly 400 may be coupled to the main piston 406. For example, FIGS. 42-44 illustrates a piston assembly 500 that may be integrated into the control valve 206 of the water softener system 200 according to another embodiment of the invention. The piston assembly 500 includes a main piston 502, a shuttle piston assembly 504 that is configured to be coupled to the main piston 502 by a coupling tube 506. The main piston 502, the shuttle piston assembly 504, and the coupling tube 506 may share a common center axis 505. The main piston 502 may be similar to the main piston 224 of the piston assembly 220 in design and functionality. Similar components between the main piston 506 and the main piston 224 are identified using like reference numerals.

The shuttle piston assembly 504 includes a shuttle piston 520, a biasing element 522, a biasing retainer 524, a shuttle retainer 526 and a rotating ring 528. The shuttle piston 520 defines a generally cylindrical, hollow body that includes a central passageway 530, a first end 532, and an opposing second end 534. The central passageway 530 extends through the interior of the shuttle piston 520 to permit fluid flow therethrough. An interior surface 536 of the shuttle piston 520 includes camming structure 538. The camming structure 538 extends radially inward from the interior surface 536 and includes a plurality of shuttle teeth 540 arranged circumferentially around the interior surface 536. Each of the plurality of shuttle teeth 540 are formed by a pair of angled surfaces that extend toward one another. A tooth recess 542 is arranged along circumferentially alternating pairs of the plurality of shuttle teeth 540. That is, adjacent pairs of the plurality of shuttle teeth 540 will include one tooth recess 542. The tooth recesses 542 are recessed radially inward on the camming structure 538 and extend axially along the camming structure 538.

The rotating ring 528 defines a generally annular shape and includes a plurality of lock teeth 546 that are configured to interact with the plurality of shuttle teeth 540 on the shuttle piston 520. Each of the plurality of lock teeth 546 are formed by an axial surface (i.e., a surface that extends substantially parallel to the center axis 505) and an angled surface (i.e., a surface that is angled with respect to the center axis 505). Similar to the plurality of shuttle teeth 540, a lock recess 548 is arranged along circumferentially alternating pairs of the plurality of lock teeth 546. That is, adjacent pairs of the plurality of lock teeth 546 will include one lock recess 548. The lock recesses 548 are recessed radially inward on the respective one of the lock teeth 546 on which they are arranged and extend axially along the rotating ring 528.

The rotating ring 528 is dimensioned to be received within the inner surface 536 of the shuttle piston 520 such that the lock teeth 546 interact with the shuttle teeth 540, as will be described.

The biasing retainer 524 is in the form of a snap ring, and is dimensioned to be received between an upper notch 549 of the rotating ring 528 and an inner notch 550 on the inner surface 536 of the shuttle piston 520. In this way, the biasing retainer 524 secures the shuttle piston 520 and the rotating ring 528 together such that they are allowed to translate axially as a unitary component.

The coupling tube 506 defines a generally cylindrical, hollow tube that includes a guide flange 552, a plurality of ribs 554, a plurality of openings 556, and a threaded first end 558. The guide flange 552 extends radially outward from an outer surface 559 of the coupling tube 506 at a location axially below the plurality of plurality of openings 556. The biasing element 522 is in the form of a spring and is configured to be biased between the guide flange 552 and the biasing retainer 524.

The ribs 554 are arranged circumferentially around the outer surface 559 of the coupling tube 506 adjacent to a second end 560 of the coupling tube 506. The ribs 554 extend radially outward from the outer surface 559 and extend axially along the outer surface 559 from the second end 560 of the coupling tube 506 to a position between the first end 558 and the second end 560 of the coupling tube 506. An end of the ribs 554 arranged opposite from the second end 560 includes an angled surface 562.

An axial gap 564 is arranged on the ribs 554 that extends circumferentially around the outer surface 559 of the coupling tube 506. The axial gap 564 is dimensioned to receive the shuttle retainer 526. The shuttle retainer 526 is in the form of a snap ring and is configured to limit the axial displacement of the shuttle piston 520 (i.e., the shuttle retainer 526 acts as a stop for the shuttle piston 520 during axial translation between a latched and an unlatched position).

The threaded first end 558 of the coupling tube 506 is configured to be coupled to the second end 244 of the main piston 502. The outer surface 559 is dimensioned such that the coupling tube 506, can extend into and/or through the biasing element 522, the biasing retainer 524, the rotating ring 528, and the shuttle piston 520, as illustrated in FIGS. 43 and 44. Each of the components in the shuttle piston assembly 504 and the coupling tube 506 may define a generally hollow shape such that the central passageway 530 extends through the shuttle piston assembly 504 and the coupling tube 506 to enable fluid flow therethrough. As will be described below, the interaction between the shuttle piston 520, the biasing element 522, the rotating ring 528, and the coupling tube 506 provides a mechanism configured to latch and unlatch the shuttle piston 520 to selectively control an axial position thereof and fluid flow through the openings 556. The collective interaction between the shuttle piston 520, the biasing element 522, the rotating ring 528, and the coupling tube 506 will be referred to herein as the latching mechanism 574 of the piston assembly 500.

Operation of the piston assembly 500 in the control valve 206 of the water softener system 200 will be described with reference to FIGS. 42-44. The piston assembly 500 is configured to selectively provide and inhibit the same fluid flow paths in the different positions of the control valve 206 (i.e., the service position, the backwash position, the draw position, the rinse position, the refill position, and the standby position) as the piston assembly 200. Thus, the specific axial alignment of the piston assembly 200 in the different positions with respect to the passageways 262, 264, 266, 268, 270 of the control valve body 260, and the corresponding fluid flow paths that are provided and/or inhibited by the piston assembly 200 in the respective positions also applies to the piston assembly 400.

The operation of the piston assembly 500 when transitioning between the service, backwash, draw, rinse, refill, and standby positions may be similar to the piston assembly 200, described above. However, latching mechanism 574 may function as described below during this operation. FIG. 42 illustrates the piston assembly 500 in a latched position where the ribs 554 are forced into engagement with the lock teeth 546 that do not included the lock recesses 548 by the biasing element 522. In this latched position, the shuttle piston 520 is axially constrained and prevented from displacing relative to the main piston 502. A seal is formed between the shuttle piston 502 and the first end 558 of the coupling tube 506 via a seal 576 in the form on an o-ring. This seal prevents fluid flow into the openings 556.

To transition to the unlatched position, an axial position of the piston assembly 500 may be altered to provide an external force on the shuttle piston 520 that forces the shuttle teeth 540 to interact with the lock teeth 546 against the force of the biasing element 522. The interaction between the shuttle teeth 540 and the lock teeth 546 imparts rotational torques on the rotating ring 528, which force the rotating ring 528 to rotate a predetermined amount governed by the number and geometry of the shuttle and lock teeth 540 and 546. This rotation of the rotating ring 528 brings the lock teeth 546 that include the lock recesses 548 in alignment with the ribs 554. The biasing force provided by the biasing element 522 is then allowed to bias the shuttle piston 520 toward the shuttle retainer 526 until the shuttle piston 520 engages the shuttle retainer 526. Thus, the shuttle piston 520 is axially translated into the unlatched position shown in FIG. 44. In the unlatched position, the shuttle piston 520 is positioned such that an opening is formed between the shuttle piston 520 and the main piston 502 to enable fluid flow through the openings 556.

Similar to the piston assembly 500, in some embodiments, the piston assembly 300 may be designed to include a coupling tube, or the like, to facilitate the coupling of the shuttle piston assembly 304 to the main piston 306.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A piston assembly for a control valve in a water softener system, the control valve including a drive mechanism, one or more fluid passageways, and a seal assembly arranged within a central bore and in fluid communication with the one or more fluid passageways, the piston assembly comprising:
 a main piston moveably received within the seal assembly and including a first end and a second end opposite to the first end, wherein the drive mechanism is connected to the first end of the main piston to selectively control a position of the main piston;
 a plurality of feet axially extending from the second end of the main piston; and
 a shuttle piston moveably received within the seal assembly and axially guided by the plurality of feet, the shuttle piston including a first end and a second end opposite the first end, the first end having a radially inward extending first rib,
 the radially inwardly extending first rib configured to selectively engage the plurality of feet to limit the axial translation of the shuttle piston with respect to the main piston.

2. The piston assembly of claim 1, wherein the main piston includes a radial recess that extends radially inward between a first flange and a second flange.

3. The piston assembly of claim 2, wherein the second flange is dimensioned to selectively block one of the one or more passageways based on the position of the main piston.

4. The piston assembly of claim 1, wherein the shuttle piston is moveably coupled to the main piston.

5. The piston assembly of claim 1, wherein radially outward projecting stops are positioned at a distal end of each of the plurality of feet.

6. The piston assembly of claim 1, wherein the main piston and the shuttle piston define a central passageway to permit fluid flow therethrough.

7. The piston assembly of claim 1, wherein the shuttle piston includes a second rib formed on the second end of the shuttle piston that extends radially outwardly and is configured to engage a first outermost seal of the seal assembly to limit an axial position of the shuttle piston.

8. The piston assembly of claim 1, further comprising an upper shuttle arranged adjacent to the first end of the main piston.

9. The piston assembly of claim 8, wherein the upper shuttle is moveable with respect to the first end of the main piston.

10. The piston assembly of claim 8, wherein the upper shuttle includes a first end and a second end opposite the first end, the second end including a third rib extending radially outward from the upper shuttle.

11. The piston assembly of claim 10, wherein the third rib is configured to engage a second outermost seal of the seal assembly.

12. The piston assembly of claim 1, wherein the plurality of feet is circumferentially spaced to create a plurality of openings.

13. The piston assembly of claim 1, wherein the shuttle piston forms a radial step on an outer surface of the first end of the shuttle piston.

14. The piston assembly of claim 1, wherein an inner surface of the shuttle piston is chamfered on one or more of the first end and the second end.

15. A piston assembly for a control valve in a water softener system, the control valve including a seal assembly arranged within a central bore, the piston assembly comprising:
  a main piston moveably received within the seal assembly and including a first end and a second end opposite to the first end, wherein a drive mechanism is connected to the first end of the main piston to selectively control a position of the main piston;
  a shuttle piston moveably received within the seal assembly; and
  a coupling feature to slidably couple the main piston to the shuttle piston such that the shuttle piston is moveable with respect to the main piston between a first position in which the shuttle piston is axially displaced from the second end of the main piston and a second position in which the shuttle piston engages the second end of the main piston.

16. The piston assembly of claim 15, wherein the coupling feature is integrally formed with the main piston.

17. The piston assembly of claim 15, wherein the coupling feature comprises a cylindrical base and a plurality of feet axially extending from the cylindrical base toward the shuttle piston.

18. The piston assembly of claim 17, wherein each of the plurality of feet include a radially outward projecting stop on a distal end thereof.

19. The piston assembly of claim 18, wherein the shuttle piston includes a first end and a second end, the shuttle piston forming an internal flange on an inner surface of the shuttle piston and located on the first end of the shuttle piston.

20. The piston assembly of claim 19, wherein the internal flange is configured to selectively engage the radially outward projecting stops, wherein when the internal flange engages the radially outward projecting stops, the shuttle piston travels with the main piston.

* * * * *